(12) United States Patent
Umekage et al.

(10) Patent No.: US 7,082,841 B2
(45) Date of Patent: Aug. 1, 2006

(54) ULTRASONIC FLOWMETER

(75) Inventors: Yasuhiro Umekage, Shiga (JP); Yukio Nagaoka, Kyoto (JP); Osamu Eguchi, Nara (JP); Shuji Abe, Nara (JP); Yuji Nakabayashi, Nara (JP); Kenzo Ohji, Nara (JP); Fumikazu Shiba, Nara (JP); Akihisa Adachi, Kanagawa (JP); Masahiko Hashimoto, Tokyo (JP); Toshiharu Sato, Kanagawa (JP); Yuji Fujii, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/711,055

(22) Filed: Aug. 19, 2004

(65) Prior Publication Data

US 2004/0267464 A1 Dec. 30, 2004

Related U.S. Application Data

(62) Division of application No. 10/019,418, filed as application No. PCT/JP00/04165 on Jun. 23, 2000, now Pat. No. 6,796,189.

(30) Foreign Application Priority Data

Jun. 24, 1999 (JP) ............................. 11-177952
Jun. 29, 1999 (JP) ............................. 11-182995
Feb. 14, 2000 (JP) ............................. 2000-34677

(51) Int. Cl.
*G01F 1/66* (2006.01)

(52) U.S. Cl. .................................. 73/861.27

(58) Field of Classification Search ..................
73/861.27–861.29; 702/45, 50, 85, 100
See application file for complete search history.

(56) References Cited

U.S. PATENT DOCUMENTS

| 4,493,217 A | 1/1985 | Engler et al. |
| 4,848,354 A | 7/1989 | Angelsen et al. |
| 5,320,105 A | 6/1994 | Bonnefous et al. |
| 5,513,535 A | 5/1996 | Mayranen et al. |
| 5,831,175 A * | 11/1998 | Fletcher-Haynes ........ 73/861.28 |
| 5,918,281 A * | 6/1999 | Nabulsi ........................ 73/597 |

FOREIGN PATENT DOCUMENTS

| JP | 63005217 A | 1/1988 |
| JP | 08271313 A | 10/1996 |
| JP | 08304135 A | 11/1996 |
| JP | 09304139 A | 11/1997 |
| JP | 11044563 A | 2/1999 |

* cited by examiner

*Primary Examiner*—Harshad Patel
*Assistant Examiner*—Corey D. Mack
(74) *Attorney, Agent, or Firm*—Snell & Wilmer LLP

(57) ABSTRACT

An ultrasonic flowmeter includes a transmission/reception means provided in a flow path for performing transmission/reception using a state change of fluid; repetition means for repeating the transmission/reception; time measurement means for measuring a time of propagation repeated by the repetition means; flow rate detection means for detecting a flow rate based on a value of the time measurement means; and number-of-times change means for changing to a predetermined number of repetition times. With such a structure, an influence caused by a variation of a flow can be suppressed by changing the number of repetition times so as to be suitable for a variation. As a result, reliable flow rate measurement with a high accuracy can be achieved.

7 Claims, 65 Drawing Sheets

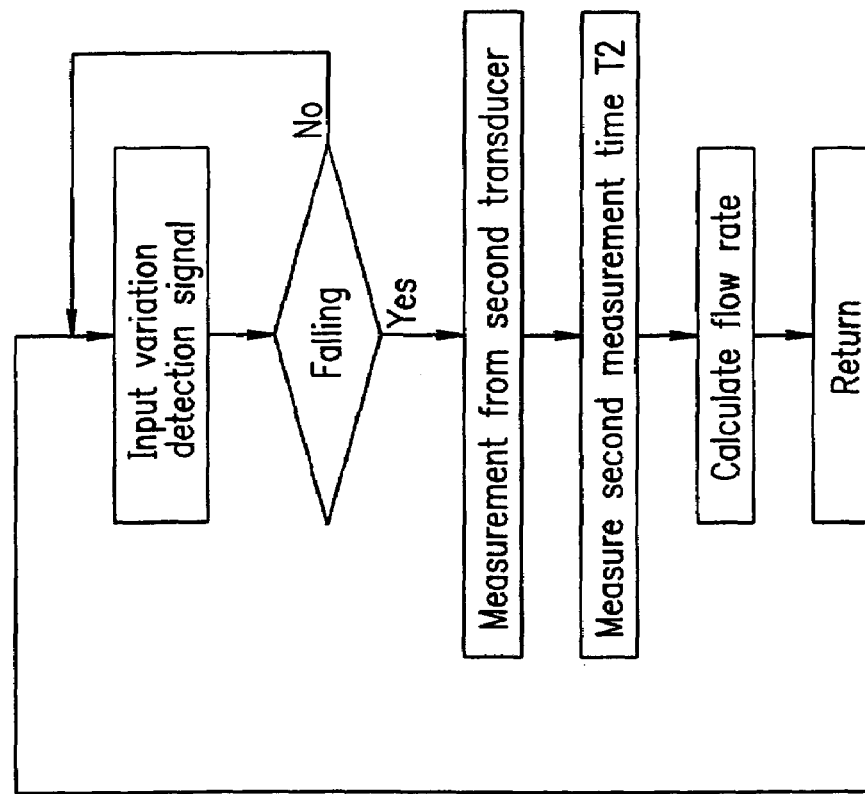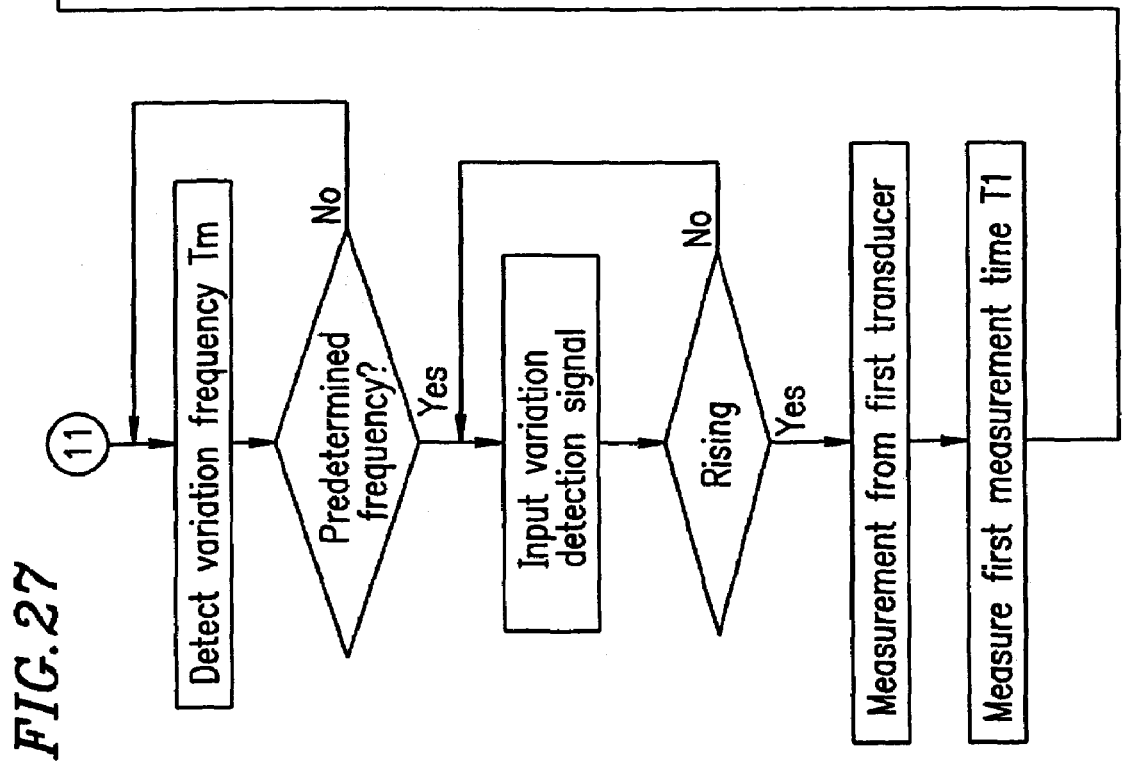
FIG. 27

323 First piezoelectric transducer
324 Flow path
325 Second piezoelectric transducer
329 Pressure variation detector 324 Flow path
329 Pressure variation detector
336 Heater
337 Temperature sensor 500 Flow rate measurement section
501,502 Ultrasonic wave transducer
503 Driver circuit
504 Reception detecting circuit
505 Timer
507 Control section
506 Calculation section
508 Periodicity change means 533 Periodicity stabilization means Delay section

ULTRASONIC FLOWMETER

CROSS REFERENCE TO RELATED APPLICATIONS

This application is a divisional of U.S. patent application Ser. No. 10/019,418, entitled "Ultrasonic Flowmeter Having Sequentially Changed Driving Method", filed on Mar. 29, 2002, now U.S. Pat. No. 6,796,189, and had its 35 U.S.C. 371 requirements met on Mar. 29, 2002, and which claims priority to PCT/JP00/04165, filed on Jun. 23, 2000, as well as claims priority to Japanese Application Nos. 11-177952, filed Jun. 24, 1999; 11-182995, filed Jun. 29, 1999; and 2000-34677, filed Feb. 14, 2000, all of which are incorporated herein by reference. All of these applications were also based on Japanese Application Nos. 11-106246, filed Apr. 14, 1999; 11-54082, filed Mar. 2, 1999; 11-106247, filed Apr. 14, 1999; and 11-12823, filed Jan. 21, 1999, all of which are incorporated herein by reference.

FIELD OF INVENTION

The present invention relates to a flowmeter for measuring the flow rate of liquid or air. The present invention relates to means for measuring a flow rate value in an accurate manner even when there is a variation in pressure or temperature.

BACKGROUND OF INVENTION

Conventionally, such a type of flowmeter is known, for example, in Japanese Laid-Open Publication No. 9-15006. As shown in FIG. 64, the flowmeter includes: a sampling program 2 for reading a measurement value, at an interval having a predetermined first sampling time, from an analog flow sensor 1 that measures the flow rate of gas; a consumed gas amount calculation program 3 for calculating the flow rate of consumed gas at a predetermined time; a mean value calculation program 4 for calculating the mean value of measurement values, which are read from the analog flow sensor at the first sampling time, at an interval of a second sampling time within a predetermined time period; a pressure variation frequency estimation program 5 for estimating the frequency of a pressure variation based on an output of the flow sensor; and a RAM 6 which functions as a memory. Herein, reference numeral 7a denotes a CPU for executing the programs, and reference numeral 7b denotes a ROM for storing the programs. In such a structure, a measurement process is performed such that the predetermined measurement time is equal to or longer than a single cycle of the vibration frequency of a pump or is a multiple of the cycle. Averaging is performed to suppress variation in the flow rate.

As another conventional example, the invention disclosed in Japanese Laid-Open Publication No. 10-197303 is known. As shown in FIG. 65, the flowmeter includes: flow rate detection means 8 for detecting the flow rate; frequency detection means 9 for detecting the frequency of a variation of a flow; and measurement time set means 10 for setting the measurement time for flow rate detection to about a multiple of one cycle of the variation frequency. Herein, reference numeral 11 denotes flow rate calculation means; 12 denotes measurement start means; 13 denotes signal processing means; and 14 denotes a flow rate. With this structure, the flow rate is measured in accordance with the frequency of a variation waveform, whereby a correct flow rate measurement is achieved within a short time period.

As still another conventional example, the invention disclosed in Japanese Laid-Open Publication No. 11-44563 is known. As shown in FIG. 66, the flowmeter includes: flow rate detection means 15 for detecting the flow rate; variation detection means 16 for detecting a variation waveform of the flow rate of fluid; pulse measurement means 17 for starting the measurement of the flow rate detection means when an alternating component of the variation waveform is in the vicinity of zero; and flow rate calculation means 18 for processing a signal from the flow rate detection means. Herein, reference numeral 19 denotes a signal processing circuit; 20 denotes a time measurement circuit; 21 denotes a trigger circuit; 22 denotes a transmission circuit; 23 denotes a comparison circuit; 24 denotes an amplification circuit; 25 denotes a switch; 26 denotes a measurement start signal circuit; and 27 denotes start-up means; 28 denotes a flow path. In this structure, the flow rate near the average of the variation waveforms is measured, whereby a correct flow rate measurement is achieved within a short time period.

As yet another conventional example, the invention disclosed in Japanese Laid-Open Publication No. 8-271313 is known. As shown in FIG. 67, whether or not a flow rate value has been detected in flow sensor measurement (29) is confirmed (30). Until a flow rate is confirmed to have been detected, the process does not proceed, and the measurement with the flow sensor is continued. Once a flow rate is found, it is determined whether or not the flow rate Q is equal to or higher than a predetermined value (31). When the flow rate Q is equal to or higher than the predetermined value, it is further determined whether or not the pressure variation surpasses a predetermined-value Cf (32). When the pressure variation does not surpass a predetermined value Cf, measurement 34 is performed with a piezoelectric film sensor of a fluidic flowmeter. When the pressure variation surpasses a predetermined value Cf, it is confirmed if the pressure variation surpasses a second predetermined value (33). When the pressure variation surpasses the second predetermined value, the measurement (34) is performed with the piezoelectric film sensor of the fluidic flowmeter. When the pressure variation does not surpass the second predetermined value, the measurement (29) is performed with the flow sensor.

As shown in FIG. 68, ultrasonic wave transducers 51 and 52 are provided in a flow rate measurement section 50 so as to oppose the direction of a flow. A control section 53 starts a timer 54, and simultaneously, outputs a transmission signal to a driver circuit 55. An ultrasonic wave is transmitted from the ultrasonic wave transducer 51 which received an output of the driver circuit 55. The ultrasonic wave is received by the ultrasonic wave transducer 52. A reception detection circuit 56 which received an output of the ultrasonic wave transducer 52 detects the ultrasonic wave and stops the timer 54. By such an operation, a time (t1) spent from a time when an ultrasonic wave is transmitted from the ultrasonic wave transducer 51 to a time when the wave is detected by the ultrasonic wave transducer 52 is measured. Next, a switching circuit 58 is operated based on a signal from the control section 53, such that the driver circuit 55 and the ultrasonic wave transducer 52 are connected, and the reception detection circuit 56 and the ultrasonic wave transducer 51 are connected. Under this state, transmission and reception of an ultrasonic wave is performed again to measure a time (t2) spent from a time when an ultrasonic wave is transmitted from the ultrasonic wave transducer 52 to a time when the wave is detected by the ultrasonic wave transducer 51. Based on the two propagation times (t1) and (t2), a calculation section 57 calculates the flow rate from a difference between inverse numbers of the propagation times.

As a conventional example of this type of flowmeter, the invention disclosed in Japanese Laid-Open Publication No. 6-269528 is known.

However, in the first of the above conventional inventions, the gas flow rate is measured by using a mean value. Therefore, measurement over a long time period is necessary in order to obtain a reliable mean value, and hence such flow rate measurement cannot be performed within a very short space of time. In the second of the above conventional inventions, measurement cannot deal with a variation in frequency. In the third and fourth conventional inventions, the method for measuring the flow rate must be changed according to the presence/absence of a pressure variation, and it is necessary to provide two means, pressure measurement means and flow rate measurement means. In the first to forth inventions, when any abnormality occurs, measurement either cannot be performed, or can be performed but with decreased accuracy.

Still further, in the above conventional structures, when receiving a signal, if noise which is in synchronization with the measurement frequency or transmission frequency of an ultrasonic wave is present, the noise is superposed on the signal always at the same phase when the propagation time is the same. The noise is counted as a measurement error, and accordingly, correct measurement cannot be performed. Moreover, when the propagation time is varied due to a variation in temperature or the like, the phase at which noise is superposed is varied, and accordingly, a measurement error is varied. As a result, a correction value cannot be stabilized. Furthermore, since the measurement resolution is determined based on the resolution of the timer 54, simply averaging the measurement values cannot increase the accuracy of measurement. Thus, it is necessary to increase the resolution of the timer 54 in order to perform measurement which requires the resolution. When the operation clock of the timer 54 is increased so as to have a high frequency, various problems occur, i.e., an increase in current consumption, an increase in high-frequency noise, and an increase in size of circuitry. Thus, there exists an objective to increase the resolution of measurement with a timer which operates at a low frequency in order to increase the measurement accuracy.

In the fifth conventional invention, a delay means is inserted between a control section and a drive circuit, and the amount of delay is changed such that a reflected wave is avoided. In this way, an effect by the reflected wave is reduced. For example, the ultrasonic wave transducer at a receiving side is vibrated due to noise generated when the ultrasonic wave is transmitted. Thus, a variation in the signal-reception detecting time, which is caused by superposition of reverberation of this vibration on the ultrasonic wave signal, cannot be decreased.

The present invention seeks to solve the above problems. A first objective of the present invention is to set an optimum number of times that the measurement is repeated according to a variation of a flow by detecting a variation frequency using software but without using additional variation detecting device, and successively changing the number of repetition times. Further, it is sought to achieve a measurement flow rate in a reliable and accurate manner within a very short space of time even when there is a change in pressure variation and variation frequency. A second objective of the present invention is to instantaneously perform highly accurate flow-rate measurements by switching so as to detect a variation with transmission/reception means without using an additional variation detecting device and performing measurement processing in synchronization with a variation. A third objective of the present invention is to perform highly accurate flow-rate measurement, even when any abnormality occurs in the measurement process, by quickly detecting the abnormality with measurement monitoring means and appropriately processing the measurement. A fourth objective of the present invention is to perform flow-rate measurement in a reliable and accurate manner within a very short space of time by using instantaneous flow rate measurement means and digital filter means. A fifth objective of the present invention is to measure a flow rate value with a high accuracy even when there is a variation in temperature.

SUMMARY OF INVENTION

In order to solve the above problems, a flowmeter of the present invention includes: transmission/reception means provided in a flow path for performing transmission/reception using a state change of fluid; repetition means for repeating the transmission/reception; time measurement means for measuring a time or propagation repeated by the repetition means; flow rate detection means for detecting a flow rate based on a value of the time measurement means; and number-of-times change means for changing to a predetermined number of repetition times. The number of repetition times is changed to a number suitable for a variation such that an influence of a variation of a flow can be suppressed. As a result, reliable flow rate measurement with a high accuracy can be achieved.

The flowmeter includes a pair of transmission/reception means which utilize propagation of an ultrasonic wave as the state change of fluid. Thus, by using the sonic wave transmission/reception means, propagation of a sonic wave can be performed even when a state change occurs in the fluid. Moreover, by changing the number of repetition times to a number suitable for the variation, reliable flow rate measurement with a high accuracy can be achieved.

The flowmeter includes transmission/reception means which utilizes propagation of heat as the state change of fluid. Thus, by using the heat transmission/reception means, propagation of heat can be performed even when a state change occurs in the fluid. Moreover, by changing the number of repetition times to a number suitable for the variation, reliable flow rate measurement with a high accuracy can be achieved.

The flowmeter includes: elapsed time detection means for detecting halfway information for a propagation time which is repeatedly measured by the repetition means; frequency detection means for detecting a frequency of a flow rate variation from information of the elapsed time detection means; and number-of-times change means for setting a measurement time so as to be substantially a multiple of the frequency detected by the frequency detection means. Thus, it is not necessary to provide specific detection means. Before flow rate detection is performed, the frequency of a variation is detected from halfway information of the time measurement means, and the measurement time can be set so as to be a multiple of a cycle of the frequency. As a result, reliable flow rate measurement with a high accuracy can be achieved.

The flowmeter includes: data holding means for holding at least one or more propagation time of repeatedly-performed transmission/reception which is obtained by the elapsed time detection means; and frequency detection means for detecting a frequency by comparing the data held by the data holding means and measured propagation time data. Time measurement information at each moment is held and compared by the data holding means, whereby the frequency can be detected.

The number-of-times change means is operated in predetermined processing. Since the number-of-times change means is operated only when predetermined processing is performed, the processing in the number-of-times change means can be limited to the required minimum. Thus, the amount of consumed power can be considerably reduced.

The number-of-times change means is operated at each predetermined flow rate measurement. Thus, the number of repetition times is changed at every predetermined flow rate measurement, whereby the flow rate can be measured with a high accuracy in a stable manner even in a flow that varies greatly.

The number-of-times change means is performed before flow rate measurement processing. Since the number of repetition times is set to a predetermined number of times before flow rate measurement is performed, the flow rate measurement can be performed with a high accuracy in a reliable manner.

Predetermined processing includes operations of abnormality determination means for determining abnormality in flow rate from the measured flow rate; and flow rate management means for managing a use state for a flow rate from a measured flow rate. Since the number of repetition times is changed only when the abnormality determination processing and the flow rate management processing are performed, the processing of changing the number of repetition times is limited to the required minimum. Thus, the amount of consumed power can be decreased.

The number of repetition times which is adjusted the frequency obtained by the frequency detection means is used in next flow rate measurement. Since the number of repetition times is used in the next measurement, it is not necessary to perform repetitious measurement for frequency detection. Thus, the amount of consumed power can be decreased.

The number-of-times change means is operated when the measured flow rate is lower than a predetermined flow rate. Since the number of repetition times is changed only when the flow rate is equal to or lower than a predetermined flow rate, but this processing is not performed when the flow rate is high, the amount of consumed power can be decreased.

A flowmeter of the present invention includes: transmission/reception means provided in a flow path for performing transmission/reception using a state change of fluid; time measurement means for measuring a propagation time transmitted/received by the transmission/reception means; flow rate detection means for detecting a flow rate based on a value of the time measurement means; variation detection means for measuring a variation in the flow path by the transmission/reception means; and measurement control means for starting measurement in synchronization with a timing of a variation of the variation detection means. Since a variation in the flow path is measured by transmission/reception means, it is not necessary to provide another sensor for detecting a variation. Thus, the size of the flowmeter can be decreased, and the structure of the flow path can be simplified. In addition, the flow rate can be measured with a high accuracy in a reliable manner within a short space of time even when a variation occurs.

The flowmeter includes a pair of transmission/reception means which utilize propagation of an ultrasonic wave as the state change of fluid. Thus, a state change of fluid can be detected by the sonic wave transmission/reception means. Accordingly, the measurement can be started in synchronization with a timing of variation. As a result, the flow rate can be measured with a high accuracy in a reliable manner.

The flowmeter includes transmission/reception means which utilizes propagation of heat as the state change of fluid. Thus, a state change of fluid can be detected by the heat transmission/reception means. Accordingly, the measurement can be started in synchronization with a timing of variation. As a result, the flow rate can be measured with a high accuracy in a reliable manner.

The flowmeter includes: first vibration means and second vibration means provided in a flow path for transmitting/receiving an sonic wave; switching means for switching an transmission/reception operation of the first vibration means and the second vibration means; variation detection means for detecting a pressure variation in a flow path of at least one of the first vibration means and the second vibration means; time measurement means for measuring a propagation time of a sonic wave transmitted/received by the first vibration means and the second vibration means; measurement control means for performing control where, when an output of the variation detection means shows a predetermined change, the measurement means measures a first measurement time T1 of propagation from the first vibration means at an upstream side in the flow path to the second vibration means at a downstream side in the flow path, and when the output of the variation detection means shows a change opposite to the predetermined change, the measurement means measures a second measurement time T2 of propagation from the second vibration means at a downstream side in the flow path to the first vibration means at an upstream side in the flow path; flow rate detection means for calculating a flow rate using the first measurement time T1 and the second measurement time T2. Since the measurement is performed at a time when a change in a pressure variation is inverted, the phases of the pressure variation and the timing of the measurement can be shifted. As a result, a measurement error caused by a pressure variation can be offset.

The flowmeter includes: measurement control means for performing measurement control where measurement of the first measurement time T1 is started when an output of the variation detection means shows a predetermined change and measurement of the second measurement time T2 is started when the output of the variation detection means shows a change opposite to the predetermined change, and measurement control where, in a next measurement, measurement of the first measurement time T1 is started when the output of the variation detection means shows a change opposite to the predetermined change and measurement of the second measurement time T2 is started when the output of the variation detection means shows the predetermined change; and flow rate calculation means for calculating the flow rate by successively averaging a first flow rate obtained by using the previous first measurement time T1 and previous second measurement time T2 while alternately changing start of measurement and a second flow rate obtained by using next first measurement time T1 and next second measurement time T2. Thus, the timing for measurement is changed as described above in order to perform measurement for the first measurement time T1 and the second measurement time T2. As a result, even when a pressure variation is asymmetrical between a high pressure side and a low pressure side, an influence of such a pressure variation can be offset.

The flowmeter includes repetition means for performing transmission/reception a plurality of times. Thus, averaging can be performed by increasing the number of times of measurement, and as a result, reliable flow rate measurement can be performed.

The flowmeter includes repetition means for performing transmission/reception a plurality of times over a time period which is a multiple of a variation cycle. Thus, a pressure variation can be averaged by measuring according to the variation frequency. As a result, a stable flow rate can be measured.

The flowmeter includes repetition means for starting transmission/reception measurement when an output of the variation detection means shows a predetermined change and repeating the transmission/reception measurement with a sonic wave until the output of the variation detection means shows the same change as the predetermined change. Thus, the start and stop of the measurement can be made conformable to the frequency of a pressure variation. Therefore, a variation frequency can be measured, and a pressure variation is averaged. As a result, a stable flow rate can be measured.

The flowmeter includes selection means for switching a case where the first vibration means and second vibration means are used for transmission/reception of a sonic wave and a case where the first vibration means and second vibration means are used for detection of a pressure variation. Thus, at least one of the first vibration means and the second vibration means is used for pressure detection. As a result, both the flow rate measurement and the pressure measurement can be simultaneously achieved.

The flowmeter includes variation detection means for detecting a component of an alternating component of a variation waveform which is in the vicinity of zero. Thus, a variation is detected in the vicinity of a zero component of the variation, and hence the measurement can be started in the vicinity of zero variation within a time to perform flow rate measurement. Therefore, by performing the flow rate measurement within a time when a variation is small, the measurement can be stabilized even when a variation occurs in a fluid.

The flowmeter includes: frequency detection means for detecting the frequency of a signal of the variation detection means; and measurement control means for starting measurement only when the frequency detected by the frequency detection means is a predetermined frequency. Thus, by starting the measurement only when the frequency is a predetermined frequency, measurement can be performed when a predetermined variation occurs. As a result, a stable flow rate can be measured.

The flowmeter includes detection cancellation means for automatically starting measurement after a predetermined time period when a signal of the variation detection means is not detected. Thus, even after a variation disappears, the flow rate can be automatically measured when a predetermined time arrives.

The transmission/reception means and the first and second vibration means include piezoelectric transducers. Thus, when the piezoelectric transducer is used, an ultrasonic wave is used for transmission/reception while a pressure variation can be detected.

A flowmeter of the present invention includes: transmission/reception means provided in a flow path for performing transmission/reception using a state change of fluid; repetition means for repeating signal propagation by the transmission/reception means; time measurement means for measuring a propagation time during repetition by the repetition means; flow rate detection means for detecting a flow rate based on a value of the time measurement means; variation detection means for detecting a fluid variation in a flow path; measurement control means for controlling each of the above means; and measurement monitoring means for monitoring abnormality in each of the above means. Thus, when there is a variation in a flow in the flow path, the flow rate is measured according to the variation, while abnormality can be quickly detected by the measurement monitoring means. Accordingly, handling of abnormality can be correctly performed, and a measured value becomes stable. As a result, the flow rate can be measured with a high accuracy, and the reliability of the measurement can be improved.

The flowmeter includes a pair of transmission/reception means which utilize propagation of an ultrasonic wave as the state change of fluid. Since a sonic wave is used, the flow rate measurement can be performed even when there is a variation in fluid. Further, handling of abnormality can be correctly performed by the measurement monitoring means. As a result, the reliability of the measurement can be improved.

The flowmeter includes transmission/reception means which utilizes propagation of heat as the state change of fluid. Since heat propagation is used, the flow rate measurement can be performed even when there is a variation in fluid. Further, handling of abnormality can be correctly performed by the measurement monitoring means. As a result, the reliability of the measurement can be improved.

The flowmeter includes: a pair of transmission/reception means provided in a flow path for transmitting/receiving a sonic wave; repetition means for repeating signal propagation of the transmission/reception means; time measurement means for measuring a propagation time of a sonic wave during the repetition by the repetition means; flow rate detection means for detecting the flow rate based on a value of the time measurement means; variation detection means for detecting a fluid variation in a flow path; measurement control means for controlling each of the above means; and measurement monitoring means for monitoring abnormality in a start signal which directs start of transmission of a sonic wave at a first output signal of the variation detection means after a direction signal of the measurement control means, and abnormality in an end signal which directs end of repetition of the transmission/reception of the sonic wave at second output signal of the variation detection means. Thus, when there is a variation in fluid in the flow path, the measurement can be performed in synchronization with the frequency of the variation, and abnormality can be detected by the measurement monitoring means. Therefore, a flow rate can be measured with a high accuracy, and a reliable measured value can be obtained. In addition, handling of abnormality can be correctly performed, and the reliability of the measured flow rate value can be improved.

The flowmeter includes measurement monitoring means for directing a start of transmission of a sonic wave after a predetermined time when a start signal is not generated within a predetermined time period after a direction of the measurement control means. Thus, even when there is no variation, and there is no start signal within a predetermined time period, the flow rate can be measured at every predetermined time, and loss of data can be prevented.

The flowmeter includes measurement monitoring means for directing start of transmission of a sonic wave after a predetermined time when a start signal is not generated within a predetermined time period after a direction of the measurement control means, and for performing measurement a predetermined number of repetition times. Thus, even when there is no variation, and there is no start signal within a predetermined time period, the flow rate can be measured for a predetermined number of repetition times at every predetermined time, and loss of data can be prevented.

The flowmeter includes measurement monitoring means which does not perform measurement until a next direction of the measurement control means when a start signal is not generated within a predetermined time period after a direction of the measurement control means. By suspending the operation until a next measurement direction, unnecessary measurement is not performed, whereby the amount of consumed power can be decreased.

The flowmeter includes measurement monitoring means which terminates reception of a sonic wave when an end signal is not generated within a predetermined time after a start signal. Since the reception of the sonic wave is forcibly terminated, the measurement is not suspended while waiting for the end signal. Thus, the measurement can proceed to a next process, and a stable measurement operation can be performed.

The flowmeter includes measurement monitoring means which terminates reception of a sonic wave and outputs a start signal again, when an end signal is not generated within a predetermined time after a start signal. Since the reception of the sonic wave is forcibly terminated, the measurement is not suspended while waiting for the end signal. Further, a start signal is output again so as to perform re-measurement. Thus, a stable measurement operation can be performed.

The flowmeter includes measurement monitoring means for stopping transmission/reception processing when abnormality occurs in the number of repetition times. Since the measurement is stopped when the number of repetition times is abnormal, only data with a high accuracy can be used to perform flow rate measurement.

The flowmeter includes measurement monitoring means which compares a first number of repetition times for measurement where a sonic wave is transmitted from a first one of the pair of transmission/reception means and received by the second transmission/reception means and a second number of repetition times for measurement where a sonic wave is transmitted from the second transmission/reception means and received by the first transmission/reception means, and again outputs a start signal when the difference between the first and second numbers of repetition times is equal to or greater than a predetermined number of times. Thus, re-measurement is performed when the number of repetition times is greatly different, whereby measurement with a high accuracy can be performed with a stable variation frequency.

The flowmeter includes repetition means for setting the number of repetition times such that a first number of repetition times for measurement where a sonic wave is transmitted from first one of the pair of transmission/reception means and received by the second transmission/reception means is equal to a second number of repetition times for measurement where a sonic wave is transmitted from the second transmission/reception means and received by the first transmission/reception means. Thus, by employing the same number of repetition times, a predetermined flow rate measurement can be performed even when a variation frequency is unstable.

The flowmeter includes measurement monitoring means for monitoring the number of times that a start signal is output again so as to be limited to a predetermined number of times or less, such that the outputting of the start signal is not permanently repeated. Thus, by limiting the number of times of re-measurement, the processing is prevented from continuing permanently. As a result, stable flow rate measurement can be performed.

The flowmeter measures a flow rate from a difference between inverse numbers of propagation times measured while repeating transmission/reception of an ultrasonic wave a plurality of number of times. Thus, when an ultrasonic wave is used, transmission/reception can be performed without being affected by a variation frequency in the flow path. Further, the flow rate is measured from the difference of inverse numbers of propagation times which are measured while repeating the transmission/reception, whereby even a variation of a long cycle can be measured by units of one cycle. In addition, the difference of the propagation times which is caused by a variation can be offset by using the difference of inverse numbers.

A flowmeter of the present invention includes: instantaneous flow rate detection means for detecting an instantaneous flow rate; fluctuation determination means for determining whether or not there is a pulse in a flow rate value; and at least one or more stable flow rate calculation means for calculating a flow rate value using different means according to a determination result of the fluctuation determination means. Thus, by determining a variation in a measured flow rate and switching the flow rate calculation means, the flow rate can be calculated by one flow rate measurement means according to the amount of the variation in a reliable manner.

A flowmeter of the present invention includes: instantaneous flow rate detection means for detecting an instantaneous flow rate; filter processing means for performing digital-filter processing of a flow rate value; and stable flow rate calculation means for calculating a flow rate value using the filter processing means. Thus, when the digital filter processing is performed, a calculation equivalent to an averaging process can be performed without using a large number of memories for storing data. Moreover, the filter characteristic can be modified by changing one variable, i.e., a filter coefficient.

The flowmeter includes stable flow rate calculation means for calculating a stable flow rate value using the digital filter processing means when the fluctuation determination means determines that there is a pulse. Thus, when a pulse occurs, a sharp filter characteristic is selected so as to render a large pulse stable, and the filter processing can be performed only when a pulse occurs.

The fluctuation determination means determines whether or not a variation amplitude of a flow rate value is equal to or greater than a predetermined value. Thus, a pulse can be determined based on the variation amplitude of the pulse, whereby the filter processing can be modified according to the variation amplitude of the pulse.

The filter processing means modifies a filter characteristic according to a variation amplitude of a flow rate value. Since the filter characteristic is changed according to the variation amplitude of a flow rate value, the filter characteristic can be quickly modified so as to be a sufficiently relaxed filter characteristic that allows a variation according to a variation in a flow rate when the variation is small, and when the variation is large, a sharp filter characteristic is selected such that a variation of the flow rate due to a pulse can be significantly suppressed.

The filter processing is performed only when a flow rate value detected by the instantaneous flow rate detection means is low. Since the filter processing is performed only when the flow rate is low, a variation of the flow rate can be quickly handled when the flow rate is high, and an influence of fluctuation which is caused when the flow rate is low can be significantly suppressed.

Filter processing means modifies a filter characteristic according to a flow rate value. Since the filter characteristic is changed according to the flow rate value, filter processing is performed only when the flow rate is low, a variation of the flow rate can be quickly handled when the flow rate is high, and an influence of fluctuation which is caused when the flow rate is low can be significantly suppressed.

Filter processing means modifies a filter characteristic according to an interval of a flow rate time of the instantaneous flow rate detection means. Thus, by changing the filter characteristic according to an interval of the flow rate detection time, the variation can be suppressed with a relaxed filter characteristic when the measurement interval is short or with a sharp filter characteristic when the measurement interval is long.

The flowmeter includes filter processing means which modifies a filter characteristic such that a cut-off frequency of the filter characteristic becomes high when the flow rate is high, and which modifies a filter characteristic such that the filter characteristic has a low cut-off frequency when the flow rate is low. Thus, the response characteristic is increased when the flow rate is high, and the fluctuation is suppressed when the flow rate is low.

A filter characteristic is modified such that a variation amplitude of a flow rate value calculated by the stable flow rate calculation means is within a predetermined value range. Since the filter characteristic is modified such that the variation amplitude is within a predetermined value range, the flow rate variation can be suppressed so as to be always equal to or smaller than a predetermined value.

An ultrasonic wave flowmeter which detects a flow rate by using an ultrasonic wave is used as the instantaneous flow rate detection means. Thus, by using an ultrasonic wave flowmeter, an instantaneous flow rate can be measured even when a large flow rate variation occurs. Thus, from the flow rate value, a stable flow rate can be calculated.

A heat-based flowmeter is used as the instantaneous flow rate detection means. When the heat-based flowmeter is used, an instantaneous flow rate can be measured even when a large flow rate variation occurs. Thus, a stable flow rate can be calculated from the flow rate value.

A flowmeter of the present invention includes: a flow rate measurement section through which fluid to be measured flows; a pair of ultrasonic wave transducers provided in the flow rate measurement section for transmitting/receiving an ultrasonic wave; a driver circuit for driving one of the ultrasonic wave transducers; a reception detecting circuit connected to the other ultrasonic wave transducer for detecting an ultrasonic wave signal; a timer for measuring a propagation time of the ultrasonic wave signal; a control section for controlling the driver circuit; a calculation section for calculating a flow rate from an output of the timer; and periodicity change means for sequentially changing a driving method of the driver circuit, wherein the control section controls the periodicity change means such that the frequency of flow rate measurement is sequentially changed in order to prevent the frequency of the measurement from being constant. Thus, noise which is in synchronization with a measurement frequency or a transmission frequency of an ultrasonic wave is never in the same phase but dispersed when the ultrasonic wave is received. Therefore, a measurement error can be decreased.

A flowmeter of the present invention includes: a flow rate measurement section through which fluid to be measured flows: a pair of ultrasonic wave transducers provided in the flow rate measurement section for transmitting/receiving an ultrasonic wave; a driver circuit for driving one of the ultrasonic wave transducers; a reception detecting circuit connected to the other ultrasonic wave transducer for detecting an ultrasonic wave signal; a control section for controlling the driver circuit for a predetermined number of times so as to drive the ultrasonic wave transducers again in response to an output of the reception detecting circuit; a timer for measuring an elapsed time for the predetermined number of times; a calculation section for calculating a flow rate from an output of the timer; and periodicity change means for sequentially changing a driving method of the driver circuit, wherein, in response to receipt of an output of the reception detecting circuit, the control section changes the periodicity change means at every receipt detection of the reception detecting circuit such that the frequency is not kept constant. Thus, the periodicity change means can be operated with a plurality of settings for measurement within one flow rate measurement cycle. As a result, noise is dispersively averaged in a measurement result, and a reliable measurement result can be obtained.

The periodicity change means switchingly outputs a plurality of output signals having different frequencies; and the control section changes a frequency setting of the periodicity change means at every measurement so as to change a driving frequency of the driver circuit. Thus, by changing the driving frequency, the reception detecting timing can be changed by a time corresponding to a frequency variation of a driving signal. Thus, noise which is in synchronization with a measurement frequency or a transmission frequency of an ultrasonic wave is never in the same phase but dispersed when the ultrasonic wave is received. Therefore, a measurement error can be decreased.

The periodicity change means outputs output signals having the same frequency and a plurality of different phases; and the control section operates such that a phase setting for the output signal of the periodicity change means is changed at every measurement and a driving phase of the driver circuit is changed. Thus, by changing the driving phase, the reception detecting timing can be changed by a time corresponding to a phase variation of a driving signal. Thus, noise which is in synchronization with a measurement frequency or a transmission frequency of an ultrasonic wave is never in the same phase but dispersed when the ultrasonic wave is received. Therefore, a measurement error can be decreased.

The frequency change means outputs a synthesized signal obtained by superposing a signal of a first frequency which is an operation frequency of the ultrasonic wave transducers and a signal of a second frequency which is different from the first frequency; and the control section outputs, through the driver circuit, at every measurement, an output signal where the second frequency of the periodicity change means is changed. Thus, the periodicity of the flow rate measurement can be disturbed. As a result, noise which is in synchronization with a measurement frequency or a transmission frequency of an ultrasonic wave is never in the same phase but dispersed when the ultrasonic wave is received. Therefore, a measurement error can be decreased.

The periodicity change means switches the setting between a case where there is a second frequency and a case where there is not a second frequency. Thus, since the reception detecting timing is changed by changing the vibration of the ultrasonic wave transducer that transmits an ultrasonic wave, the periodicity of the flow rate measurement can be disturbed. As a result, noise which is in synchronization with a measurement frequency or a transmission frequency of an ultrasonic wave is never in the same phase but dispersed when the ultrasonic wave is received. Therefore, a measurement error can be decreased.

The periodicity change means changes the phase setting of the second frequency. Thus, since the reception detecting timing is changed by changing the vibration of the ultrasonic wave transducer that transmits an ultrasonic wave, the periodicity of the flow rate measurement can be disturbed. As a result, noise which is in synchronization with a measurement frequency or a transmission frequency of an ultrasonic wave is never in the same phase but dispersed/ averaged when the ultrasonic wave is received. Therefore, a measurement error can be decreased.

The periodicity change means changes the frequency setting of the second frequency. Thus, since the reception detecting timing is changed by changing the vibration of the ultrasonic wave transducer that transmits an ultrasonic wave, the periodicity of the flow rate measurement can be disturbed. As a result, noise which is in synchronization with a measurement frequency or a transmission frequency of an ultrasonic wave is never in the same phase but dispersed when the ultrasonic wave is received. Therefore, a measurement error can be decreased.

The periodicity change means includes a delay section capable of setting different delay times; and the control section changes the setting of the delay at each transmission of an ultrasonic wave or at each receipt detection of an ultrasonic wave. Thus, in one measurement operation, reverberation of an ultrasonic wave transmitted in an immediately-previous measurement and an influence of tailing of the ultrasonic wave transducers can be dispersed, whereby a measurement error can be decreased.

The cycle width changed by the periodicity change means is a multiple of a value corresponding to a variation of a propagation time which is caused by a measurement error. Thus, when the measured values for all the settings are summed up and averaged, an error can be suppressed to a minimum.

The cycle width changed by the periodicity change means is equal to a cycle of a resonance frequency of the ultrasonic wave transducers. Thus, in a value obtained by summing up and averaging the measured values for all the settings, a measurement error which may be caused by reverberation of an ultrasonic wave or tailing of the ultrasonic wave transducers is minimum. Thus, the measurement error can be decreased.

The order of patterns for changing the periodicity is the same for both measurement in a upstream direction and measurement in a downstream direction. Thus, the measurement with an ultrasonic wave transmitted toward the upstream side and the measurement with an ultrasonic wave transmitted toward the downstream side are always performed under the same conditions. Hence, even when there is a variation in the flow rate, a reliable measurement result can be obtained.

The predetermined number of times is a multiple of a change number of the periodicity change means. Thus, all the setting values of the periodicity change means are uniformly set within a single flow rate measurement operation. As a result, a reliable measurement result can be obtained.

A flowmeter of the present invention includes: a flow rate measurement section through which fluid to be measured flows; a pair of ultrasonic wave transducers provided in the flow rate measurement section for transmitting/receiving an ultrasonic wave; a driver circuit for driving one of the ultrasonic wave transducers; a reception detecting circuit connected to the other ultrasonic wave transducer for detecting an ultrasonic wave signal; a first timer for measuring a propagation time of the ultrasonic wave signal; a second timer for measuring a time period from when the reception detecting circuit detects a receipt to when a value of the first timer changes; a control section for controlling the driver circuit; and a calculation section for calculating a flow rate from outputs of the first timer and second timer, wherein the second timer is corrected by the first timer. Since the flow rate calculation is performed using a value obtained by subtracting a value of the second timer from a value of the first timer, the time measurement resolution is equal to that of the second timer. Further, since the operation time of the second timer is very short, the amount of consumed power can be decreased. Thus, a flowmeter with high resolution which consumes a small amount of power can be realized. Furthermore, a correct flow rate measurement can be achieved so long as the second timer operates in a stable manner after the correction is made until flow rate measurement is performed. Therefore, a correct measurement can be performed even when the second timer lacks longterm stability. Thus, a flowmeter with a high accuracy can be realized with ordinarily-employed parts.

The flowmeter includes a temperature sensor, wherein the second timer is corrected by the first timer when an output of the temperature sensor varies so as to be equal to or greater than a set value. Thus, even when the second timer has a characteristic which varies according to a variation in the temperature, the second timer is corrected every time a temperature variation occurs, whereby correct measurement can be performed. Furthermore, such a correction is made only when it is necessary, the amount of consumed power can be decreased.

The flowmeter includes a voltage sensor for detecting the power supply voltage of the circuit, wherein the second timer is corrected by the first timer when an output of the voltage sensor varies so as to be equal to or greater than a set value. Thus, even when the second timer has a characteristic which varies according to a variation in the power supply voltage, the second timer is corrected every time a variation occurs in the power supply voltage, whereby correct measurement can be performed. Furthermore, it is not necessary to periodically make a correction, the amount of consumed power can be decreased.

A flowmeter of the present invention includes: a flow rate measurement section through which fluid to be measured flows; a pair of ultrasonic wave transducers provided in the flow rate measurement section for transmitting/receiving an ultrasonic wave; a driver circuit for driving one of the ultrasonic wave transducers; a reception detecting circuit connected to the other ultrasonic wave transducer for detecting an ultrasonic wave signal; a control section for controlling the driver circuit for a predetermined number of times so as to drive the ultrasonic wave transducers again in response to an output of the reception detecting circuit; a timer for measuring an elapsed time for the predetermined number of times: a calculation section for calculating a flow rate from an output of the timer; and periodicity stabilizing means for sequentially changing a driving method of the driver circuit, wherein the control section controls the periodicity stabilizing means such that a measurement frequency is always maintained to be constant. With this structure, the measurement frequency is always constant even when a propagation time varies. Thus, noise which is in synchronization with a measurement frequency or a transmission frequency of an ultrasonic wave is always in the same phase when the ultrasonic wave is received regardless of a variation in the propagation time. Therefore, a measurement error can be maintained as a constant value. Accordingly, the flow rate measurement can be stabilized even when the noise has a very long periodic noise.

The control section includes periodicity stabilizing means formed by a delay section capable of setting different delay times; and the control section changes an output timing of the driver circuit by switching the delay times. Since the measurement frequency is maintained to be constant by changing the delay time, the measurement frequency can be stabilized without giving an influence to driving of the ultrasonic wave transducers.

The control section controls the driver circuit such that a measurement time is maintained to be constant. Thus, the measurement frequency can be maintained to be constant with a simple calculation without calculating a propagation time for each ultrasonic wave transmission.

BRIEF DESCRIPTION OF DRAWINGS

FIG. 27 is a flowchart showing an operation of the flowmeter according to embodiment 10.

DETAILED DESCRIPTION

Hereinafter, embodiments of the present invention will be described with reference to the drawings.

EMBODIMENT 1

Figure 1:
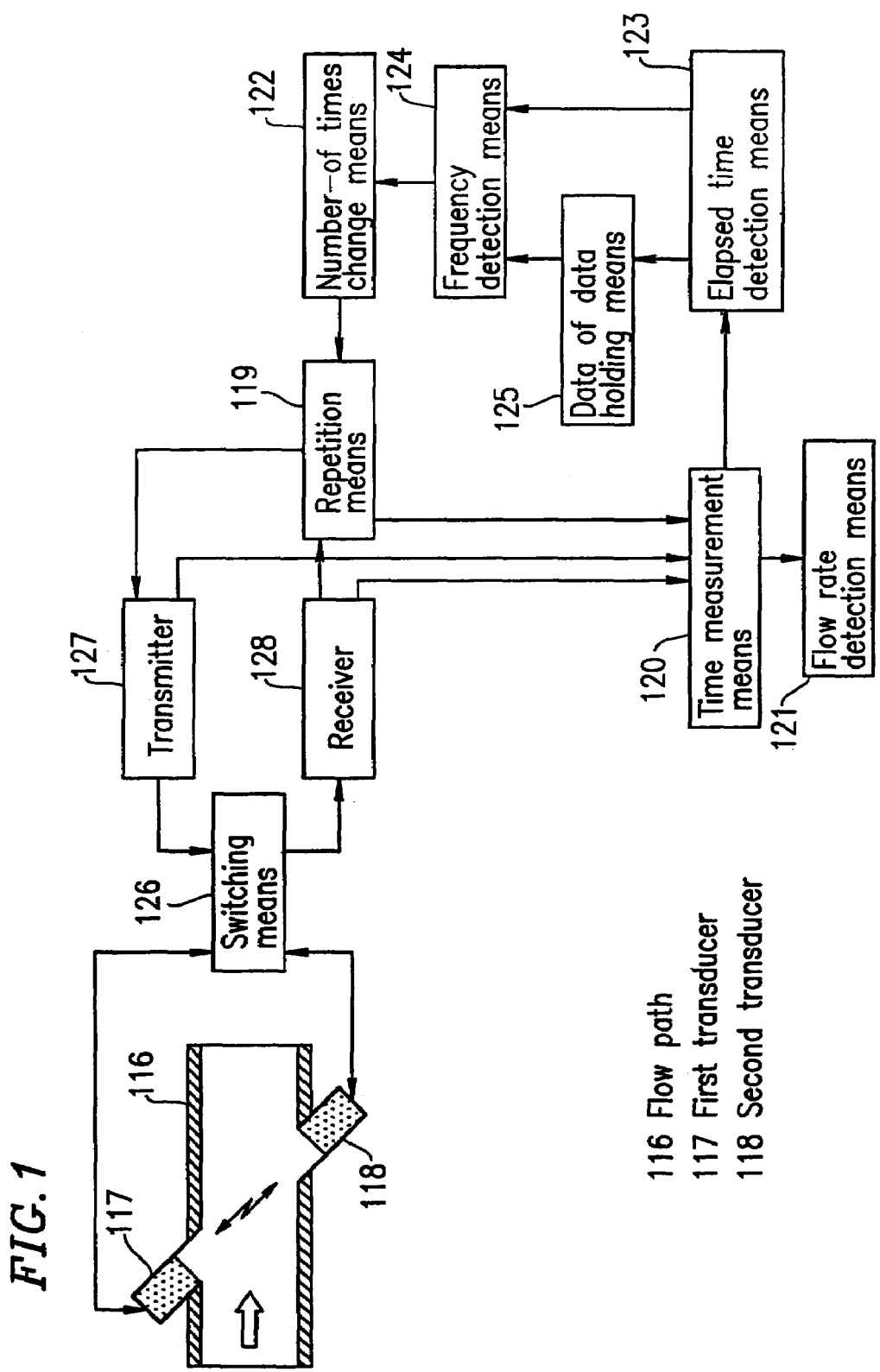
FIG. 1 is a block diagram showing a flowmeter according to embodiment 1 of the present invention.

FIG. 1 is a block diagram showing a flowmeter according to embodiment 1 of the present invention. In FIG. 1, reference numeral 117 is first transmission/reception means which is provided in a flow path 116 and which functions as transmission/reception means for transmitting/receiving a signal by using propagation of a sonic wave as a state change in a fluid. Reference numeral 118 is second transmission/reception means as transmission/reception means. Reference numeral 119 is repetition means for repeating signal propagation between the first transmission/reception means 117 and the second transmission/reception means 118. Reference numeral 120 is time measurement means for measuring a propagation time of a sonic wave propagated during the repetition in the repetition means 119. Reference numeral 121 is flow rate detection means for detecting the flow rate based on a value from the time measurement means 120. Reference numeral 122 is number-of-times change means for successively making a change to a predetermined number of repetition times. Furthermore, an elapsed time detection means 123 for detecting halfway information concerning the propagation time of propagation repeated in the repetition section 119, frequency detection means 124 for detecting the frequency of a variation in flow rate from the information of the elapsed time detection means 123, and number-of-times change means 122 for making a change to a setting such that the measurement time is substantially a multiple of one cycle of the frequency detected in the frequency detection means 124, are included. Herein, data stored in data holding means 125 holds one propagation time of transmission/reception which has been obtained by elapsed time detection means 123. The frequency is detected by the frequency detection means 124 by comparing data held by the data holding means 125 with data of a measured propagation time. Reference numeral 126 is switching means for switching operations of transmission/reception between the first transducer 117 and the second transducer 118. Reference numeral 127 is a transmitter for transmitting an ultrasonic signal. Reference numeral 128 is a receiver for receiving an ultrasonic signal.

Figure 2:
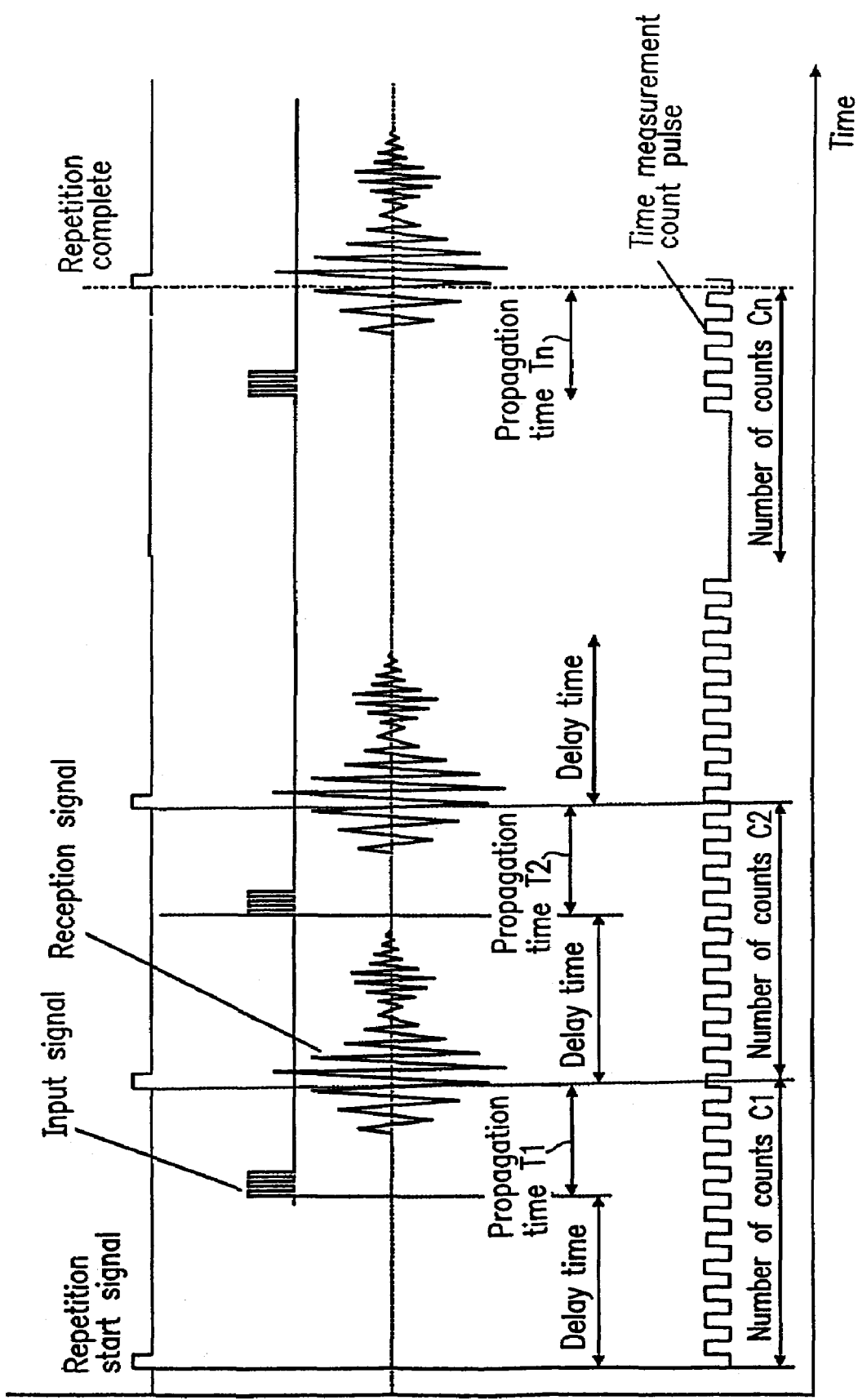
FIG. 2 is a timing chart illustrating an operation of the flowmeter of embodiment 1.
Figure 3:
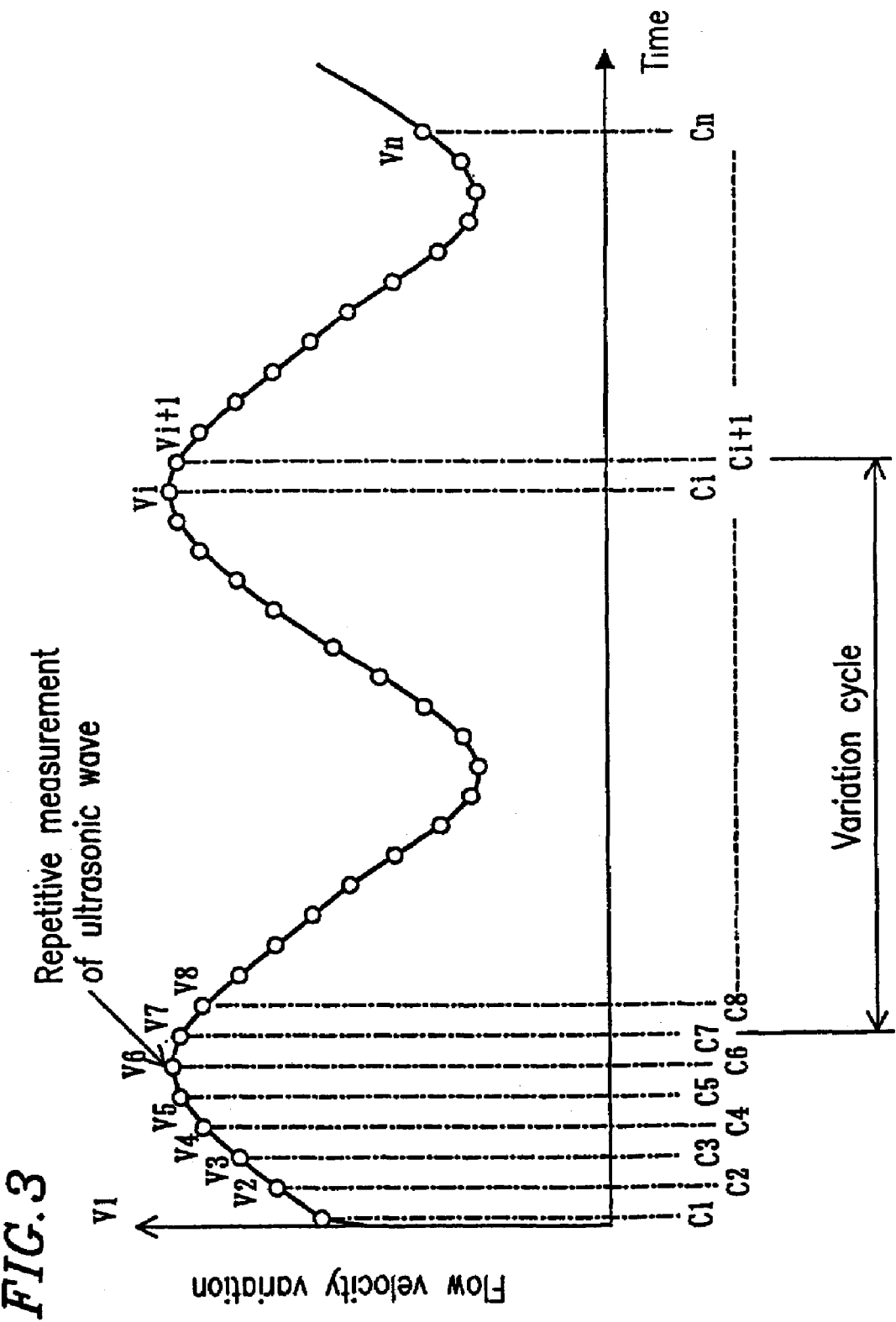
FIG. 3 is a variation waveform graph for illustrating the operation of the flowmeter of embodiment 1.

Next, an operation and function of the flowmeter are described with reference to FIGS. 2 through 5. As shown in FIG. 2, in a flowmeter of the present invention, measurement begins in response to a repetition start signal. An input signal is input to the first transducer, and the first transducer vibrates to transmit a sonic wave. The sonic wave is received by the second transducer. The propagation time of the sonic signal is measured by the time measurement means based on a predetermined clock count. The delay time in the drawing is a fixed waiting time which is provided for waiting for attenuation of the sound wave. After detecting a counted value of the delay time and propagation time as $C_i$, an input signal is again input to the first transducer to transmit a sonic wave, and the sonic wave is received by the second transducer. This repetitive measurement is performed a predetermined number of times. The count number received by the second transducer, $C_i+_1$, is compared with the previous count number $C_i$, so as to detect the frequency of repetitively occurring flow rate variation. For example, as shown in FIG. 3, comparing points V5 and V6 of the flow rate variation, the difference between the count numbers, $C_{5-C6}$, is a negative value. However, comparing points V6 and V7 of the flow rate variation, the difference between the count numbers, $C_{6-C7}$, is a positive value. That is, the sign is inverted. Then, again, the time when the difference between the count values, $C_{i-Ci+1}$, changes from a negative value to a positive value is determined for each repetition according to the processing shown in the flowchart of FIG. 4, whereby the frequency is detected.

Figure 4:
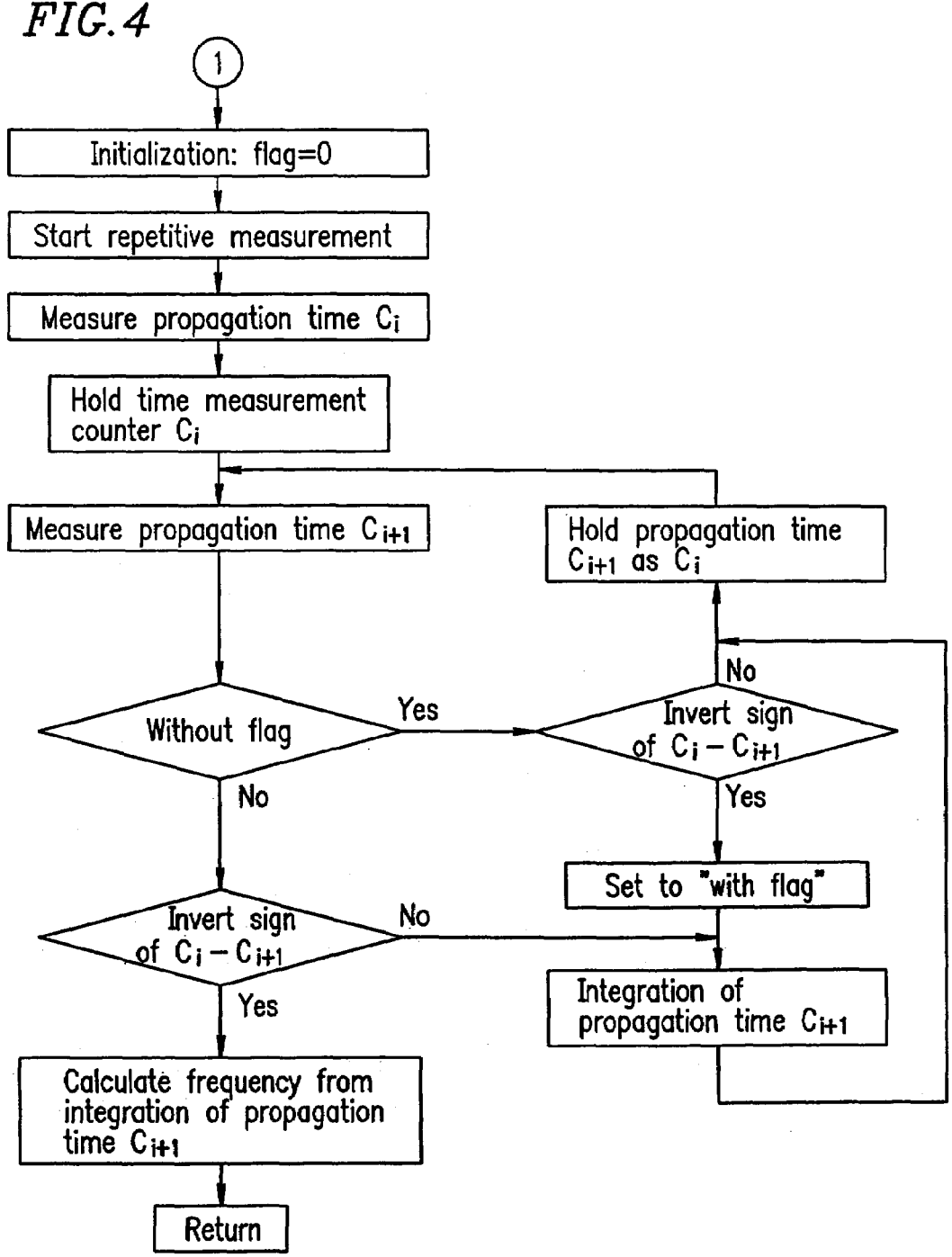
FIG. 4 is a flowchart showing an operation of the flowmeter of embodiment 1.
Figure 5:
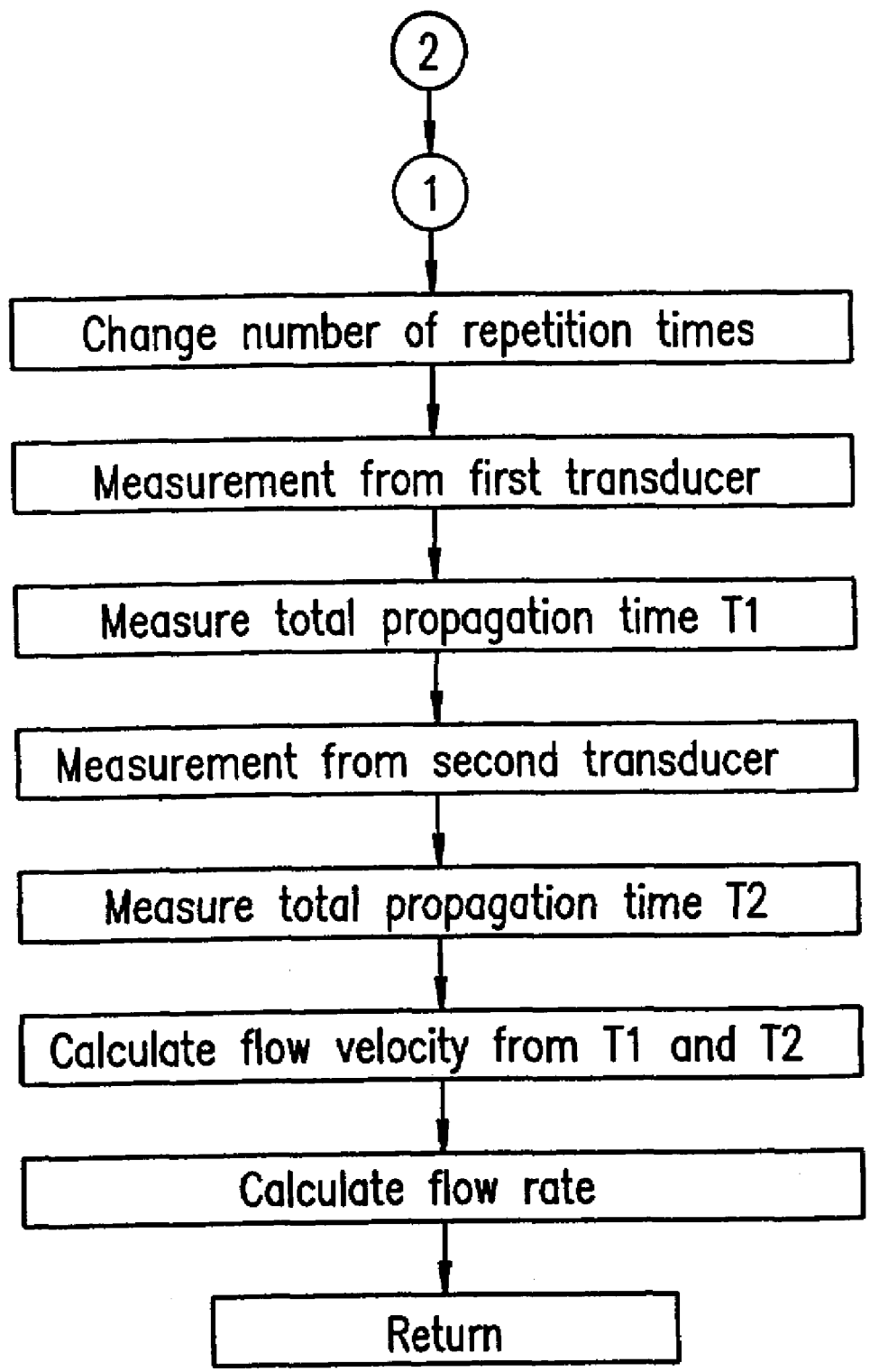
FIG. 5 is a flowchart showing an operation of the flowmeter of embodiment 1.

The flowchart of FIG. 4 shows a flow of frequency detection. Specifically, FIG. 4 shows that one time measurement counter is held for comparison with the next time measurement counter, whereby a change in a flow rate variation is detected. Furthermore, as shown in FIG. 5, the processing 1 and number-of-times change means are performed before every flow rate measurement. In this way, the frequency is detected, and in that cycle, measurement of a propagation time is repeatedly performed. Hence, the flow rate is measured without being affected by a variation because the measured flow rate is averaged by measuring at an interval of one cycle of the variation even when there is a variation in the flow. When measurement is performed not only within one cycle but also over a plurality of cycles, the flow rate measurement can be performed with a high accuracy in a more reliable manner.

The method for detecting the frequency by use of an inversion of the sign of the difference between the count values has been described. However, detection of the frequency may be achieved by detecting a point at which the difference is maximum, or by detecting a point at which a count value nearest to the held count value is counted again. Further, the detection method which utilizes a comparison with one held data has been described. However, the frequency may be detected by using an autocorrelation or frequency analysis method with a plurality of held data, or by obtaining a difference among a plurality of held data as described above.

Thus, the flowmeter does not require means for detecting a variation in a flow, i.e., the structure thereof can be simplified. The frequency is detected from the halfway information of the time measurement means before the flow rate detection is performed such that the time for the repetitive measurement is a multiple of one cycle of the variation frequency. Therefore, the flow rate measurement can be performed with a high accuracy in a reliable manner. Time measurement information at each moment is held and compared by the data holding means, whereby the frequency can be detected at each occasion. Furthermore, by successively changing the number of repetition times, an influence caused due to a change in a variation of a flow can be suppressed, hence a reliable flow rate measurement can be achieved. Still further, the number of repetition times is set so as to be a multiple of one cycle of the variation frequency before the flow rate measurement is performed. Thus, a variation in a flow is averaged, and as a result, the flow rate measurement can be performed with a high accuracy in a reliable manner.

EMBODIMENT 2

Figure 6:
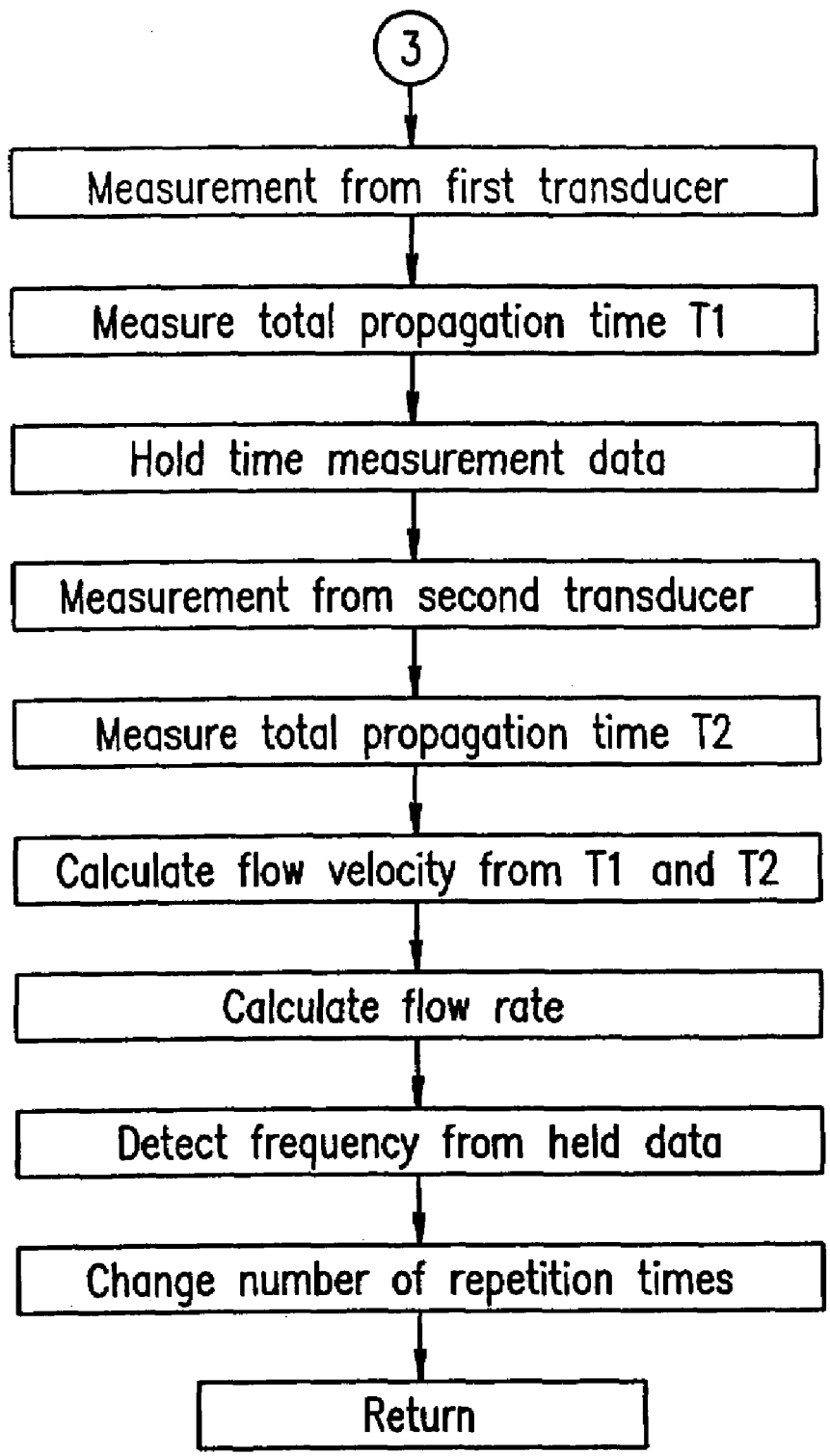
FIG. 6 is a flowchart showing an operation of a flowmeter according to embodiment 2 of the present invention.

FIG. 6 is a flowchart showing an operation of a flowmeter according to embodiment 2 of the present invention. Embodiment 2 is different from embodiment 1 in that the process of embodiment 2 is structured such that the number of repetition times which is determined according to a frequency obtained by the frequency detection means is used in the next flow rate measurement. The structure of the flowmeter in embodiment 2 is the same as that shown in FIG. 1.

As shown in FIG. 6, measurement of propagation time T1 of an ultrasonic wave propagating from the first transducer is performed, while time measurement information C of the measurement means at that time is held in the data holding means. Measurement of propagation time T2 of an ultrasonic wave propagating from the second transducer is then performed, and the flow velocity and flow rate are calculated from times T1 and T2. Then, the frequency of a flow variation is detected from the held time measurement information $C_i$ by using a method described in embodiment 1, and the number of repetition times for the next measurement is changed such that the detected frequency is reflected in the next measurement.

In this way, the detected frequency of a flow variation is used in the next measurement, whereby the flow rate measurement and the frequency can be simultaneously performed. It is not necessary to perform repetitive measurement of sonic wave propagation only for detecting the variation frequency, and accordingly, the current consumption can be decreased. The number of repetition times can be set according to the variation frequency, so that the variation is averaged, and the flow rate can be measured with a high accuracy in a reliable manner.

EMBODIMENT 3

Figure 7:
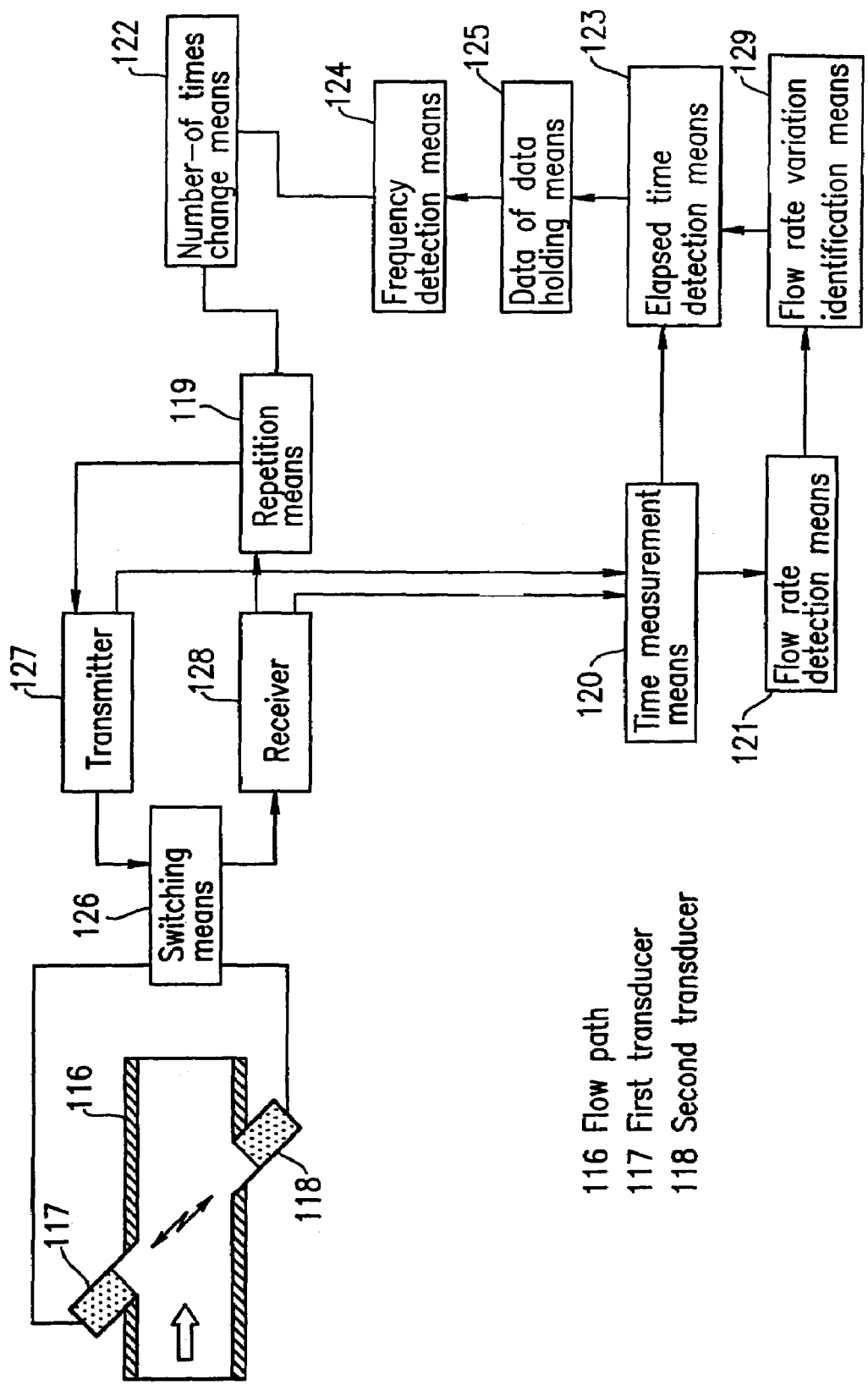
FIG. 7 is a block diagram showing a flowmeter according to embodiment 3 of the present invention.

FIG. 7 is a block diagram of a flowmeter according to embodiment 3 of the present invention. Embodiment 3 is different from embodiment 1 in that the flowmeter of embodiment 3 includes: flow rate variation identification means 129 to determine the magnitude of a flow rate variation detected by the flow rate detection means 121; and number-of-times change means 122 for changing the number of repetition times such that the flow rate variation identified by the flow rate variation identification means 129 is decreased, and that the flow rate variation identification means 129 operates using a standard deviation of the flow rate.

Figure 8:
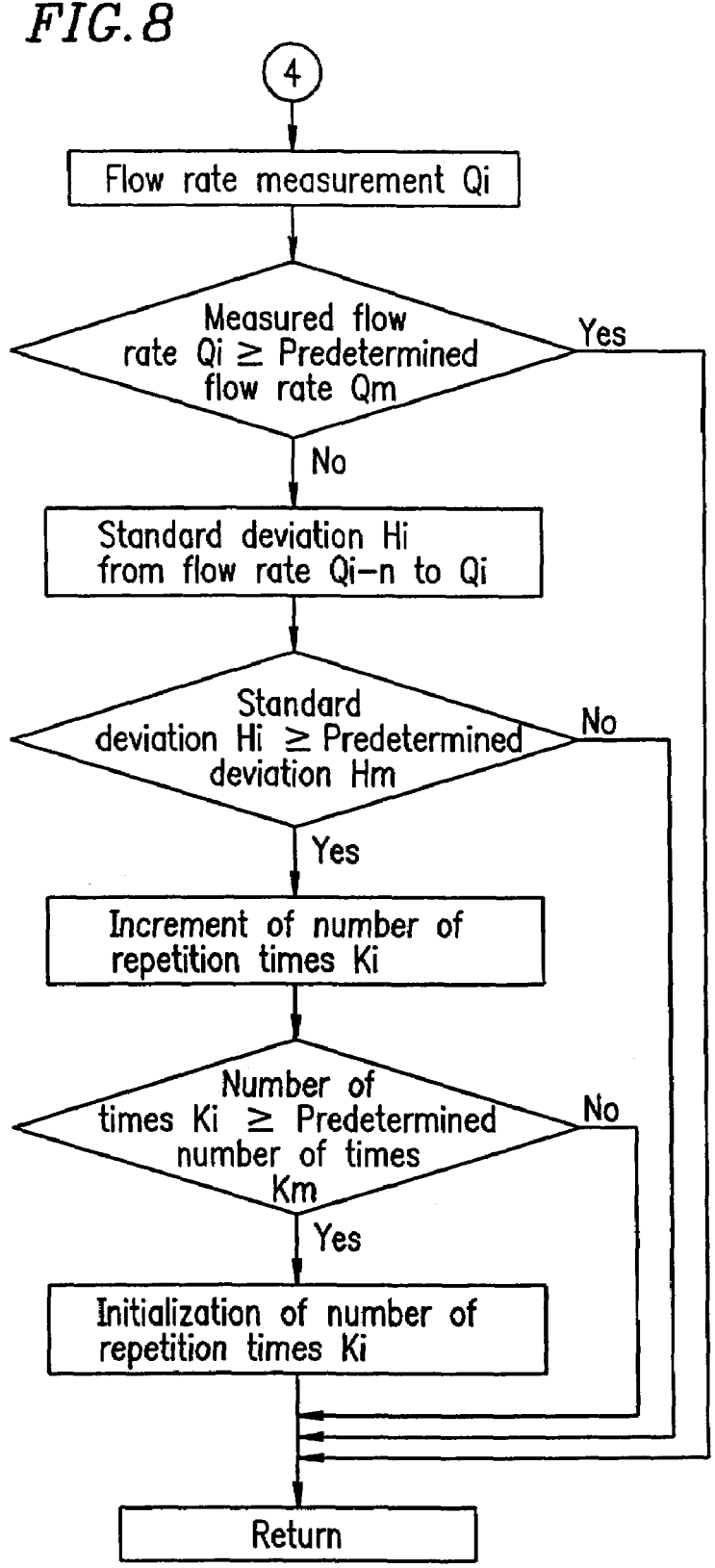
FIG. 8 is a flowchart showing an operation of the flowmeter of embodiment 3.

As shown in the flowchart of FIG. 8, the flow rate Qi is first measured. When the flow rate is equal to or higher than a predetermined value Qm (for example, 100 liter/hour), the number of repetition times is kept unchanged. When the flow rate is lower than a predetermined value Qm, standard deviation Hi is obtained based on n pieces of data before the measured flow rate Qi. When the standard deviation Hi is equal to or greater than a predetermined value Hm (for example, 1 liter/hour), the number of repetition times is changed. At this time, the number of repetition times is changed (increased) from an initial value 10 by a predetermined value dK (for example, two times). When the number of repetition times is equal to or greater than a predetermined number of times, Km, the number of repetition times is reset to the initial value and changed again from the first.

In this way, only when the measured flow rate is lower than a predetermined flow rate, the number of repetition times is changed, whereby the process is stopped when the flow rate is high, and accordingly, the consumed power is decreased. When the standard deviation is equal to or greater than a predetermined value, the number of repetition times is changed such that the flow rate variation becomes small, whereby the flow rate measurement can be achieved with a high accuracy in a reliable manner even when there is a variation in a flow. A flow rate variation is identified by using the standard deviation, whereby a variation can be correctly detected. Further, the number of repetition times is gradually changed in an incremental manner, whereby the necessary number of repetition times can be determined because the repetition number can be examined from a small number of times.

Figure 9:
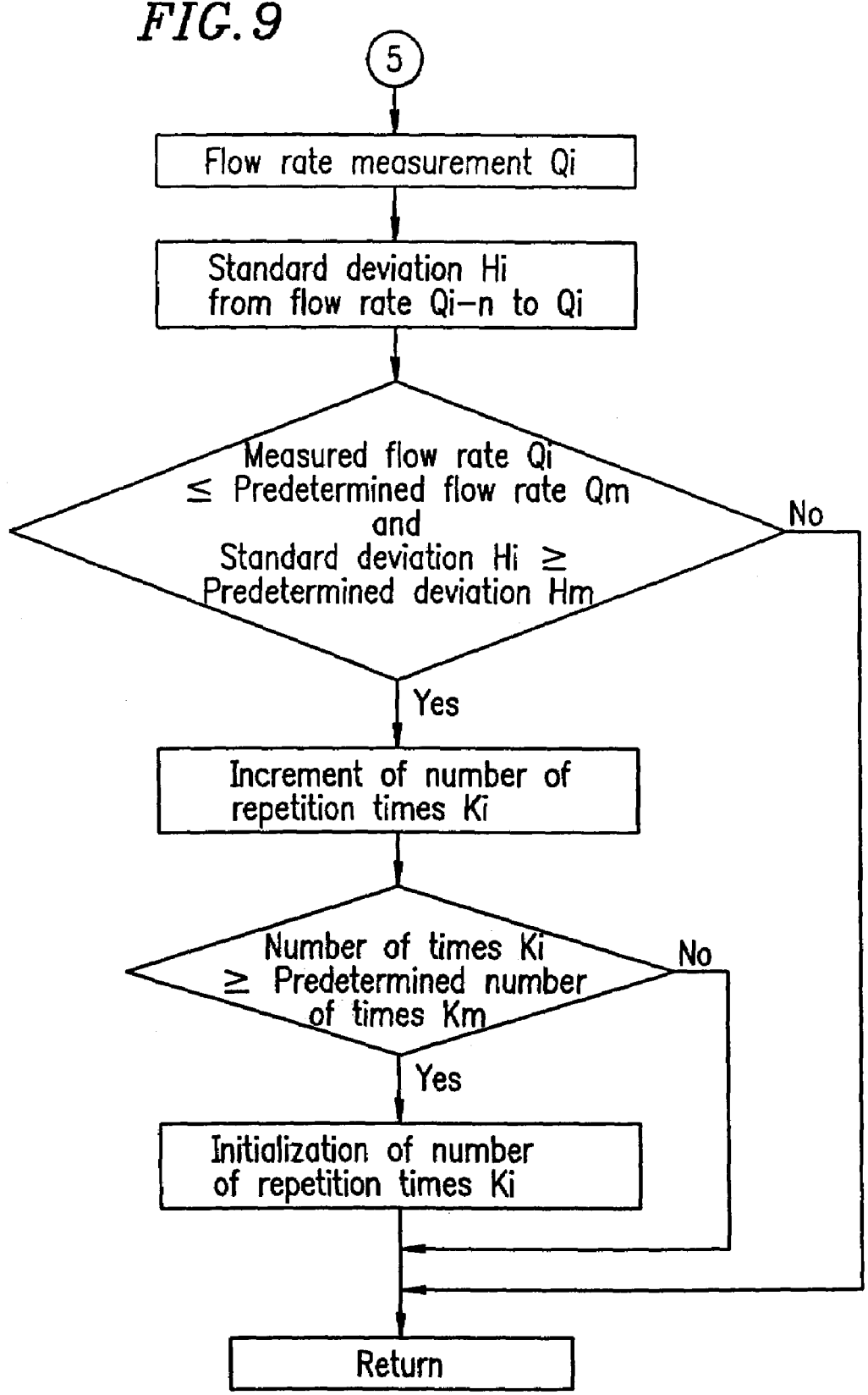
FIG. 9 is another flowchart showing an operation of the flowmeter of embodiment 3.

As shown in FIG. 9, only when the measure flow rate is equal to or lower than a predetermined flow rate, and the standard deviation is equal to or higher than a predetermined value, the number-of-repetition-times change means operates, so that the number of times that the operation of changing the number of times is performed is further restricted, and accordingly, the consumed power can be decreased.

In the above-described method, the number of times is changed in a gradual incremental manner. However, if the standard deviation when the number of times is changed is increased, the number of times may be decrementally changed. In such a case, when the direction of change of the number of times, i.e., increment or decrement, is controlled according to a variation of the standard deviation, measurement can be performed in a more reliable manner. Further, when an electric battery cell is used as the power source of the flowmeter, the consumed power is decreased, and accordingly, the flowmeter can be used over a long time period.

EMBODIMENT 4

Figure 10:
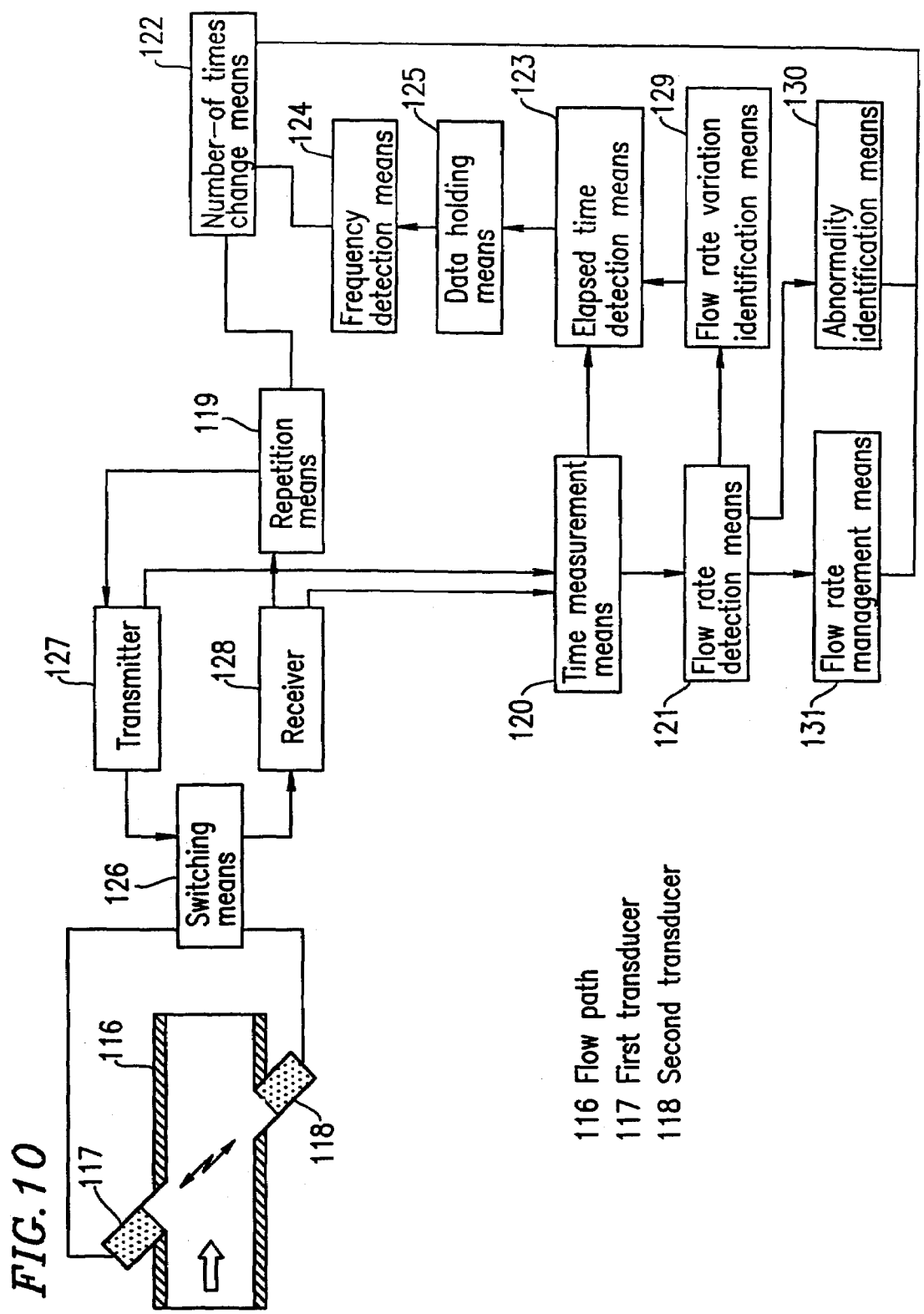
FIG. 10 is a block diagram showing a flowmeter according to embodiment 4 of the present invention.

FIG. 10 is a block diagram of a flowmeter according to embodiment 4 of the present invention. Embodiment 4 is different from embodiment 1 in that the flowmeter of embodiment 4 includes abnormality identification means 130 and flow rate management means 131. The number-of-times change means operates during the execution of processing in the abnormality identification means 130 as predetermined processing and during the execution of processing in the flow rate management means 131.

Figure 11:
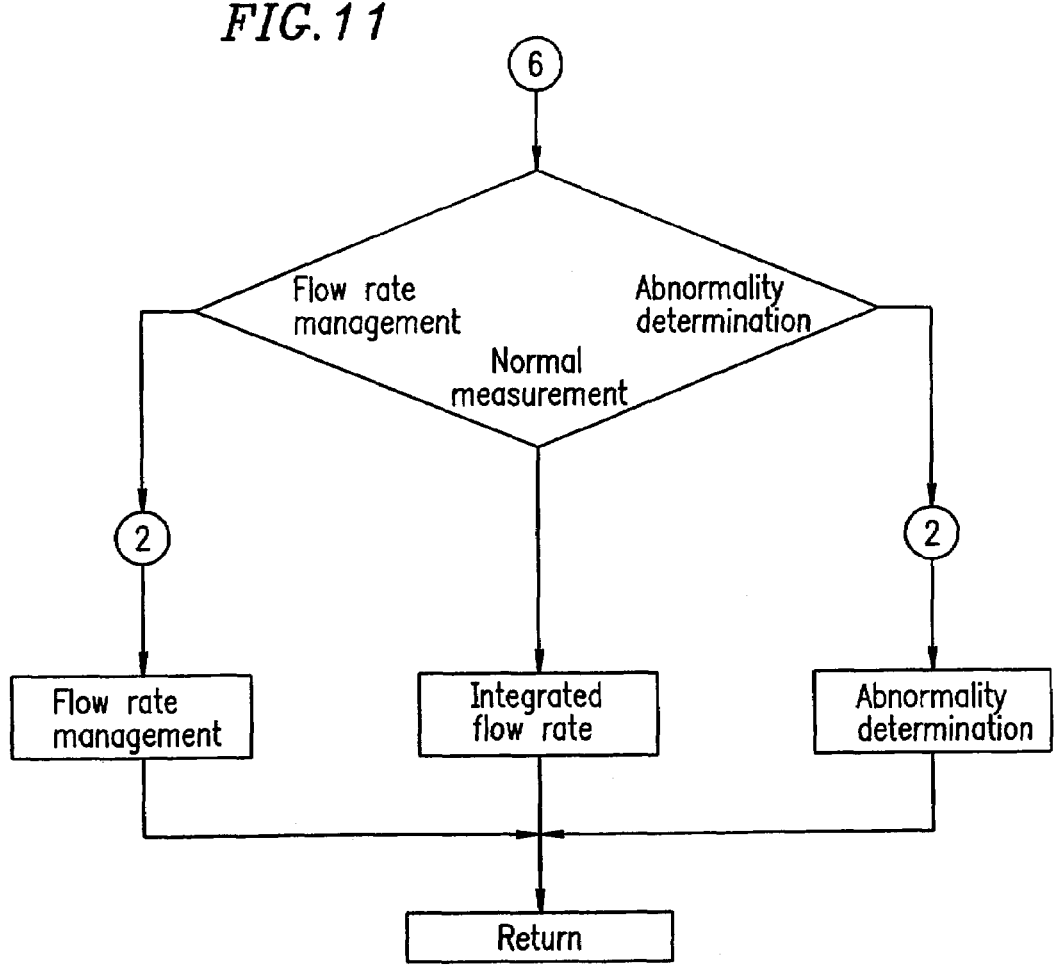
FIG. 11 is a flowchart showing an operation of the flowmeter of embodiment 4.

As in the flowchart shown in FIG. 11, the number of repetition times is changed during the execution of the processing in the abnormality identification means, and during the execution of processing in the flow rate management means. The number of repetition times can be changed only when it is necessary, so that the consumed power can be decreased. That is, in consideration of an urgency of executing abnormality identification, the flow rate should be measured within a short space of time. In a flow rate measurement method which is executed in accordance with a variation in a flow, abnormality identification is slow. When the number of repetition times is changed in accordance with the variation frequency before performing measurement, the measurement can be achieved within a short space of time. Furthermore, the flow rate management is performed for managing what load is used in the downstream side. It is necessary to detect and identify the flow rate within a short space of time. Similar to abnormality identification, the number of repetition times is changed so as to conform to the variation frequency before performing measurement, whereby the measurement can be achieved within a short space of time.

EMBODIMENT 5

Figure 12:
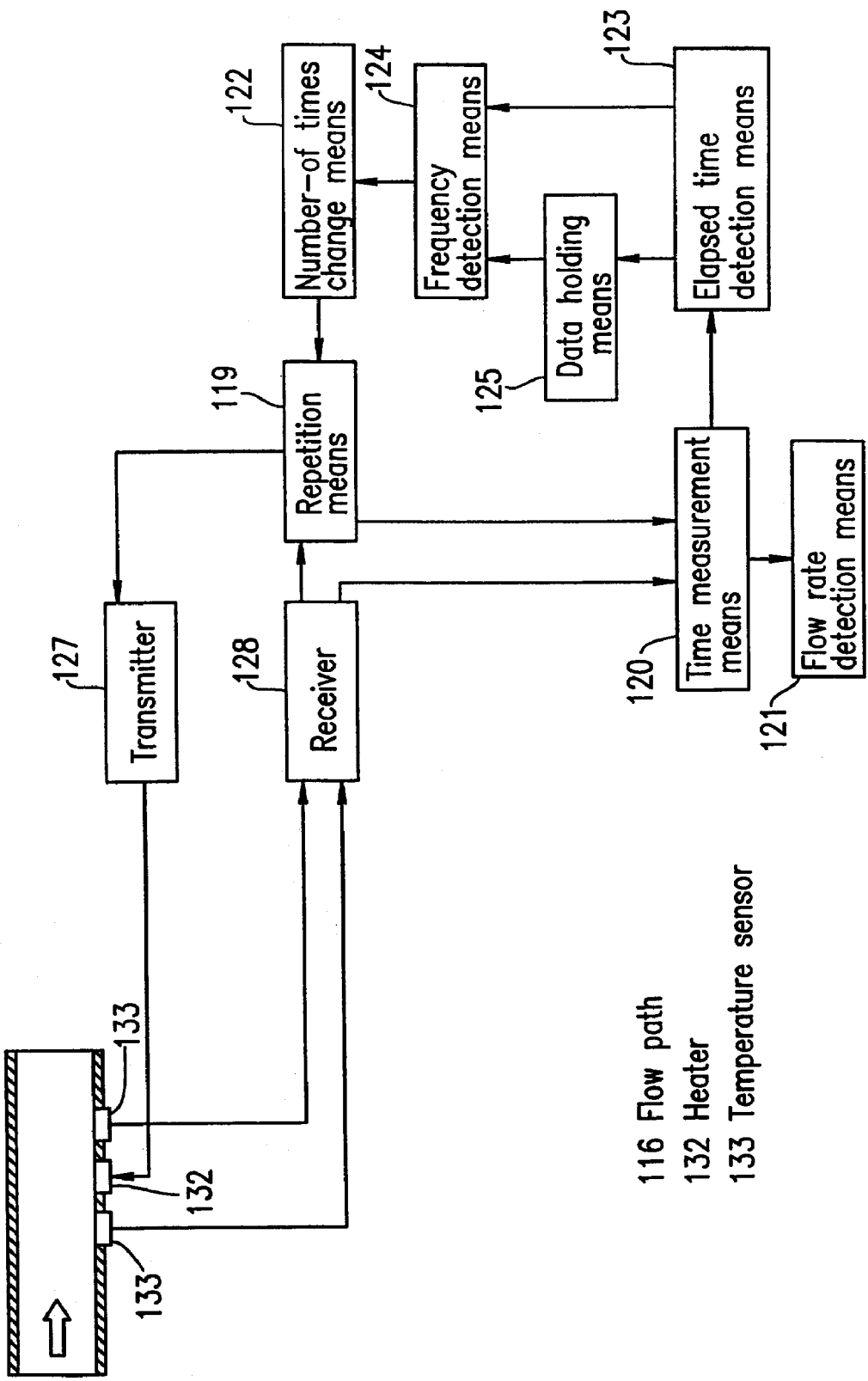
FIG. 12 is a block diagram showing a flowmeter according to embodiment 5 of the present invention.

FIG. 12 is a block diagram of a flowmeter according to embodiment 5 of the present invention. Embodiment 5 is different from embodiment 1 in that the transmission/reception means utilizes propagation of heat for detecting a change in the state of fluid. Reference numeral 132 denotes a heater for emitting heat, and reference numeral 133 denotes a temperature sensor for receiving the heat.

Also in the case where the transmission means and the reception means utilize heat, the variation frequency can be detected from the variation in a heat propagation time, and accordingly, the structure can be simplified. Further, the times to perform repetitive measurement can be changed. When the number of repetition times is a multiple of one cycle of the variation frequency, the flow rate measurement can be performed with a high accuracy in a reliable manner. Furthermore, the number of times of successive repetition can be changed according to a change in a flow variation, and an influence of variation can be quickly suppressed, whereby the flow rate measurement can be performed in a reliable manner. Further still, immediately before performing flow rate measurement, the number of repetition times is set to a multiple of one cycle of the variation frequency, and accordingly, a variation of a flow is averaged, so that the flow rate measurement can be performed with a high accuracy in a reliable manner.

EMBODIMENT 6

Figure 13:
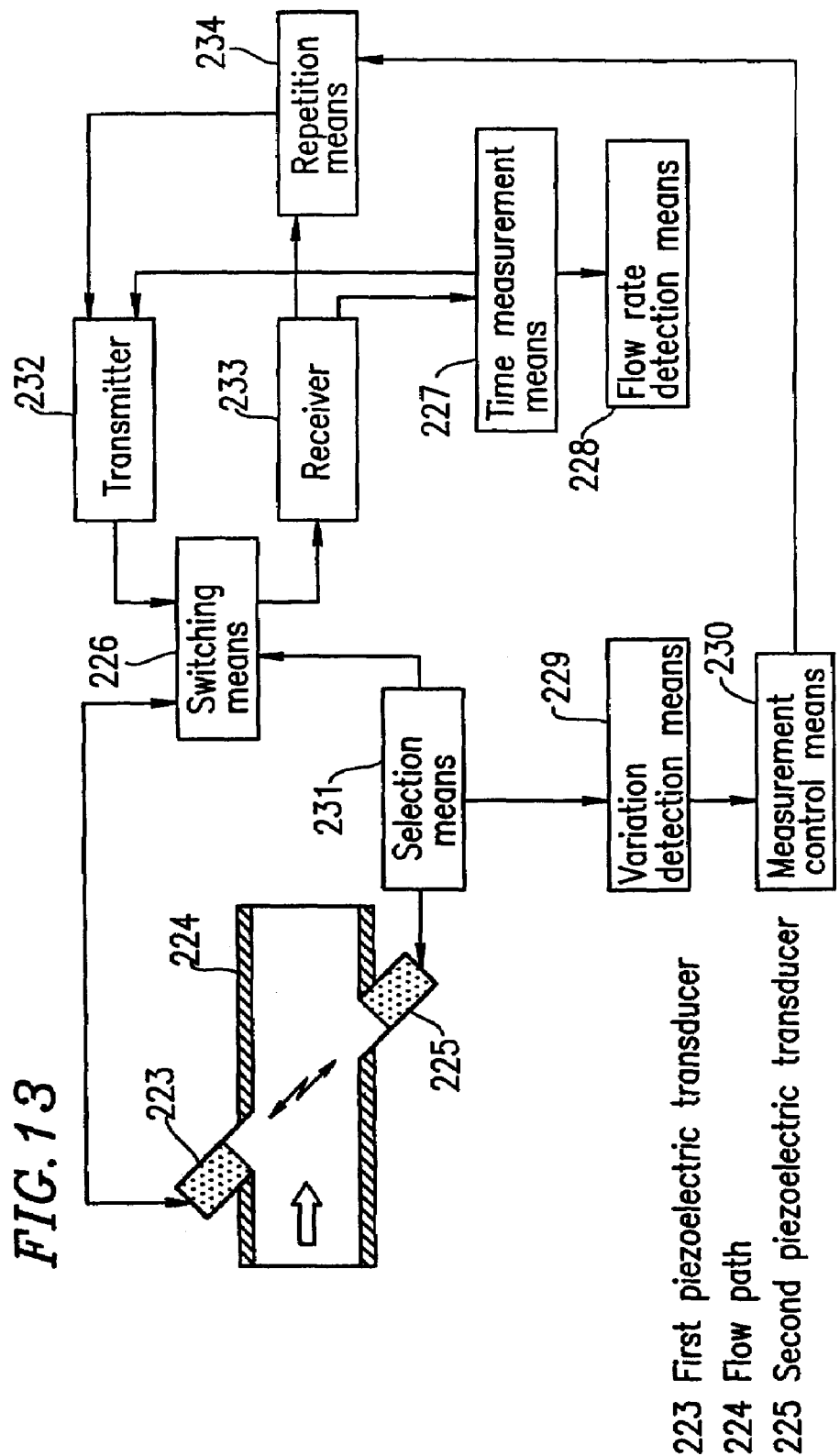
FIG. 13 is a block diagram showing a flowmeter according to embodiment 6 of the present invention.

FIG. 13 is a block diagram showing a flowmeter according to embodiment 6 of the present invention. In FIG. 13, reference numeral 223 denotes a first piezoelectric transducer, which is first vibration means of transmission/reception means that is provided in a flow path 224 and that performs transmission/reception using an ultrasonic wave as a state change of fluid. Reference numeral 225 denotes a second piezoelectric transducer, which is second vibration means of transmission/reception means that performs transmission/reception of an ultrasonic wave. Reference numeral 226 denotes a switch (switching means) for switching a transmission/reception operation of the first piezoelectric transducer and the second piezoelectric transducer. Reference numeral 227 denotes time measurement means for measuring by a sing-around method a propagation time of a sonic wave repeatedly transmitted/received between the first piezoelectric transducer 223 and the second piezoelectric transducer 225. Reference numeral 228 denotes flow rate detection means for detecting the flow rate based on a value of the time measurement means. Reference numeral 229 denotes variation detection means for measuring a pressure variation in the flow path by using the first piezoelectric transducer 223 and the second piezoelectric transducer 225. Reference numeral 230 denotes measurement control means for starting measurement in synchronization with a timing of the pressure variation detected by the variation detection means.

The measurement control means 230 performs measurement control such that measurement of a first measurement time T1 is started at a rising edge of an output of the variation detection means 229, and measurement of a second measurement time T2 is started at a falling edge of the output of the variation detection means 229. The measurement control means 230 performs measurement start control such that, for the next measurement, measurement of a first measurement time T1 is performed at a falling edge of the output of the variation detection means, and measurement of a second measurement time T2 is performed at a rising edge of the output of the variation detection means. The flow rate measurement means 228 calculates the flow rate by successively averaging the first flow rate obtained using the previous first measurement time T1 and the second measurement time T2, while alternately changing the start of measurement, with the second flow rate obtained using the next first measurement time T1 and the second measurement time T2. Reference numeral 231 denotes a selection switch as selection means for switching between a transmission/reception operation of an ultrasonic wave by using the second piezoelectric transducer and a pressure variation detection operation. Reference numeral 232 denotes a transmitter of an ultrasonic signal. Reference numeral 233 denotes a receiver of an ultrasonic signal. Reference numeral 234 denotes repetition means for performing a singaround measurement. Reference numeral 235 denotes operation check means for checking the operations of the first piezoelectric transducer and the second piezoelectric transducer.

Next, an operation and function are described with reference to FIGS. 14 through 19. In a flow path having a structure shown in FIG. 14, propagation time T1 of an ultrasonic wave from the first piezoelectric transducer 223 to the second piezoelectric transducer 225 is T1=L/(C+Vcosθ). Propagation time T2 of an ultrasonic wave from the second piezoelectric transducer 225 to the first piezoelectric transducer 223 is T2=L/(C−Vcos θ). Herein, V denotes a flow velocity in the flow path, C denotes acoustic velocity, and θ denotes an angle of inclination. With the difference of inverse numbers of T1 and T2, the flow velocity V is obtained from T1 and T2 as shown in the following expression:

$1/T1-1/T2=2V \cos \theta /L$ $V=(L/2 \cos \theta) \cdot (1/T1-1/T2)$

If there is a pressure variation in the flow path, the flow velocity changes according to the pressure variation. Thus, T1 and T2 are expressed as follows:

$T1=L/(C+V \cos \theta + u \cdot \sin (2\pi ft))$ $T2=L/(C-V \cos \theta - u \cdot \sin (2\pi ft+\psi))$ where f denotes variation frequency, u denotes variation flow velocity, and ψ denotes a difference between a start time of T1 measurement and a start time of T2 measurement (phase difference). The difference between the inverse numbers of T1 and T2 is expressed as follows:

$$1/T1 - 1/T2$$

$$= (2V\cos\theta + u\cdot(\sin(2\pi ft) + \sin(2\pi ft + \psi)))/L$$

When $\psi = \pi$, $\sin(2\pi ft + \psi) = \sin(2\pi ft)$. That is, an influence of the variation is cancelled. Thus, $$V = (L/2\cos\theta)\cdot(1/T1 - 1/T2)$$

That is, the flow velocity V can be measured when there is a variation, and the flow rate can be measured in consideration of the cross-sectional area of the flow path. In the above example, the measurement based on a single transmission/reception operation has been described. However, in the case where the integrated time is obtained by a sing-around method where the propagation time is repeatedly measured by the repetition means 234, T1 and T2 can be expressed similarly as shown in the following expressions:

$$T1 = \Sigma[L/(C + V\cos\theta + u\cdot\sin(2\pi fti))]$$
$$= \Sigma L/(\Sigma(C + V\cos\theta) + \Sigma(u\cdot\sin(2\pi fti)))$$

$$T2 = \Sigma[L/(C - V\cos\theta - u\cdot\sin(2\pi fti + \psi))]$$
$$= \Sigma L/(\Sigma(C + V\cos\theta) + \Sigma(u\cdot\sin(2\pi fti + \psi)))$$

where i denotes the number of times of sing-around, and $\Sigma$ denotes an integration from i=1 to N. The sing-around method is a method where transmission/reception of an ultrasonic wave is repeated, whereby a long total propagation time is obtained, and accordingly, the measurement accuracy is increased. Herein, the details of measurement processing of the sing-around method are omitted.

From the difference of the inverse numbers of T1 and T2, the following expression can be obtained:

$$1/T1 - 1/T2$$
$$= (\Sigma[2V\cos\theta] + \Sigma[u\cdot(\sin(2\pi ft)) +$$
$$\Sigma[u\cdot\sin(2\pi ft + \psi)])/\Sigma L$$

When $\psi = \pi$, $\sin(2\pi ft + \psi) = -\sin(2\pi ft)$. That is, an influence of the variation is cancelled when the sing-around method is used. Thus, $$V = (L/2\cos\theta)\cdot(1/T1 - 1/T2)$$

That is, the flow velocity V can be measured when there is a variation, and the flow rate can be measured in consideration of the cross-sectional area of the flow path.

Figure 15:
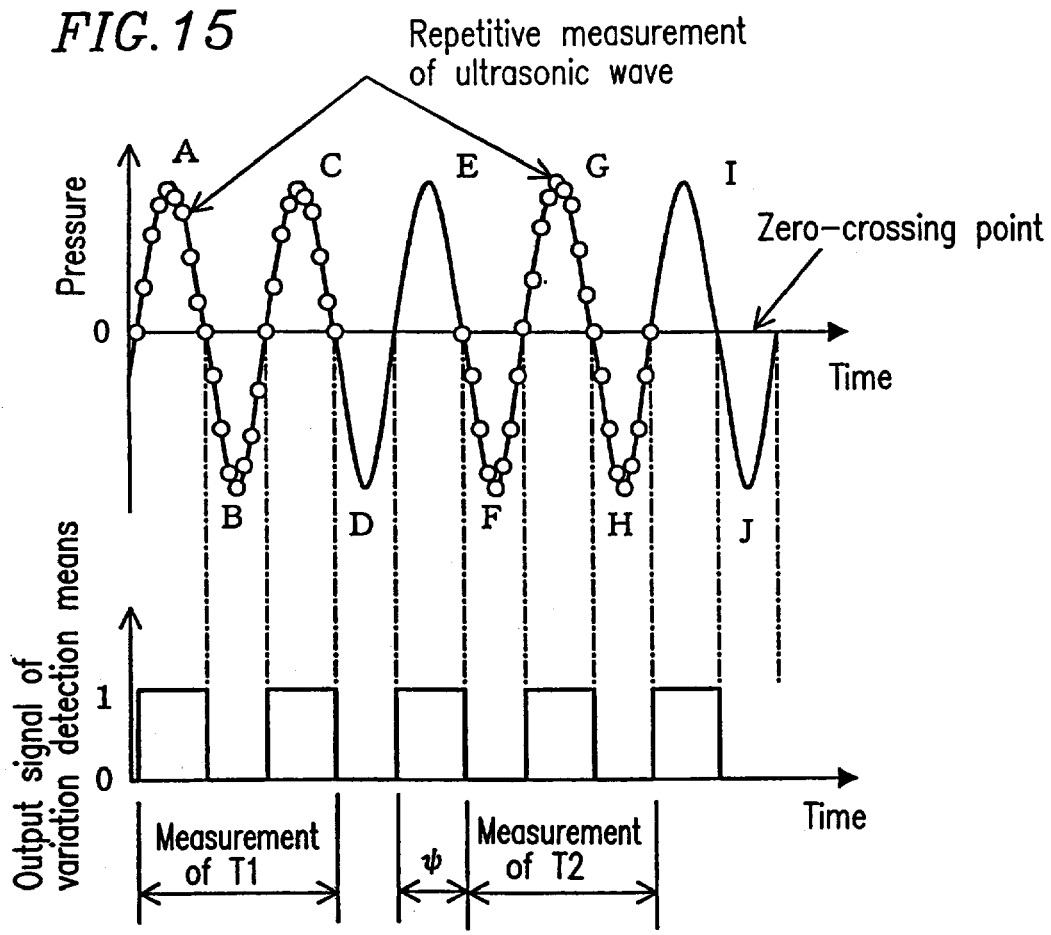
FIG. 15 is a timing chart showing an operation of the flowmeter of embodiment 6.

The start timing when the time difference $\psi$ is $\pi$ is described with reference with FIG. 15. An output signal of the variation detection means 229 is achieved by comparing and detecting a zero-crossing point of an alternating component of the pressure variation by a comparator. That is, measurement of T1 is started at a rising edge of the output signal of the variation detection means, and integral time T1 is measured for a predetermined number of times of sing-around. On the other hand, measurement of T2 is started at a falling edge of the output signal of the variation detection means 29, and integral time T2 is measured for the same predetermined number of times of sing-around. As shown in FIG. 15, T1 is measured within zones A, B, and C of the pressure waveform. T2 is measured within zones F, G, and H, which have an inverted amplitude of that within zones A, B, and C. Thus, the pressure variation is cancelled.

Figure 16:
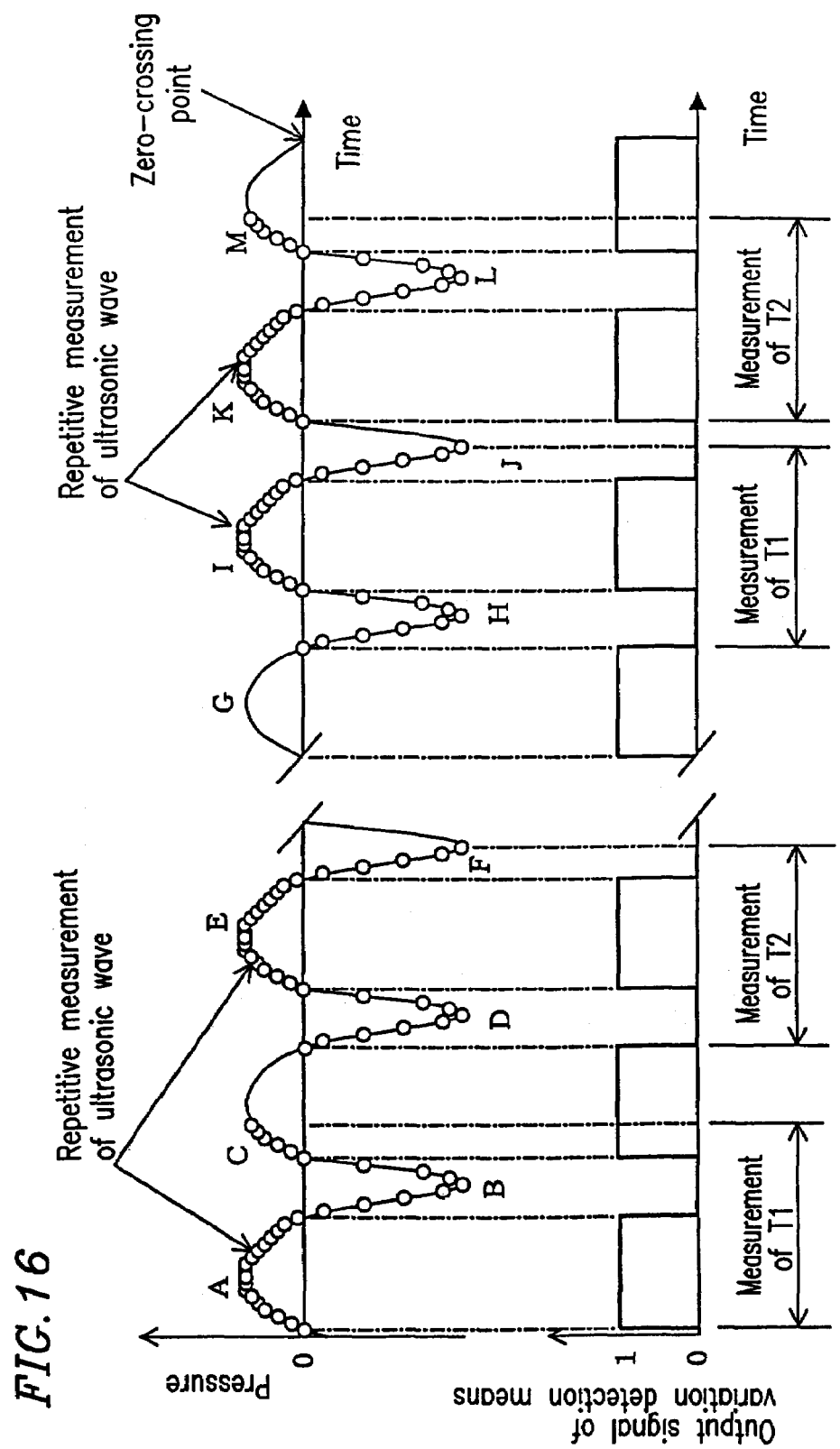
FIG. 16 is another timing chart showing an operation of the flowmeter of embodiment 6.

When the pressure variation exhibits a positive-negative (peak-to-peak) symmetry waveform as shown in FIG. 15, the variation can be cancelled by a single measurement operation for each of T1 and T2. However, when the pressure variation exhibits a positive-negative (peak-to-peak) asymmetry waveform as shown in FIG. 16, the variation can be cancelled by appropriately changing the time from which the measurement is started. That is, the measurement of T1 is started at a rising edge of the output signal of the variation detection means 229, and integral time T1 is measured for a predetermined number of times of sing-around. On the other hand, measurement of T2 is started at a falling edge of the output signal of the variation detection means 229, and integral time T2 is measured for the same predetermined number of times of sing-around. Then, in the next measurement cycle, the measurement of T1 is started at a falling edge of the output signal of the variation detection means 229, and integral time T1 is measured for a predetermined number of times of sing-around. On the other hand, measurement of T2 is started at a rising edge of the output signal of the variation detection means 229, and integral time T2 is measured for the same predetermined number of times of sing-around. Referring to FIG. 16, in the first measurement cycle, T1 is measured within zones A, B, and C, and T2 is measured within zones D, E, and F. After the first measurement cycle, the difference in the measured value between zones C and F, C−(−F), is left as an error because the waveforms of zones C and F are different. In the second measurement cycle, T1 is measured within zones H, I, and J which have an opposite waveform, and T2 is measured within zones K, L, and M. After the second measurement cycle also, the difference in the measured value between zones J and M is left as an error because the waveforms of zones J and M are different. In the second measurement cycle, the measurement is performed for an ultrasonic wave transmitted from the upstream side within zone M, whereas the measurement is performed for an ultrasonic wave transmitted from the downstream side within zone 3. Thus, the signs of the measured values are inverted. As a result, the difference in the measured value between zones J and M, (−J−M), is left as an error. Hence, if considering that C=M and F=J, when C−(−F) and (−J−M) are added and averaged, a result of the operations is zero. That is, the pressure variation is cancelled. It is apparent that, when the direction in which an ultrasonic wave is transmitted is alternately changed at each measurement, the measurement can be started with a constant timing. In the above example, the measurement for two measurement cycles has been described. However, when the waveform of the pressure variation is asymmetrical and complicated, measurement is repeated while successively changing the time when the measurement is started according to the periodicity of a waveform, whereby the measured values are averaged, and accordingly, an error can be suppressed to a minimum value.

Figure 17:
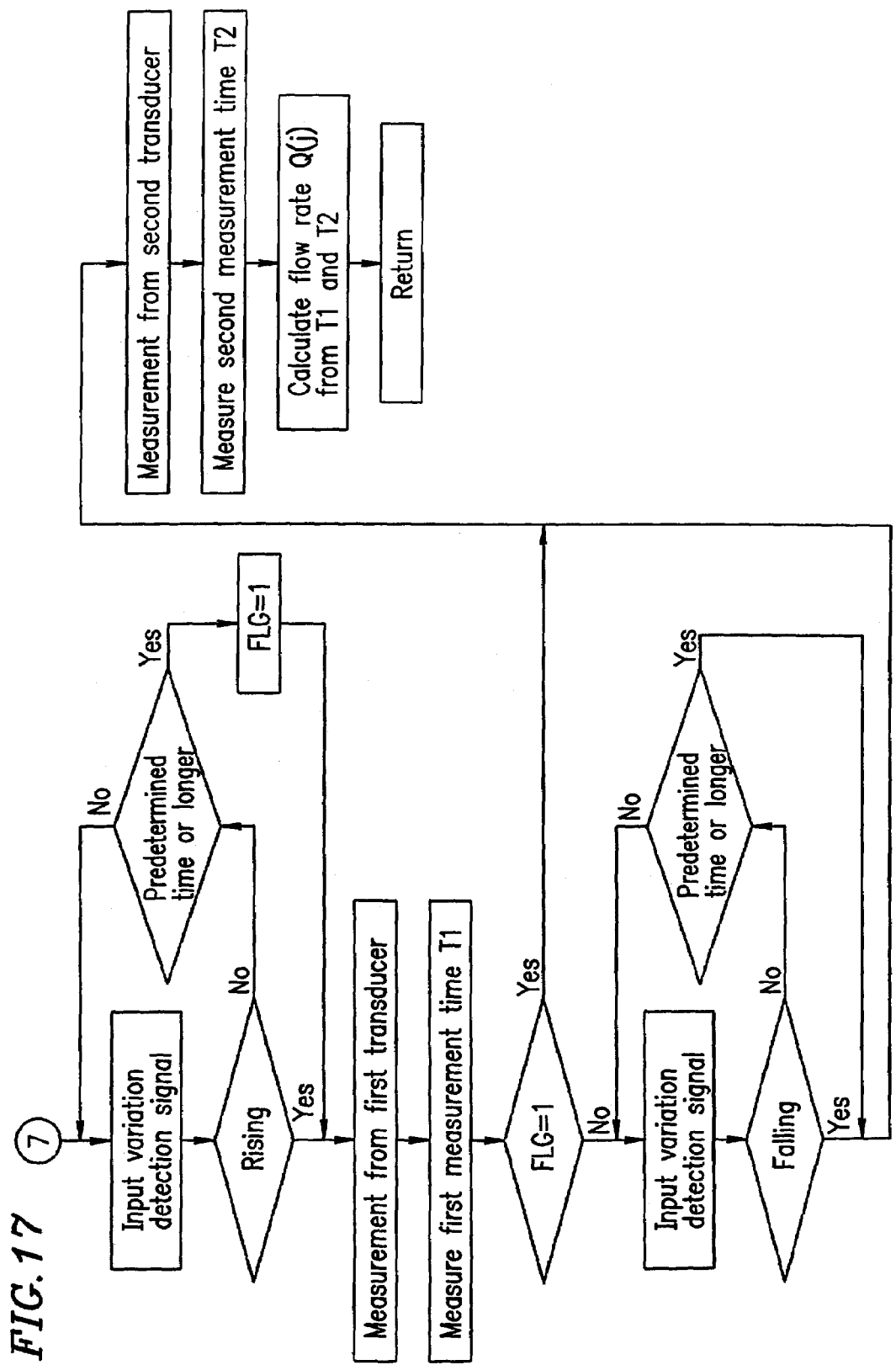
FIG. 17 is a flowchart showing an operation of the flowmeter of embodiment 6.

Next, a flow of the measurement is described with reference to the flowcharts of FIGS. 17 and 18. In the first step, whether or not the signal of the variation detection means is at a rising edge is determined. When a rising edge is not detected, the determination is repeated until the rising edge of the output signal of the variation detection means 229 arrives. If a rising edge does not appear after a predetermined time period, detection of a rising edge is discontinued by detection cancellation means, and it is determined that there is no pressure variation. Then, measurement of first measurement time T1 and second measurement time T2 are performed. When a rising edge is detected, the first measurement time T1 is measured. Then, whether or not the signal of the variation detection means 229 is at a falling edge is determined. When a falling edge is detected, measurement of second measurement time T2 is performed. If a falling edge does not appear after a predetermined time period, detection of a falling edge is discontinued by detection cancellation means, and it is determined that there is no pressure variation. Then, measurement of second measurement time P2 is performed. From the first measurement time T1 and second measurement time T2, the flow rate Q(j) is calculated.

Figure 18:
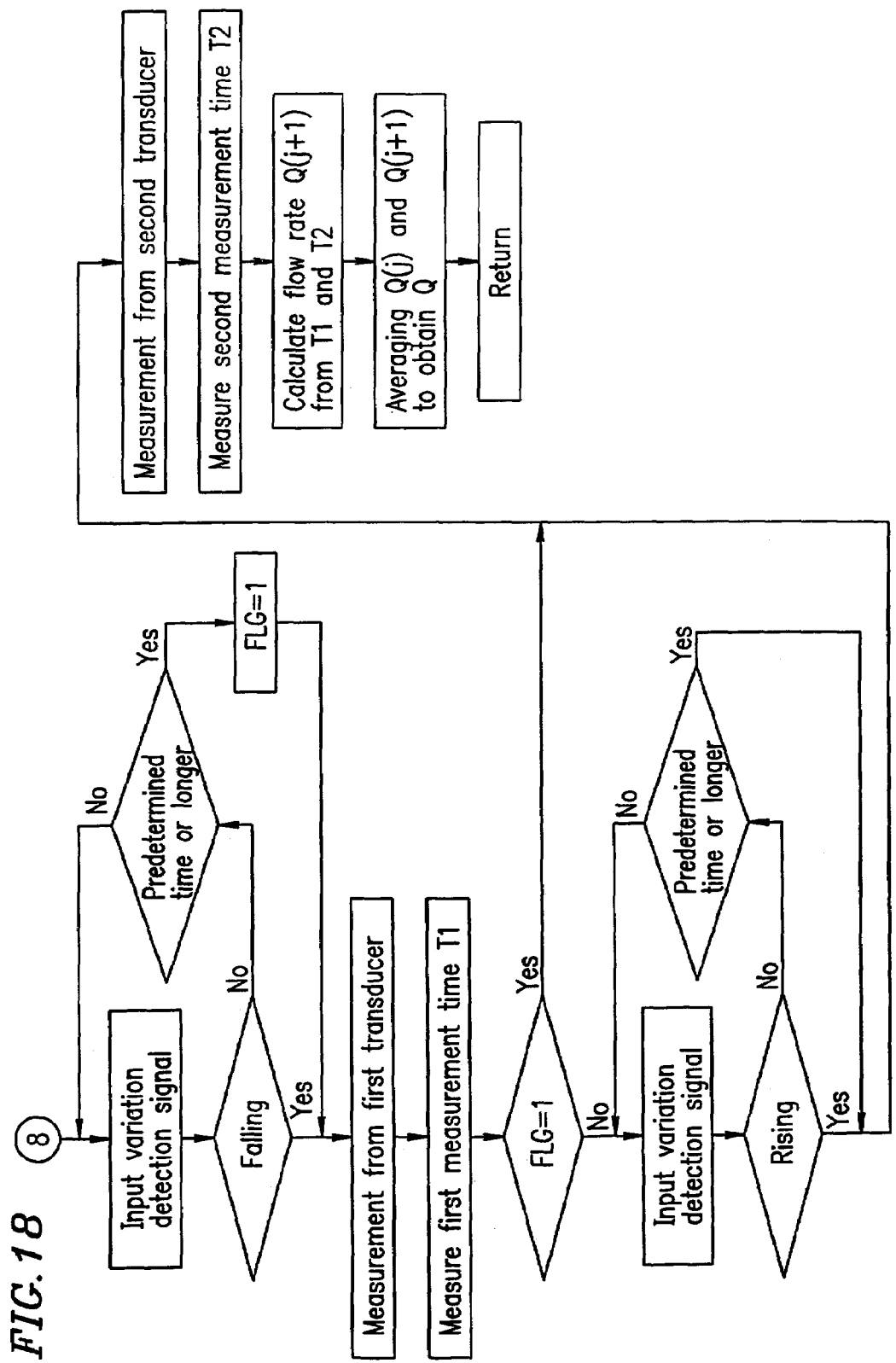
FIG. 18 is another flowchart showing an operation of the flowmeter of embodiment 6.

In the next measurement cycle, as shown in FIG. 18, the process is started with falling-edge detection. After the falling-edge detection step is performed, the first measurement time T1 is measured. Thereafter, after the rising-edge detection step is performed, the second measurement time T2 is measured. From the first measurement time T1 and second measurement time T2, the flow rate Q(j+1) is calculated. The measurement is repeated while changing the time at which the measurement is started, and the first flow rate Q(j) and second flow rate Q(j+1) are measured and successively averaged, whereby the flow rate Q is calculated. Thus, the measure values are averaged, whereby an error can be removed in principle.

Since a pressure variation in the flow path can be measured with the second piezoelectric transducer 225, it is necessary to provide a pressure sensor. Thus, the size of a flowmeter can be decreased, and the structure of the flow path can be simplified. Further, the flow rate can be instantaneously measured with a high accuracy in a reliable manner even when a pressure variation occurs. The measurement is performed when a change in the pressure variation is inverted, whereby the phases of the pressure variation and the measurement timing can be shifted. Thus, a measurement error caused, due to the pressure variation can be offset. Furthermore, at each measurement, the timing at which the measurement is performed is alternately changed between a positive point and a negative point, whereby an influence of the pressure variation can be offset even when the pressure variation is asymmetrical between the high pressure side and the low pressure side. Furthermore, the measurement is repeated according to the sing-around method, whereby the measured values can be averaged within a single measurement cycle. Therefore, the flow rate measurement can be performed in a reliable manner. Furthermore, by the selection means, at least one of the first and second vibration means can be selected and used for pressure detection. Thus, both the flow rate measurement and the pressure measurement can be achieved. A variation is detected at a point in the vicinity where a pressure variation is zero, whereby the frequency of the variation can be correctly grasped, and the flow rate can be offset. Even when there is no variation, the flow rate can be automatically measured at a predetermined time. The piezoelectric transducers are used together with the variation detection means. Therefore, an ultrasonic wave is used for detecting a pressure variation while being used for transmission/reception. Moreover, it is not necessary to secure a place for installing pressure detection means which is exclusively used for pressure detection, and the number of parts which can cause leakage of fluid can be decreased.

Figure 19:
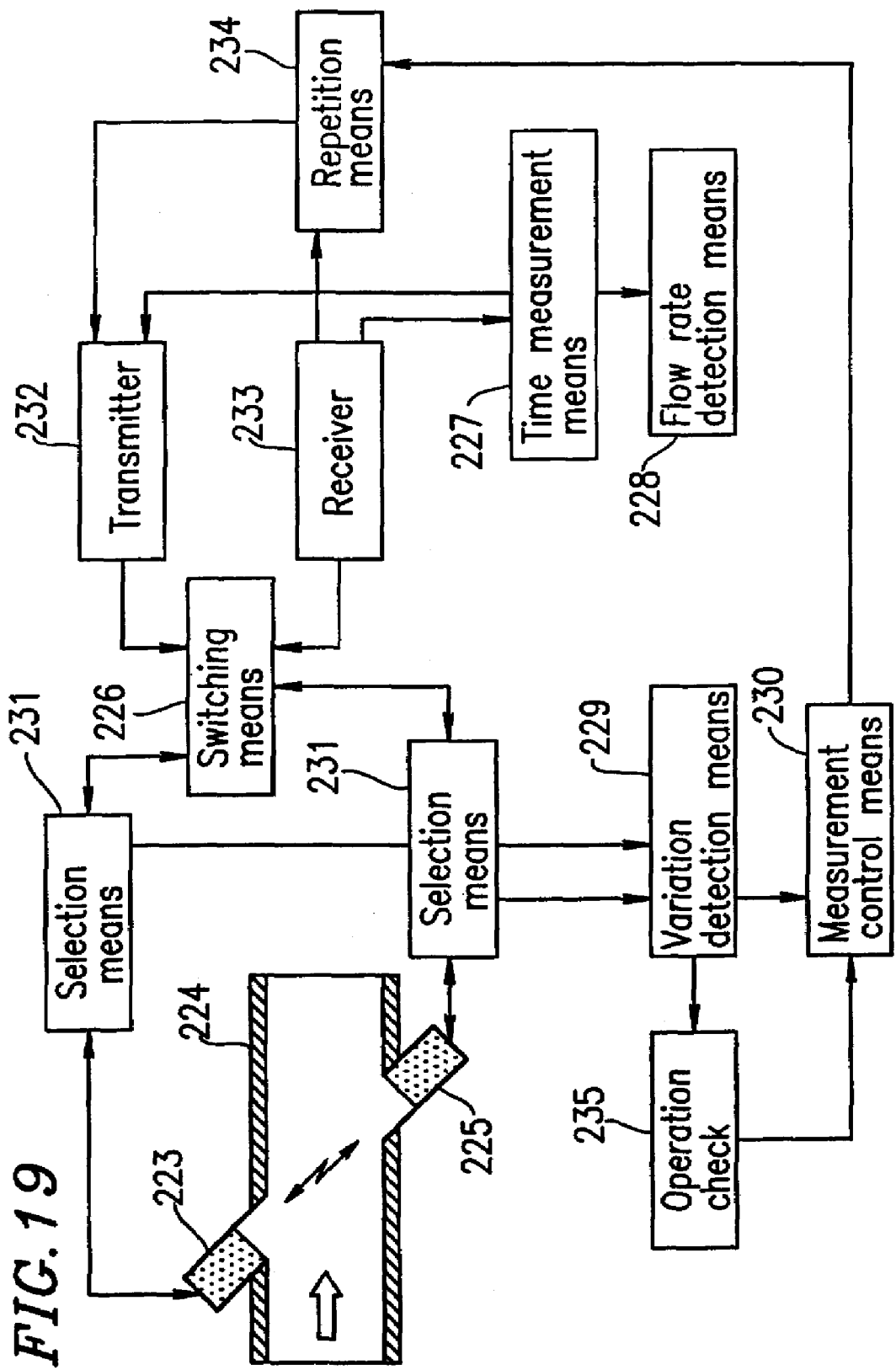
FIG. 19 is another block diagram of the flowmeter of embodiment 6.

It should be noted that, even when the detection of a pressure variation which has been described in this embodiment is performed with pressure detection means which is exclusively used for pressure detection, the same functional effects can be obtained. The example where the second piezoelectric transducers provided on the downstream side is used for pressure detection has been described. However, even when the first piezoelectric transducers provided on the upstream side is used for pressure detection, the same effects can be obtained. Further, even when the first piezoelectric transducers on the upstream side and the second piezoelectric transducers on the downstream side are alternately used for pressure detection as shown in FIG. 19, the same effects can be obtained. Moreover, by alternately using the piezoelectric transducers, the operation state of each piezoelectric transducer can be checked. That is, when the variation detection means detects the same signal frequency from both piezoelectric transducers, it can be determined that the both piezoelectric transducers are operating normally.

In the above-described example, the flowmeter is a general-purpose measuring device. However, when a flowmeter of the present invention is used in a gas meter, the flow meter can be provided in a pipeline in which fluctuation occurs, such as a pipeline system where a gas engine heat pump is used. Furthermore, this embodiment has been described in conjunction with a pressure variation. However, it is apparent that the same effects can be obtained for a flow rate variation.

EMBODIMENT 7

Figure 20:
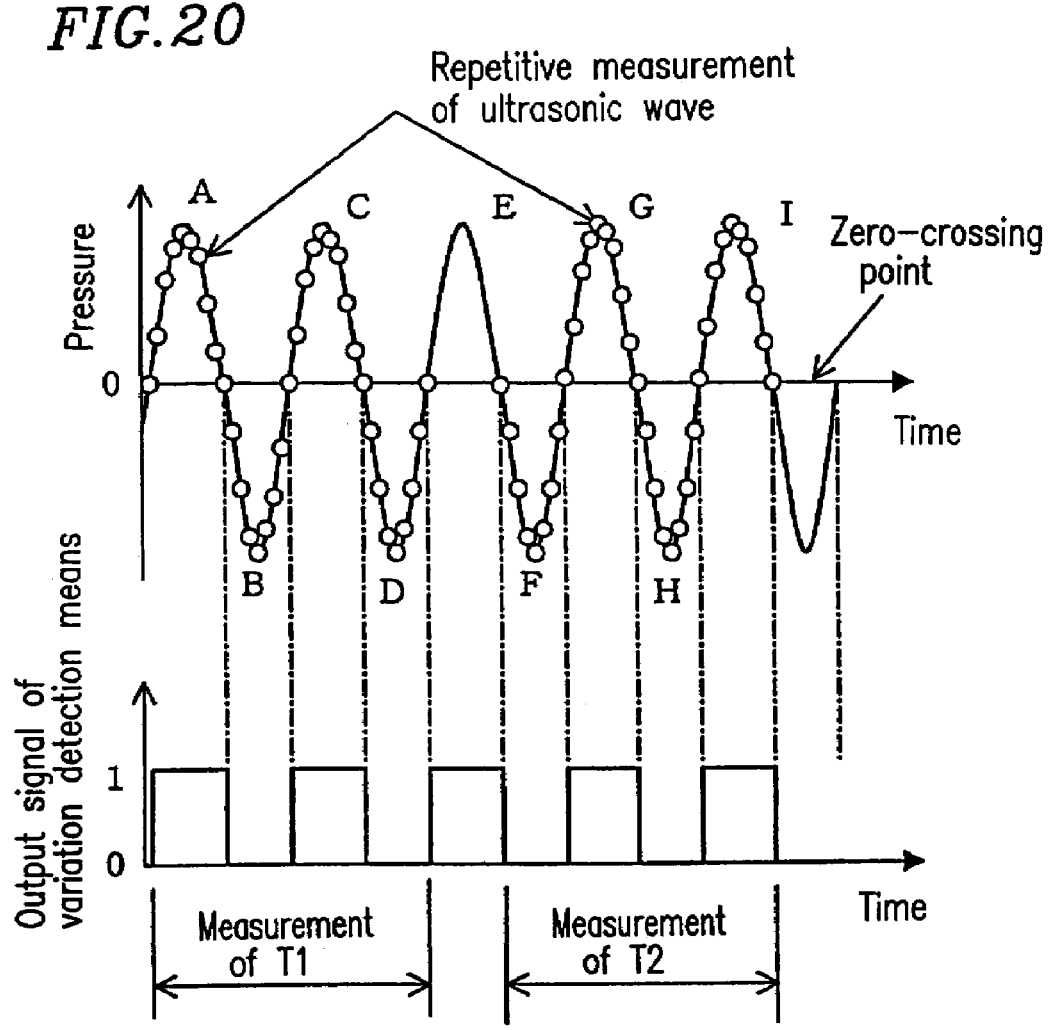
FIG. 20 is a timing chart showing an operation of a flowmeter according to embodiment 7 of the present invention.

FIG. 20 is a timing chart showing an operation of a flowmeter according to embodiment 7 of the present invention. Embodiment 7 is different from embodiment 6 in that the flowmeter of embodiment 7 includes repetition means 234 for performing signal transmission/reception based on a sing-around method a plurality of times over a period which is a multiple of one cycle of a variation frequency. The structure of the flowmeter of embodiment 7 is shown in FIG. 13.

Figure 21:
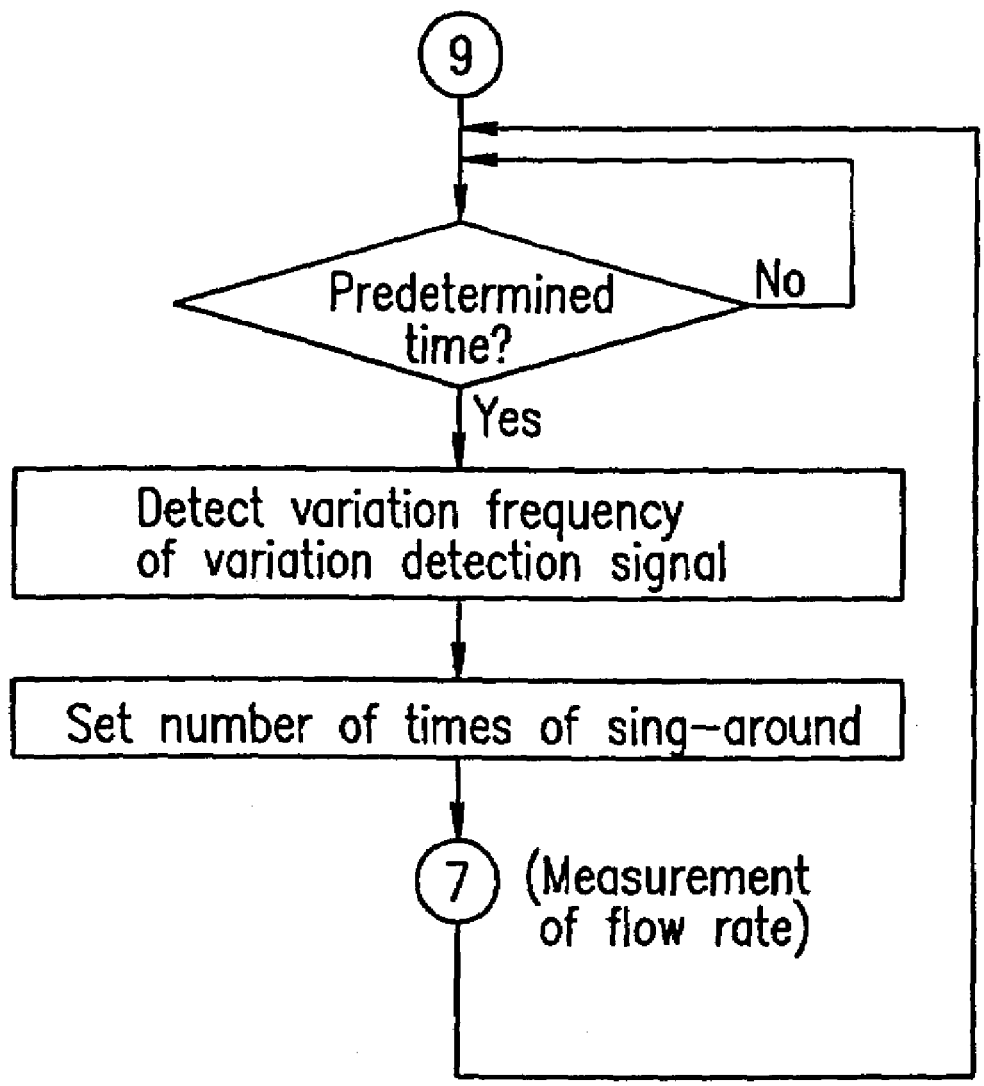
FIG. 21 is a flowchart showing an operation of the flowmeter according to embodiment 7.

In an example illustrated in FIG. 21, measurement is started with an interval of a predetermined time period (e.g., 2 seconds). When a predetermined time arrives, the frequency of a variation is measured and detected by the variation detection means 229. Then, the number of times of a sing-around process is set so as to substantially conform with the variation frequency. For example, the time spent for a single propagation can be calculated by dividing the distance between the piezoelectric transducers, which transmit/receive an ultrasonic wave, by the velocity of sound. A required number of times of the sing-around process can be calculated by dividing the measured frequency by the calculated time spent for a single propagation. The measurement of the flow rate is repeated based on the number of times of the sing-around process. At step 7 in FIG. 21, the process 7 of FIG. 17 is performed.

In this way, the number of times of the sing-around process is changed so as to conform with a variation frequency, whereby one cycle of the variation frequency can be measured. Accordingly, the pressure variation can be averaged, and the flow rate can be measured in a reliable manner. The measurement is performed while the pressure synchronization and the number of times of the sing-around process conform with a multiple of one cycle of the variation frequency, whereby the flow rate measurement can be performed in a further reliable manner. Furthermore, since the pressure synchronization can be detected by utilizing a signal of the piezoelectric transducers, a synergistic effect can be obtained, i.e., the variation frequency can be detected, and the flow rate measurement can be performed in a reliable manner.

In FIG. 20, the measurement for two cycles has been described. However, when the propagation distance is short, in order to increase the accuracy of the measurement, it is necessary to perform a sing-around process for more than a predetermined number of times. Therefore, when the number of times of the sing-around process which is obtained from the variation frequency is smaller than the predetermined number of times, the number of times of the sing-around process is determined so as to be a multiple of the variation frequency.

EMBODIMENT 8

Figure 22:
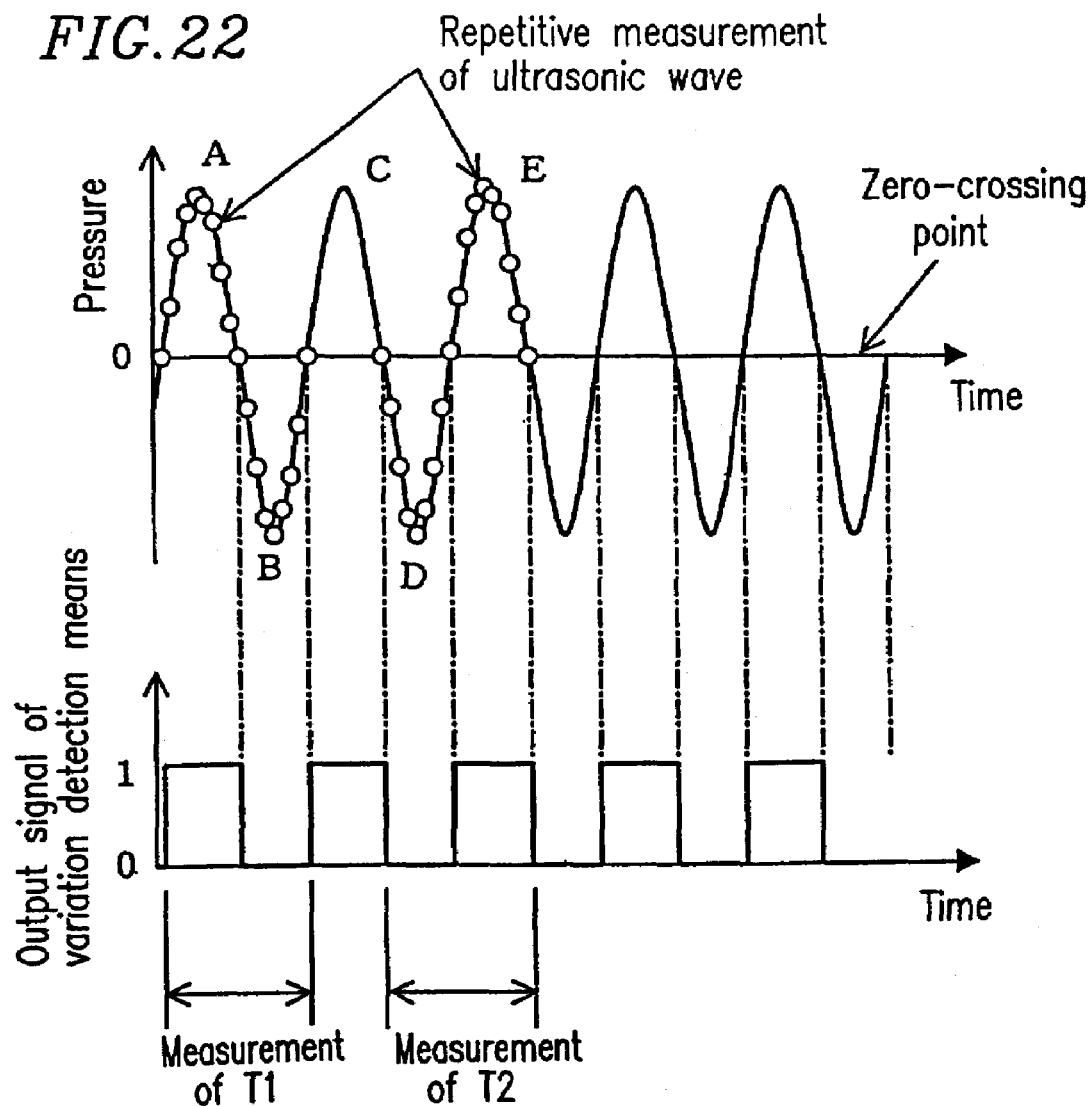
FIG. 22 is a timing chart showing an operation of a flowmeter of embodiment 8 of the present invention.

FIG. 22 is a timing chart showing an operation of a flowmeter according to embodiment 8 of the present invention. Embodiment 8 is different from embodiment 6 in that a flowmeter of embodiment 8 includes repetition means 234 for performing measurement of a transmitted/received sonic wave such that, when an output of the variation detection means 229 makes a predetermined change (e.g., when the output falls), measurement of a transmitted/received sonic wave is started, and sing-around process is repeated until the output of the variation detection means makes a predetermined change (e.g., when the output falls). The flow meter of embodiment 8 has the structure shown in FIG. 13.

Figure 23:
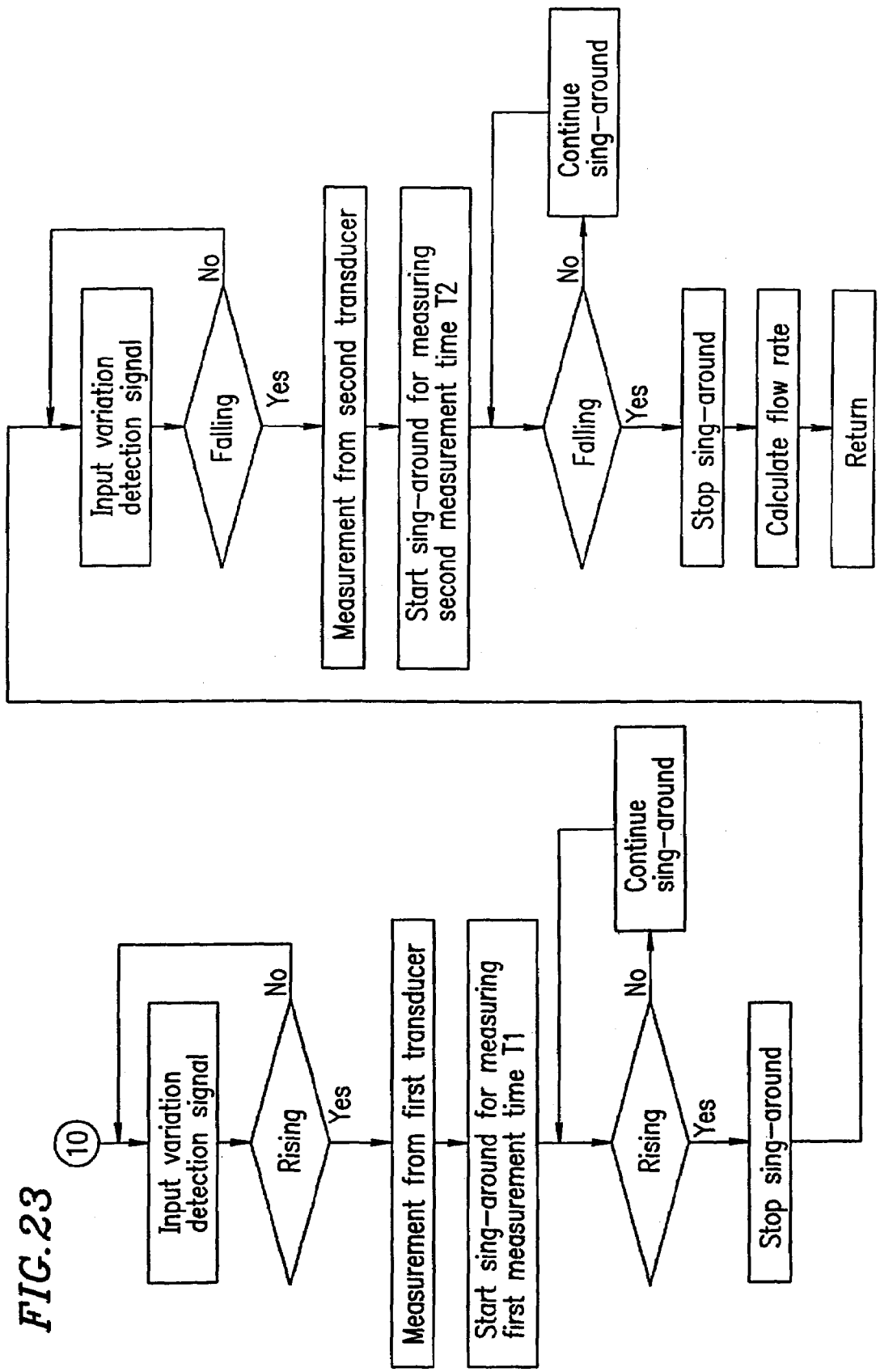
FIG. 23 is a flowchart showing an operation of the flowmeter according to embodiment 8.

As shown in FIG. 23, a rising edge of a variation detection signal is detected at the start of the measurement, and the sing-around process is started. Then, when the variation detection signal rises again, the sing-around process is stopped, and a first measurement time T1 is measured. Next, a falling edge of the variation detection signal is detected at the start of the measurement, and the sing-around process is started. Then, when the variation detection signal falls again, the sing-around process is stopped, and a second measurement time T2 is measured. From the measurement times T1 and T2, the flow rate is calculated.

In this way, the start and stop of the measurement can be conformed with the frequency of the pressure variation, and therefore, the measurement can be performed based on the variation frequency. Thus, the pressure variation is averaged, and the flow rate can be measured in a reliable manner.

EMBODIMENT 9

Figure 24:
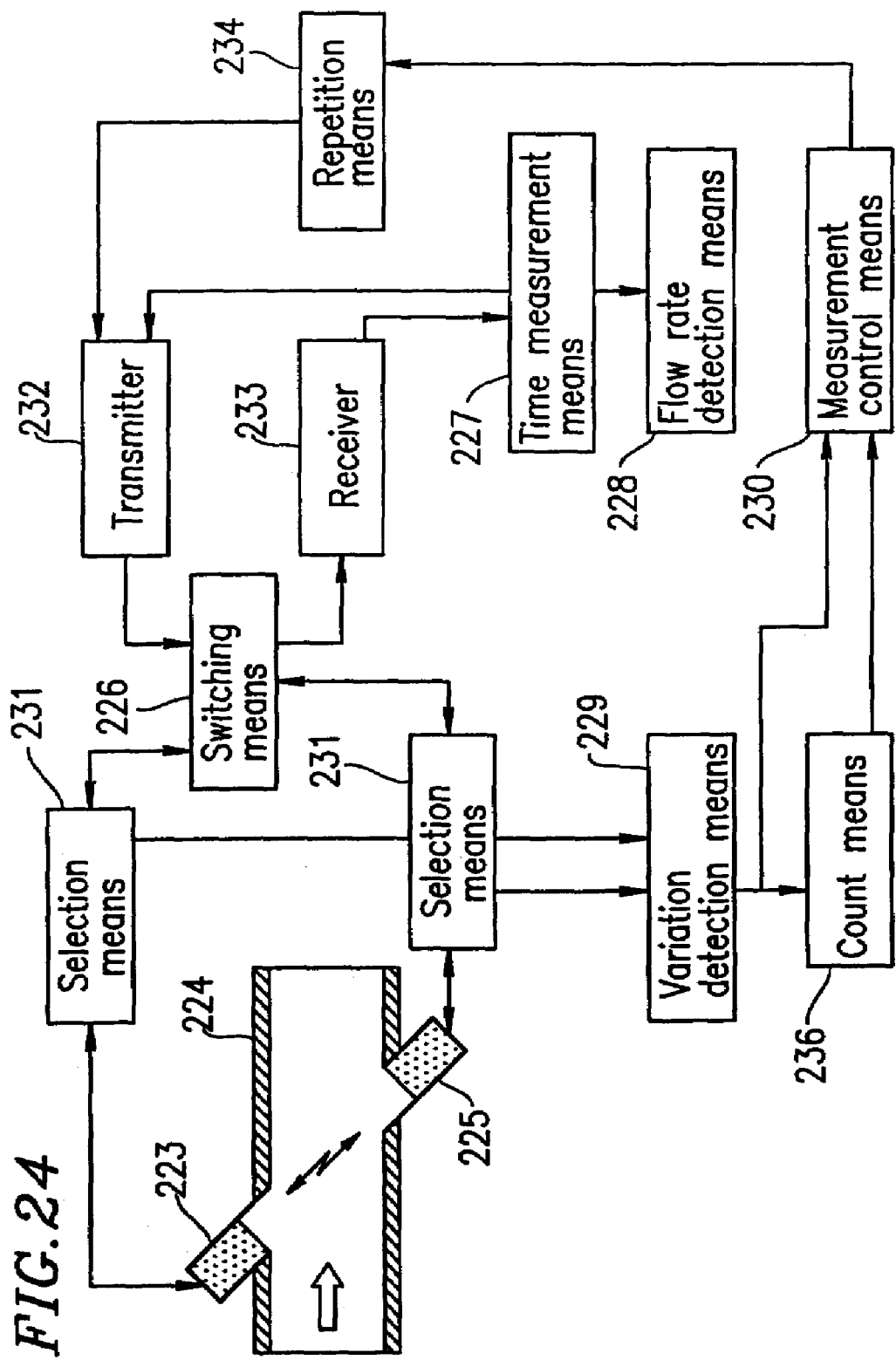
FIG. 24 is a block diagram showing a flowmeter according to embodiment 9 of the present invention.

FIG. 24 shows a structure of a flowmeter according to embodiment 9 of the present invention. Embodiment 9 is different from embodiment 6 in that the flowmeter of embodiment 9 includes: two-bit count means 236 for counting a variation of an output signal of the variation detection means 229; and flow rate detection means 228 where measurement is performed such that a count value of the count means 236 is different between the first time measurement and the second time measurement, and the flow rate measurement is performed only when all the combinations of the two bits are achieved for the same number of times. The timing chart of the measurement is shown in FIG. 25.

Figure 25:
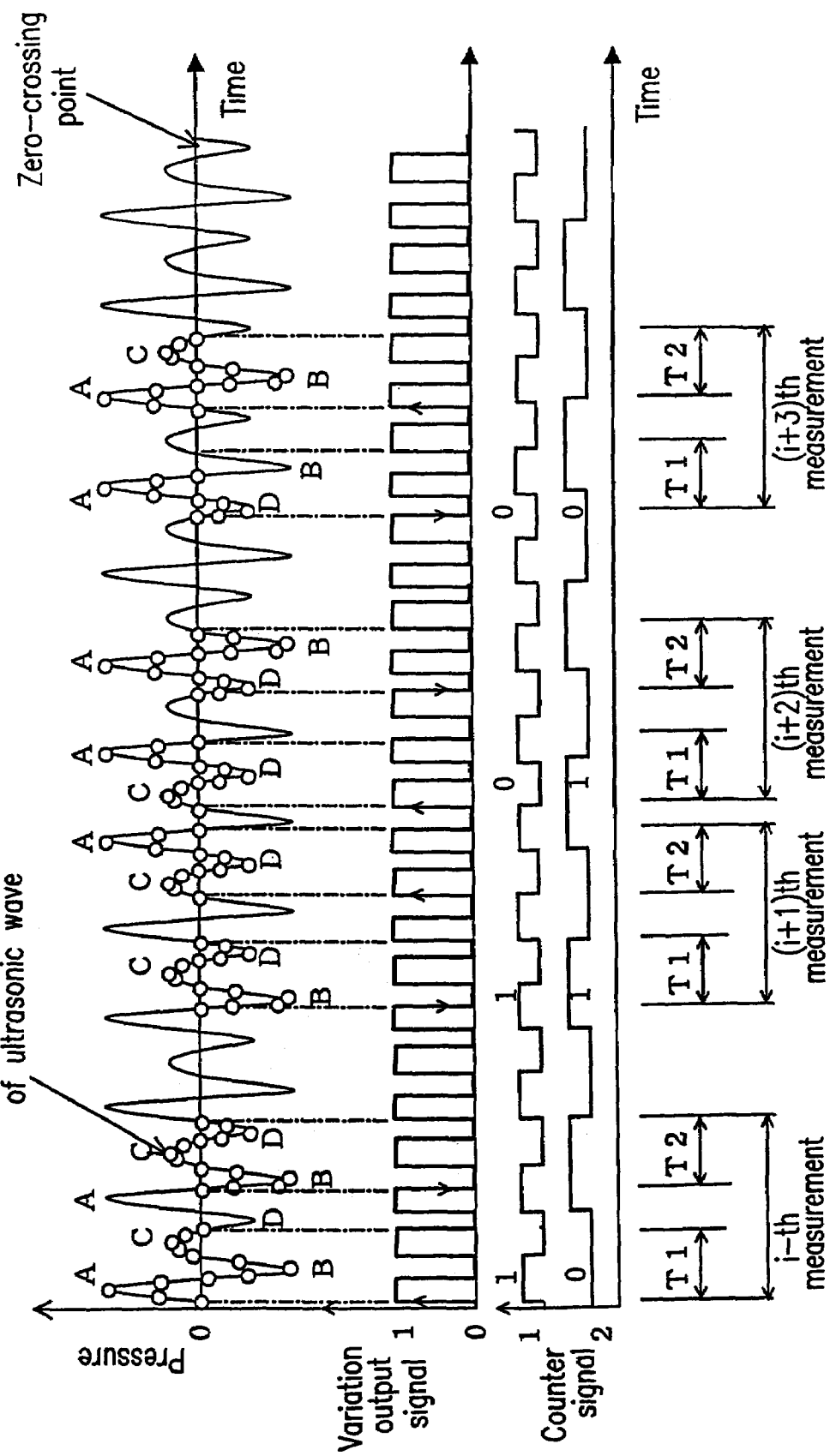
FIG. 25 is a timing chart showing an operation of the flowmeter according to embodiment 9.

As shown in FIG. 25, when a variation is repeated by units of two cycles, for example, measurement of T1 is started at a time when an output of the count means is (1,0), and an output of the variation detection means is at a rising edge. Measurement of T2 is started at a subsequent falling edge of the variation detection means. Such measurement can be notionally expressed as $Q(i)=(A-B+C)-(-B+C-D)=A+D$.

In the next measurement cycle, measurement of T1 is started at a time when an output of the count means is (1,1) and at a falling edge of the variation detection means. Measurement of T2 is started at a subsequent rising edge of the variation detection means. Such measurement can be notionally expressed as $Q(i+1)=(-B+C-D)-(C-D+A)=-A-B$. Subsequent measurement can be notionally expressed as:

$Q(i+2)=(C-D+A)-(-D+A-B)=C+B$; and $Q(i+3)=(-D+A-B)-(A-B+C)=-C-D$. Thus, $Q(i)+Q(i+1)+Q(i+2)+Q(i+3)=0$.

That is, a pressure variation is cancelled.

In the above example, the measurement for four measurement cycles has been described. However, when the waveform of the pressure variation is asymmetrical and complicated, measurement is repeated while successively changing the time when the measurement is started according to the periodicity of a waveform, whereby the measured values are averaged, and accordingly, an error can be suppressed to a minimum value. Since the measurement can be performed at all the variation timings, averaging of the measured values is achieved, and the flow rate can be measured in a reliable manner.

EMBODIMENT 10

Figure 26:
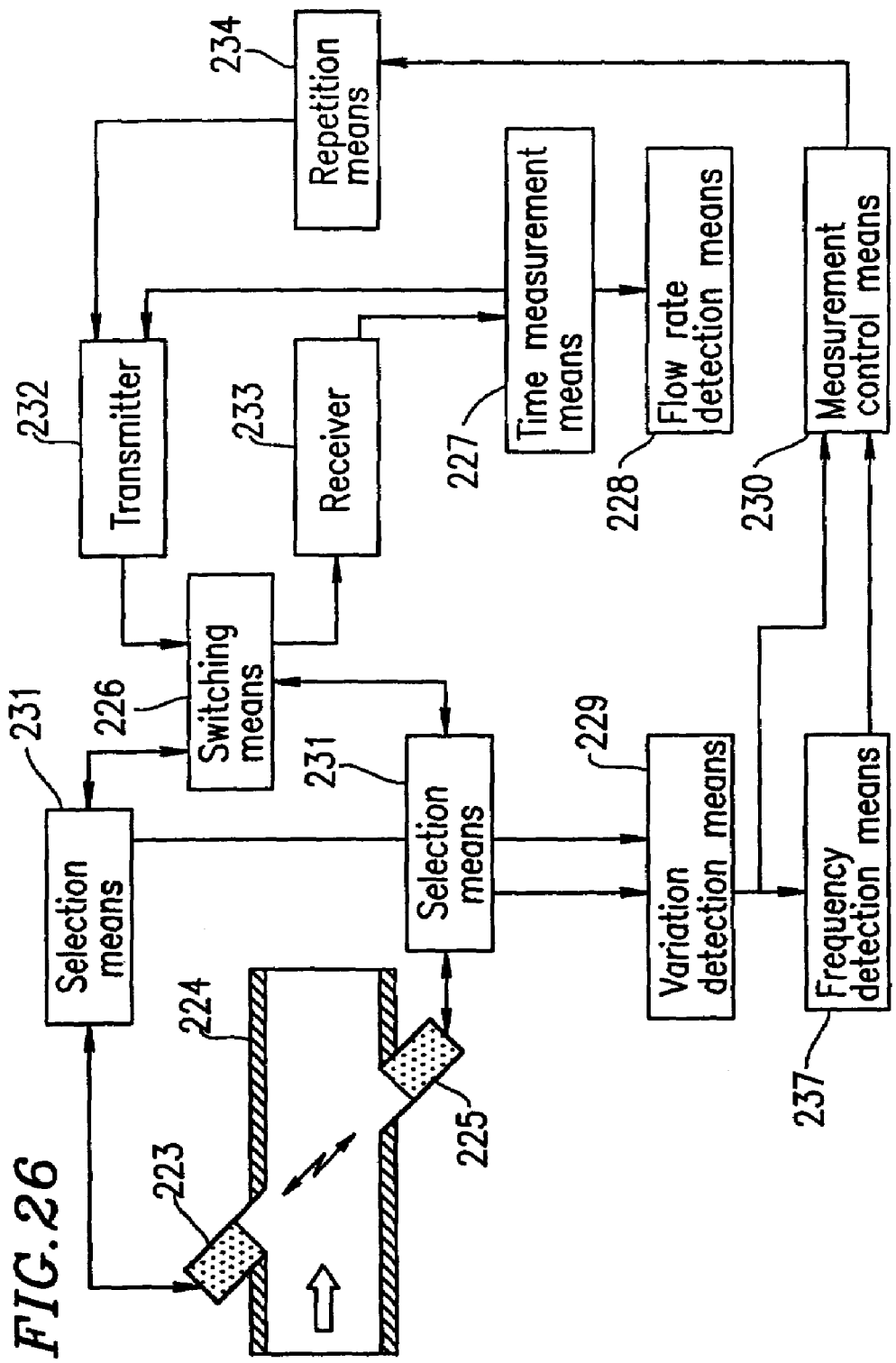
FIG. 26 is a block diagram showing a flowmeter according to embodiment 10 of the present invention.

FIG. 26 shows a structure of a flowmeter according to embodiment 10 of the present invention. Embodiment 10 is different from embodiment 6 in that the flowmeter of embodiment 10 includes: frequency detection means 237 for detecting the frequency of a signal of the variation detection means 229; and measurement control means 230 for starting measurement only when the frequency detected by the frequency detection means 237 is equal to a predetermined frequency.

As shown in FIG. 27, the measurement is started only when the signal of the variation detection means 229 is equal to a predetermined frequency Tm. With such an arrangement, the measurement can be performed at a predetermined variation frequency even when the frequency varies. Even with a pressure waveform shown in FIG. 25, the flow rate can be measured only for a specific pressure variation so long as the frequency is detected. Thus, even when the frequency of the pressure variation varies, the flow rate can be measured within a short space of time in a reliable manner. The frequency is detected at a time interval (e.g., 2 milliseconds), whereby flexibility is given to the measurement, so that the measurement can be continued without interruption.

EMBODIMENT 11

Figure 28:
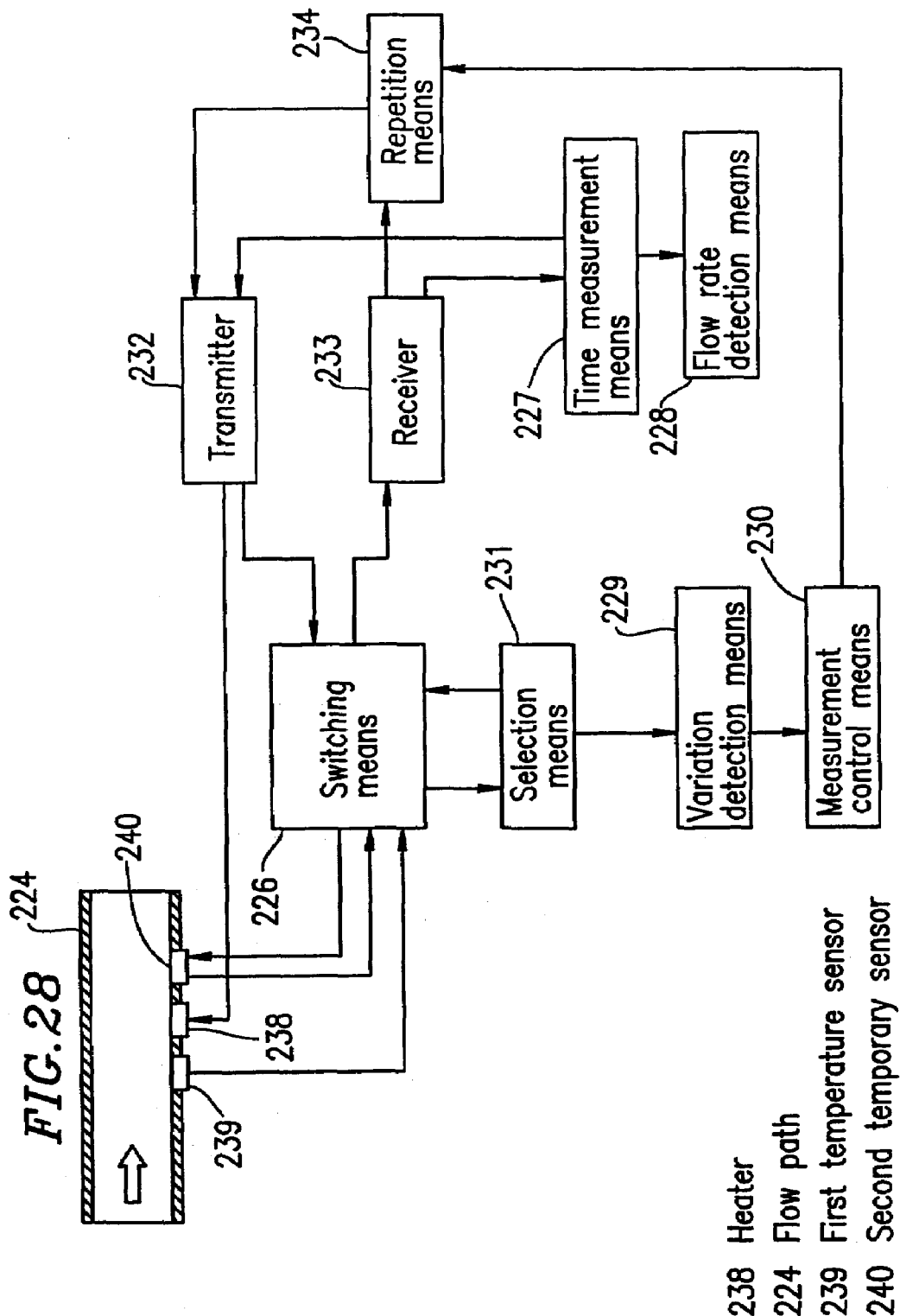
FIG. 28 is a timing chart showing an operation of a flowmeter of embodiment 11 of the present invention.

FIG. 28 shows a structure of a flowmeter according to embodiment 11 of the present invention. Embodiment 11 is different from embodiment 6 in that the transmission/reception means utilizes propagation of heat for detecting a change in the state of fluid. Reference numeral 238 denotes a heater for emitting heat, reference numeral 239 denotes a first temperature sensor for receiving the heat, and reference numeral 240 denotes a second temperature sensor for receiving the heat. The second temperature sensor 240 itself can generate heat and detect a change in the state of fluid based on a change in its own resistance value.

Of course, the second temperature sensor is also used as heat transmission/reception means, whereby a change in the state of fluid, i.e., a variation of the flow velocity, or a variation of pressure, can be detected. Furthermore, the measurement for one measurement cycle is performed in synchronization with the detected variation. Therefore, the flow rate measurement can be performed with a high accuracy in a reliable manner similarly as described in previous embodiments.

EMBODIMENT 12

Figure 29:
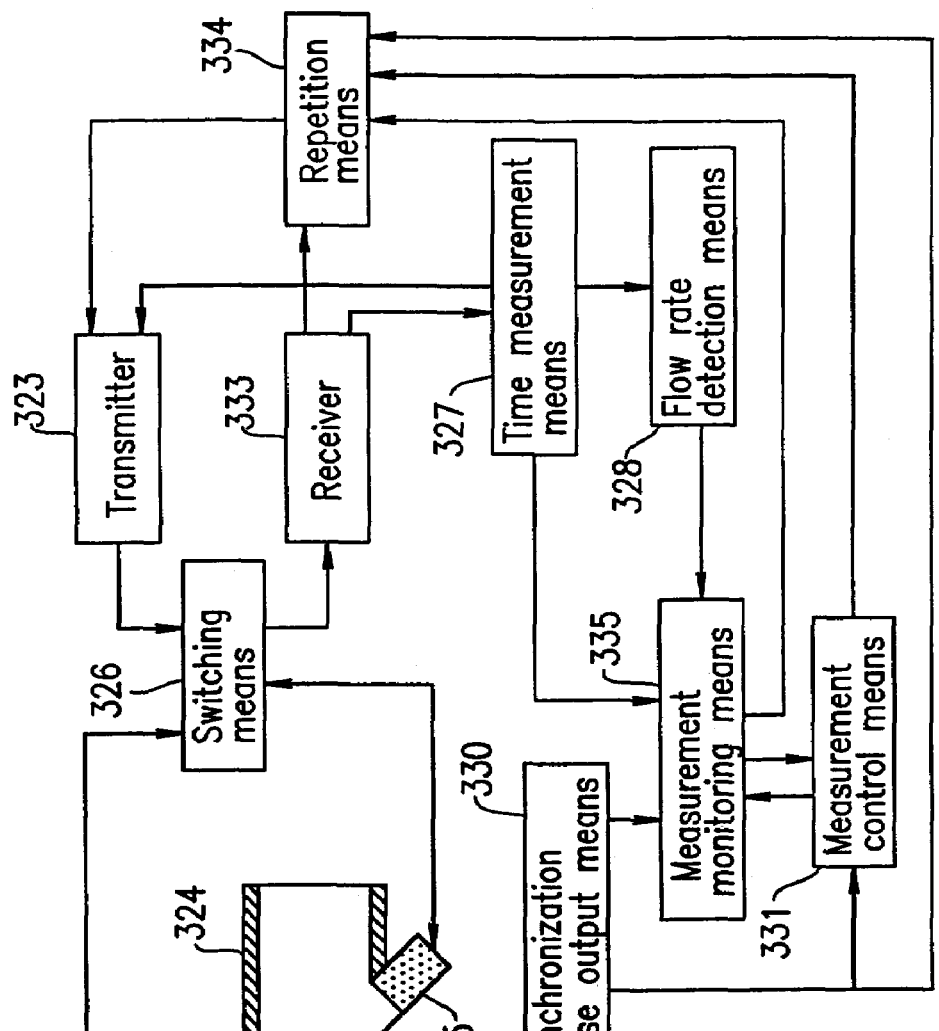
FIG. 29 is a timing chart showing an operation of a flowmeter of embodiment 12 of the present invention.

FIG. 29 is a block diagram showing a flowmeter according to embodiment 12 of the present invention. In FIG. 29, reference numeral 323 denotes a first piezoelectric transducer, which is first vibration means of transmission/reception means that is provided in a flow path 324 and that performs transmission/reception using an ultrasonic wave as a state change of fluid. Reference numeral 325 denotes a second piezoelectric transducer, which is second vibration means of transmission/reception means that performs transmission/reception of an ultrasonic wave. Reference numeral 326 denotes a switch (switching means) for switching a transmission/reception operation of the first piezoelectric transducer and the second piezoelectric transducer. Reference numeral 327 denotes time measurement means for measuring a propagation time of a sonic wave repeatedly transmitted/received between the first piezoelectric transducer 323 and the second piezoelectric transducer 325. Reference numeral 328 denotes flow rate detection means for detecting the flow rate based on a value of the time measurement means. Reference numeral 329 denotes pressure variation detector which functions as variation detection means for detecting a pressure variation in the flow path 324. Reference numeral 330 denotes synchronization pulse output means which functions as variation detection means for converting a pressure signal of the pressure variation detector 329 to a digital signal. Reference numeral 331 denotes measurement control means for directing measurement so as to be in synchronization with a timing of the pressure variation detected by the variation detected means. Reference numeral 332 denotes a transmitter for the transmission/reception means of an ultrasonic signal. Reference numeral 333 denotes a receiver for the transmission/reception means of an ultrasonic signal. Reference numeral 334 denotes repetition means for repeating transmission/reception of an ultrasonic wave. Reference numeral 335 denotes measurement monitoring means for monitoring abnormality of the measurement control means.

Figure 14:
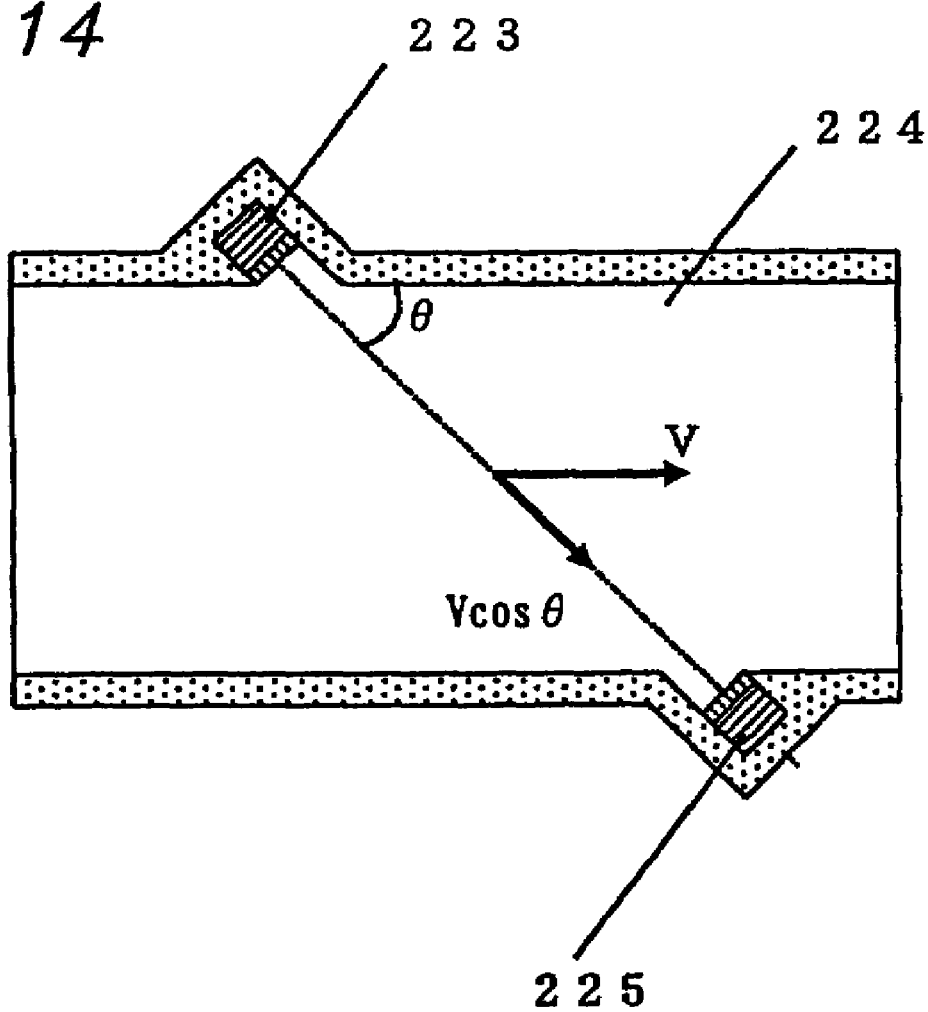
FIG. 14 is a structure diagram of the flowmeter of embodiment 6.

Next, an operation and function are described with reference to FIGS. 14, 30, and 31. In a flow path having a structure shown in FIG. 14, propagation time T1 of an ultrasonic wave from the first piezoelectric transducer 323 to the second piezoelectric transducer 325 is T1=L/(C+V cos θ). Propagation time T2 of an ultrasonic wave from the second piezoelectric transducer 325 to the first piezoelectric transducer 323 is T2=L/(C−V cos θ). Herein, V denotes a flow velocity in the flow path, C denotes acoustic velocity, and θ denotes an angle of inclination. With the difference of inverse numbers of T1 and T2, the flow velocity V is obtained from T1 and T2, by changing the above expressions, as shown in the following expression:

$$V=(L/2 \cos θ)·(1/T1-1/T2)$$

If there is a pressure variation in the flow path, the flow velocity changes according to the pressure variation. Thus, T1 and T2 are expressed as follows:

$$T1=L/(C+V \cos θ+u·\sin (2πft))$$

$$T2=L/(C-V \cos θ-u·\sin (2πft+ψ))$$

where f denotes variation frequency of pressure, u denotes variation flow velocity, and ψ denotes difference between a start time of T1 measurement and a start time of T2 measurement (phase difference). The difference between the inverse numbers of T1 and T2 is expressed as follows:

$$1/T1-1/T2$$

$$=(2V \cos θ+u·(\sin (2πft)+\sin (2πft+ψ)))/L$$

When ψ=π, sin (2πft+ψ)=−sin (2πft). That is, an influence of the variation is cancelled. Thus, $$V=(L/2 \cos θ)·(1/T1-1/T2)$$

That is, the flow velocity V can be measured when there is a variation, and the flow rate can be measured in consideration of the cross-sectional area of the flow path. Thus, when ψ=π, the measurement, control means, which measures the flow rate while detecting a pressure variation, can measure the flow rate with a high accuracy in a reliable manner without being influenced by a pressure variation. In the above example, the measurement based on a single transmission/reception operation has been described. However, it is apparent that, also in the case where the integrated time is obtained by a method where the propagation time is repeatedly measured by the repetition means 234, flow rate can be similarly obtained.

Figure 30:
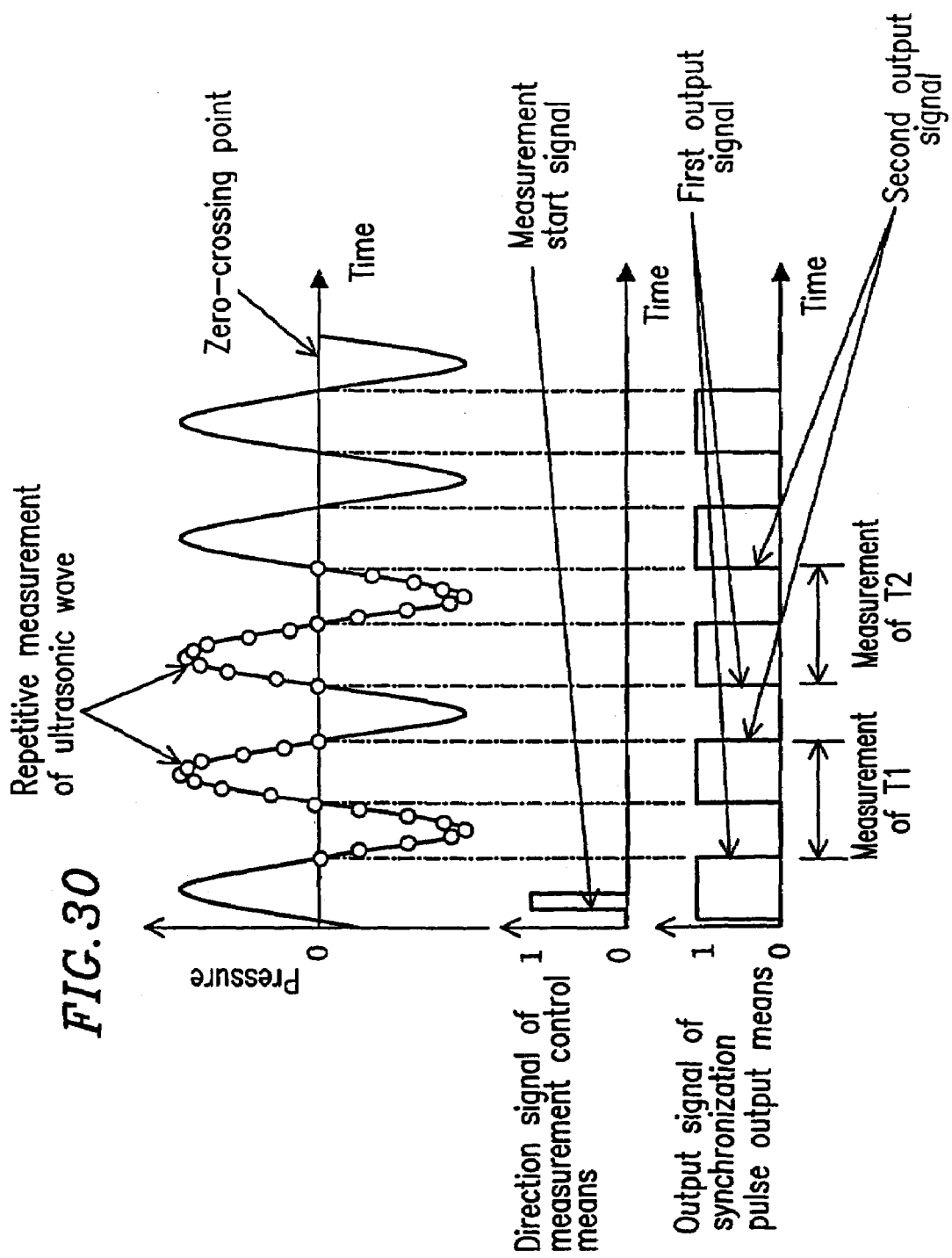
FIG. 30 is a timing chart showing an operation of the flowmeter of embodiment 12.

As shown in FIG. 30, the measurement control means 331 outputs a measurement start signal when a predetermined measurement time arrives (e.g., every two seconds), and waits for a change in an output signal of the synchronization pulse output means whose threshold value is a zero-crossing point of a pressure variation. Then, when a falling signal of an output signal of the synchronization pulse output means 330 is output as the first output signal, measurement of first measurement time T1 is started, and measurement of a propagation time is repeated until a rising signal of the output signal of the synchronization pulse output means 330 is output as the second output signal. In the next measurement cycle, measurement of second measurement time T2 is started when a rising signal of the output signal of the synchronization pulse output means 330 is output as the first output signal, and measurement of a propagation time is repeated until a falling signal of the output signal of the synchronization pulse output means 330 is output as the second output signal. Then, the measurement times T1 and T2 obtained by the time measurement means 327 is converted into the flow rate by the flow rate detection means 328, and the flow rate measurement is completed.

Figure 31:
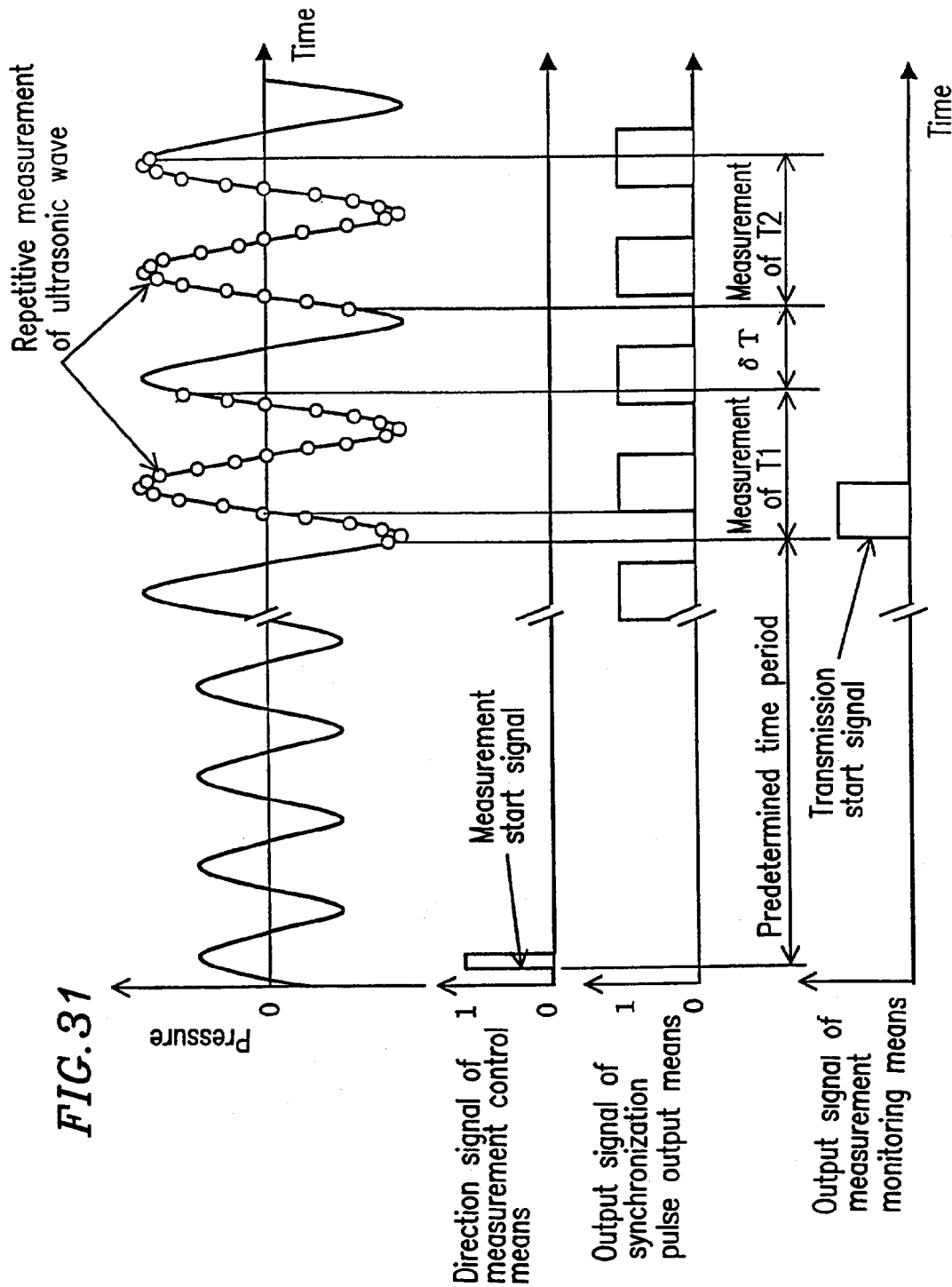
FIG. 31 is another timing chart showing an operation of the flowmeter of embodiment 12.

As shown in FIG. 31, the measurement control means 331 outputs a measurement start signal when a predetermined measurement time arrives. However, when no change occurs in the output signal of the synchronization pulse output means 330 after a predetermined time period, the measurement control means 331 automatically outputs a measurement start signal, and measurement is performed according to a predetermined number of repetition times (e.g., 256 times). For example, in the case where measurement is performed at an interval of 2 seconds, and a pressure variation occurs within a range from 10 Hz to 20 Hz, the predetermined period as a waiting time can be set within a range from 0.1 second to 2 seconds. However, in this case, it is preferable to select 1 second as an optimum value. Furthermore, the predetermined number of repetition times can be set within a range from 2 times to 512 times.

However, in this case, it is preferable to select an optimum value according to the frequency of a pressure variation.

Thus, even when no variation occurs in pressure after a measurement start signal is output, the measurement is started after a predetermined period, whereby the flow rate measurement can be surely performed when it is necessary to perform the flow rate measurement. For example, in a flowmeter of a gas meter, whether or not there is a gas flow is measured when an earthquake occurs. Even when the flowmeter is waiting for occurrence of a pressure variation when the earthquake occurs, and a synchronization pulse output signal cannot be obtained due to abnormality in a pressure variation, the flow rate measurement can be automatically performed, and therefore, any abnormality can be dealt with.

In the above example, a variation in a flow has been described as a pressure variation in the flow path. However, it is apparent that the same effects can be obtained by using flow velocity variation detection means even when there is a variation in the flow velocity.

EMBODIMENT 13

Figure 32:
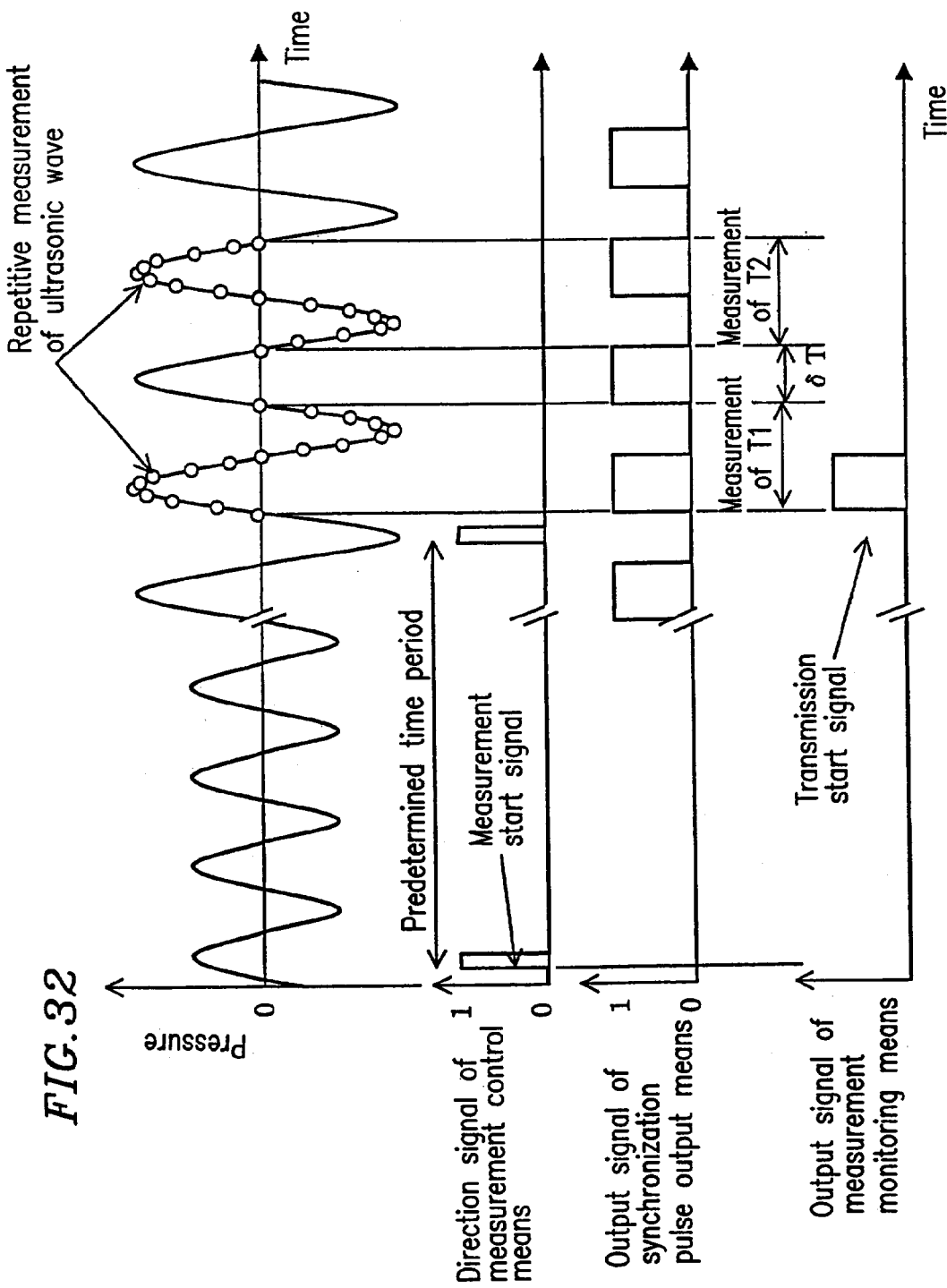
FIG. 32 is a timing chart showing an operation of a flowmeter of embodiment 13 of the present invention.

FIG. 32 is a timing chart showing an operation of a flowmeter according to embodiment 13 of the present invention. Embodiment 13 is different from embodiment 12 in that the flowmeter of embodiment 13 includes measurement monitoring means 335 wherein, when a start signal is not issued within a predetermined period after a direction from the measurement control means 331 is issued, measurement is not performed until a next direction from the measurement control means is issued. The structure of the flowmeter of embodiment 13 is shown in FIG. 29.

As shown in FIG. 32, the measurement control means 331 outputs a measurement start signal when a predetermined measurement time arrives. However, when no change occurs in the output signal of the synchronization pulse output means after waiting for such a change for a predetermined time period, the measurement monitoring means 335 directs the measurement control means 331 to stop waiting for a change in the synchronization pulse signal. The measurement control means 331 waits for a next measurement time (e.g., 2 seconds later). Herein, if measurement is performed at an interval of 2 seconds, and a pressure variation occurs within a range from 10 Hz to 20 Hz, the predetermined period as a waiting time can be set within a range from 0.1 second to 2 seconds. However, in this case, it is preferable to select 1 second as an optimum value.

As described above, when no change occurs in the pressure after a measurement, start signal is issued, waiting for a change is stopped after a predetermined time period has elapsed, and flow rate measurement is not performed, whereby a low-accuracy measurement of flow rate can be avoided. In FIG. 32, a time when the first propagation time T1 is measured is shown. However, if a synchronization pulse does not occur when the second propagation time T2 is measured, an interval between the time when T1 is measured and the time when T2 is measured becomes considerably long, and accordingly, the measurement accuracy decreases. Such measurement with a decreased accuracy can be avoided. Furthermore, since the measurement operation is suspended until a next measurement direction is issued, unnecessary measurement is avoided, and consumed power can be reduced. For example, in a gas meter where a microcomputer for controlling a safety function is driven by an electric battery cell, the consumed power is reduced, and accordingly, a long lifetime can be obtained.

EMBODIMENT 14

Figure 33:
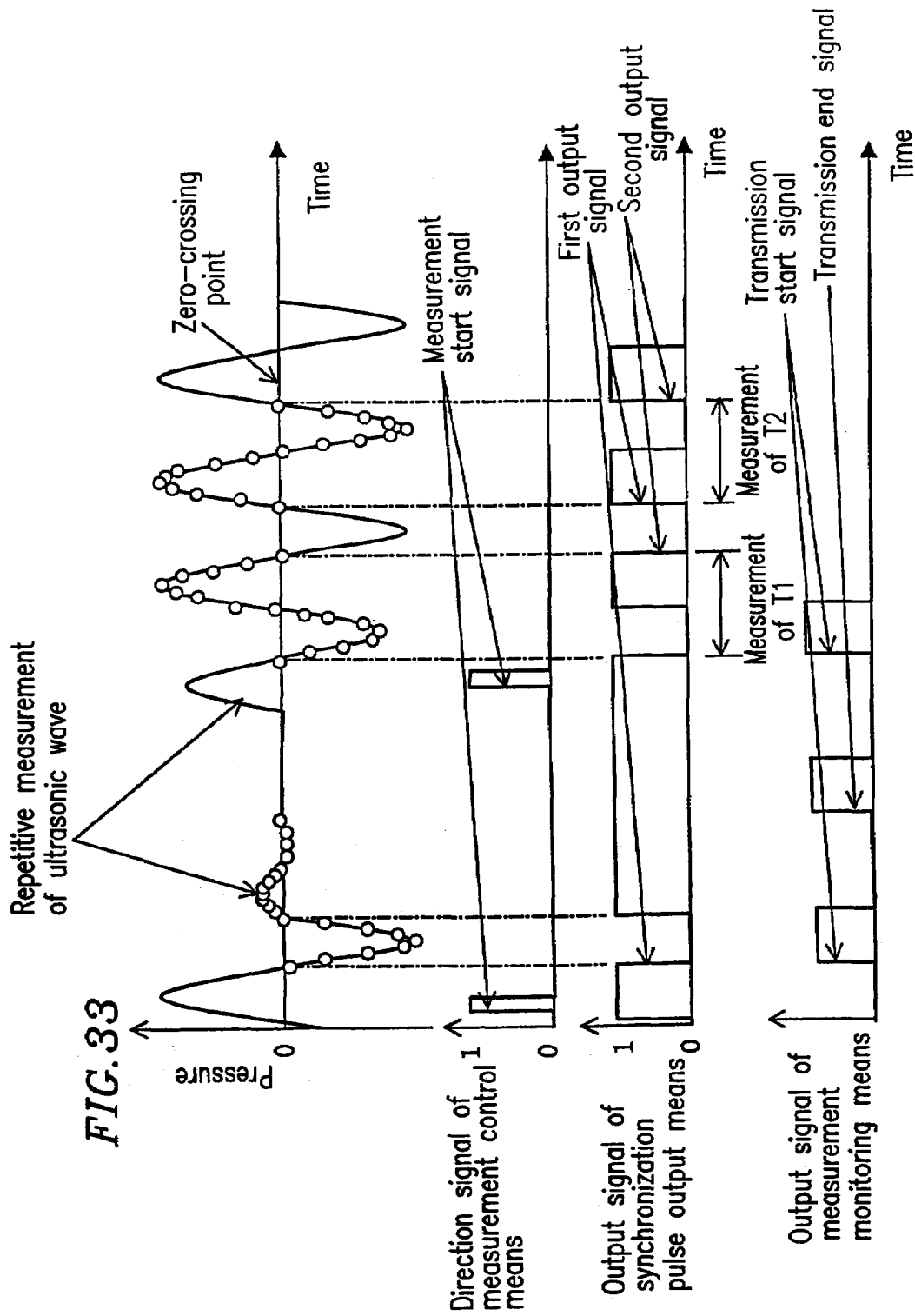
FIG. 33 is a timing chart showing an operation of a flowmeter of embodiment 14 of the present invention.

FIG. 33 is a timing chart showing an operation of a flowmeter according to embodiment 14 of the present invention. Embodiment 14 is different from embodiment 12 in that the flowmeter of embodiment 14 includes measurement monitoring means 335 wherein, when an end signal is not issued within a predetermined period after a start signal is issued, reception of a sonic wave is ended, and a start signal is output again. The structure of the flowmeter of embodiment 14 is shown in FIG. 29.

As shown in FIG. 33, the measurement control means 331 outputs a measurement start signal when a predetermined measurement time arrives, and detects a first output signal at a falling edge of an output signal of the synchronization pulse output means so as to start measurement. Then, when a second output signal (falling edge) of the output signal of the synchronization pulse output means does not emerge after a predetermined time period, waiting for the synchronization pulse signal is ended, and a start signal is output again for measurement. Herein, if measurement is performed at an interval of 2 seconds, and a pressure variation occurs within a range from 10 Hz to 20 Hz, the predetermined period as a waiting time can be set within a range from 0.1 second to 2 seconds. However, in this case, it is preferable to select 1 second as an optimum value. With 1 second, even if measurement is performed again (re-measurement), the measurement can be completed before a next measurement time arrives after 2 seconds. If no second output signal emerges in the re-measurement process, the operation waits for a next measurement time.

As described above, when no change occurs in the pressure after a measurement is started, waiting for a change is ended after a predetermined time period, and flow rate measurement is not performed, whereby an incorrect measurement of flow rate can be avoided. Furthermore, due to re-measurement, lack of certain periodic measurement data can be prevented, and measurement processing, such as averaging, can be smoothly performed, whereby the accuracy of a measured flow rate value can be improved. Furthermore, without a direction concerning the end of measurement, the time measurement means performs erroneous measurement, and the measurement accuracy decreases. Such measurement with a decreased accuracy can be avoided. Furthermore, the measurement is forcibly ended, whereby the measurement process does not stop due to a wait for an end direction. Thus, the process can proceed to a subsequent step. Therefore, a measurement operation can be achieved in a reliable manner.

EMBODIMENT 15

Figure 34:
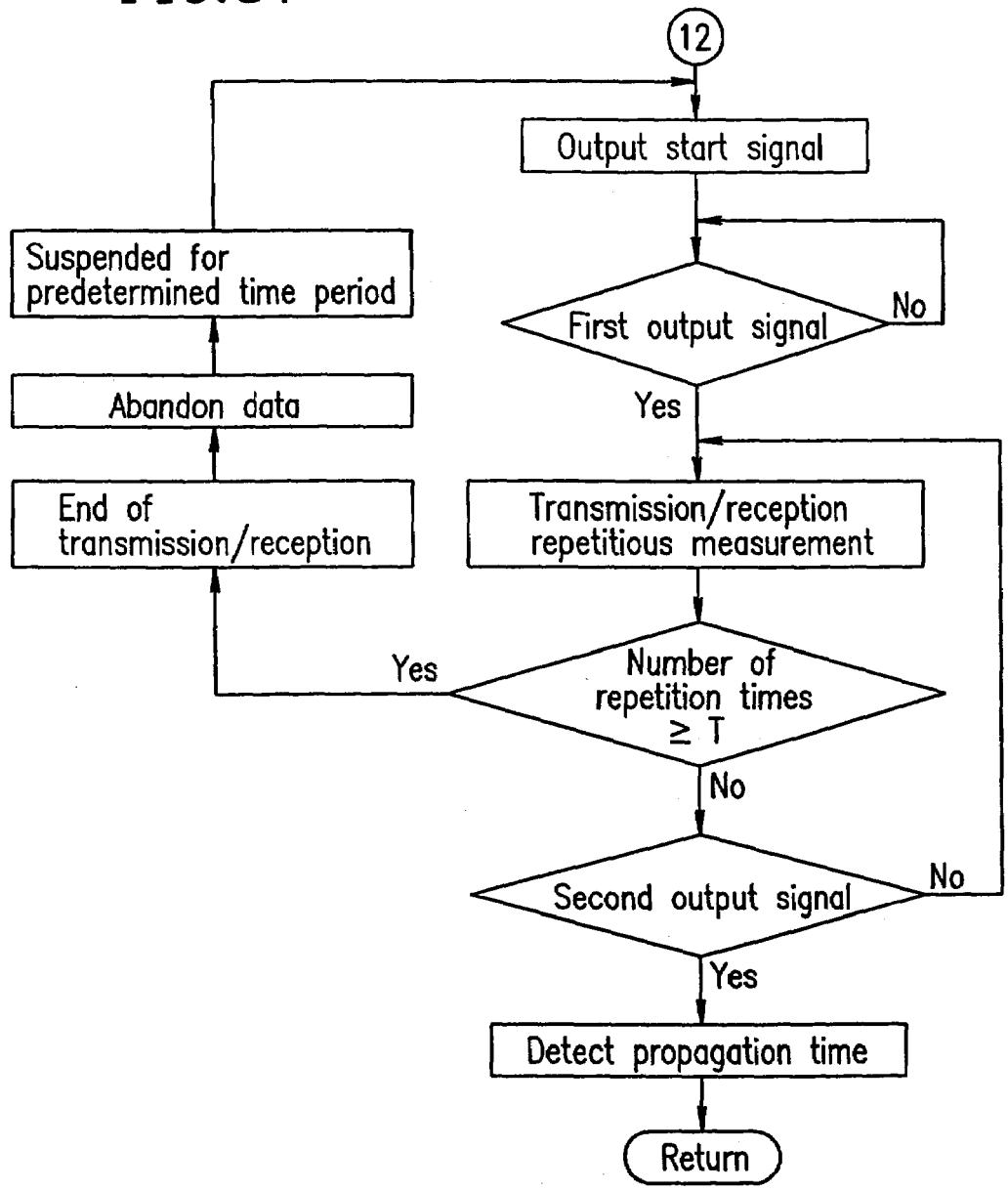
FIG. 34 is a flowchart showing an operation of a flowmeter of embodiment 15 of the present invention.

FIG. 34 is a flowchart showing an operation of a flowmeter according to embodiment 15 of the present invention. Embodiment 15 is different from embodiment 12 in that the flowmeter of embodiment 15 includes measurement monitoring means 335 wherein, when an end signal is not issued within a predetermined period T after a start signal is issued, reception of a sonic wave is ended, and measured data is abandoned. The structure of the flowmeter of embodiment 15 is shown in FIG. 29.

As shown in FIG. 34, after a first output signal is output, when a second output signal which indicates the end of one cycle is not issued after the predetermined time T (e.g., 0.5 second) has elapsed, repetition of transmission/reception of a ultrasonic wave is ended, and previously measured data are abandoned. Then, after being suspended for a predetermined time period, measurement is resumed.

As described above, when the measurement is not successful, the measured data is abandoned, whereby only data measured with a high accuracy can be used, and a measurement operation can be performed in a reliable manner. Further, it is not necessary to hold measured data, and accordingly, the amount of power consumed for measurement can be decreased. Furthermore, by monitoring whether or not the predetermined time T is longer than a periodical measurement cycle (e.g, 2 seconds), measurement can be performed such that measurement times do not overlap with each other. Even when a propagation time of an ultrasonic wave is varied due to a variation of temperature, the measurement operation can be managed by controlling the same predetermined time T.

EMBODIMENT 16

Figure 35:
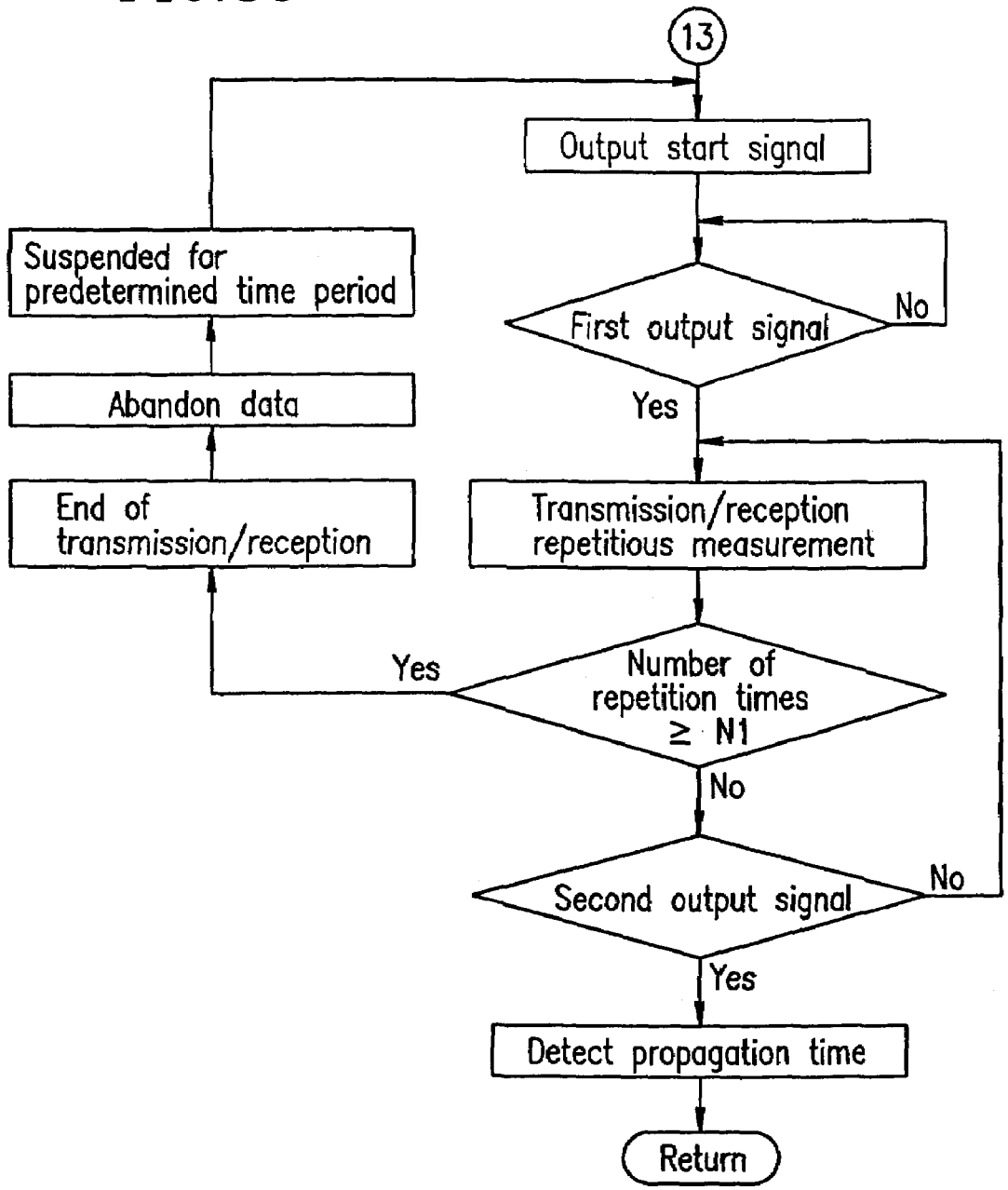
FIG. 35 is a flowchart showing an operation of a flowmeter of embodiment 16 of the present invention.

FIG. 35 is a flowchart showing an operation of a flowmeter according to embodiment 16 of the present invention. Embodiment 16 is different from embodiment 12 in that the flowmeter of embodiment 16 includes measurement monitoring means 335 wherein, when the number of repetition times is equal to or more than a predetermined number of times N1, reception of a sonic wave is ended, and measured data is abandoned. The structure of the flowmeter of embodiment 16 is shown in FIG. 29.

As shown in FIG. 35, after a first output signal is output, if a second output signal which indicates the end of one cycle is not issued when transmission/reception of an ultrasonic wave is repeated for the predetermined number of times N1 (e.g., 512 times) or more, repetition of transmission/reception of the ultrasonic wave is ended, and previously measured data are abandoned. Then, after being suspended for a predetermined time period, measurement is resumed.

As described above, when the measurement is not successful, the measured data is abandoned, whereby only data measured with a high accuracy can be used, and a measurement operation can be performed in a reliable manner. Further, it is not necessary to hold measured data, and accordingly, the amount of power consumed for measurement can be decreased. Furthermore, even when a propagation time of an ultrasonic wave is varied due to a variation of temperature, the measurement can be performed independently of the propagation time until the limit of the number of repetition times by controlling the number of repetition times.

EMBODIMENT 17

Figure 36:
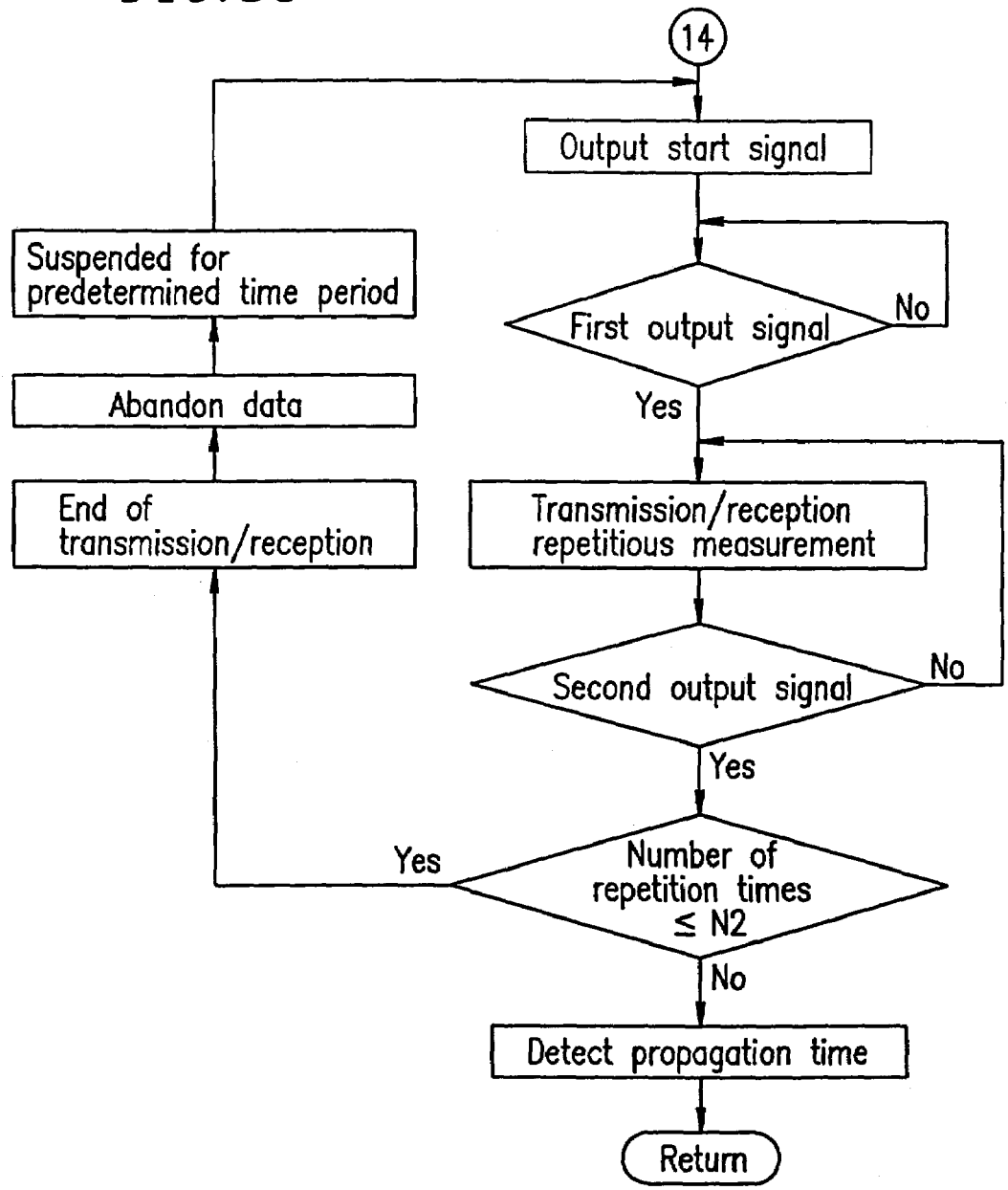
FIG. 36 is a flowchart showing an operation of a flowmeter of embodiment 17 of the present invention.

FIG. 36 is a flowchart showing an operation of a flowmeter according to embodiment 17 of the present invention. Embodiment 17 is different from embodiment 12 in that the flowmeter of embodiment 17 includes measurement monitoring means 335 wherein, when the number of repetition times is equal to or less than a predetermined number of times N2, measured data is abandoned, and a start signal is output again. The structure of the flowmeter of embodiment 17 is shown in FIG. 29.

As shown in FIG. 36, in predetermined measurement which is performed based on a variation frequency, when the number of repetition times is equal to or less than a predetermined number of times N2 (e.g., 100 times), previously measured data is abandoned. Then, after being suspended for a predetermined time period, the measurement is resumed.

Even when the measurement is correctly performed, if the number of repetition times is equal to or less than a predetermined number of times, it is probable that a pressure variation is not correctly grasped. In such a case, obtained data is abandoned and measurement is performed again, which is possible because the measurement is performed over more than one cycle. Therefore, a measurement operation can be performed in a reliable manner. Further, it is not necessary to hold measured data, and accordingly, the amount of power consumed for measurement can be decreased.

EMBODIMENT 18

Figure 37:
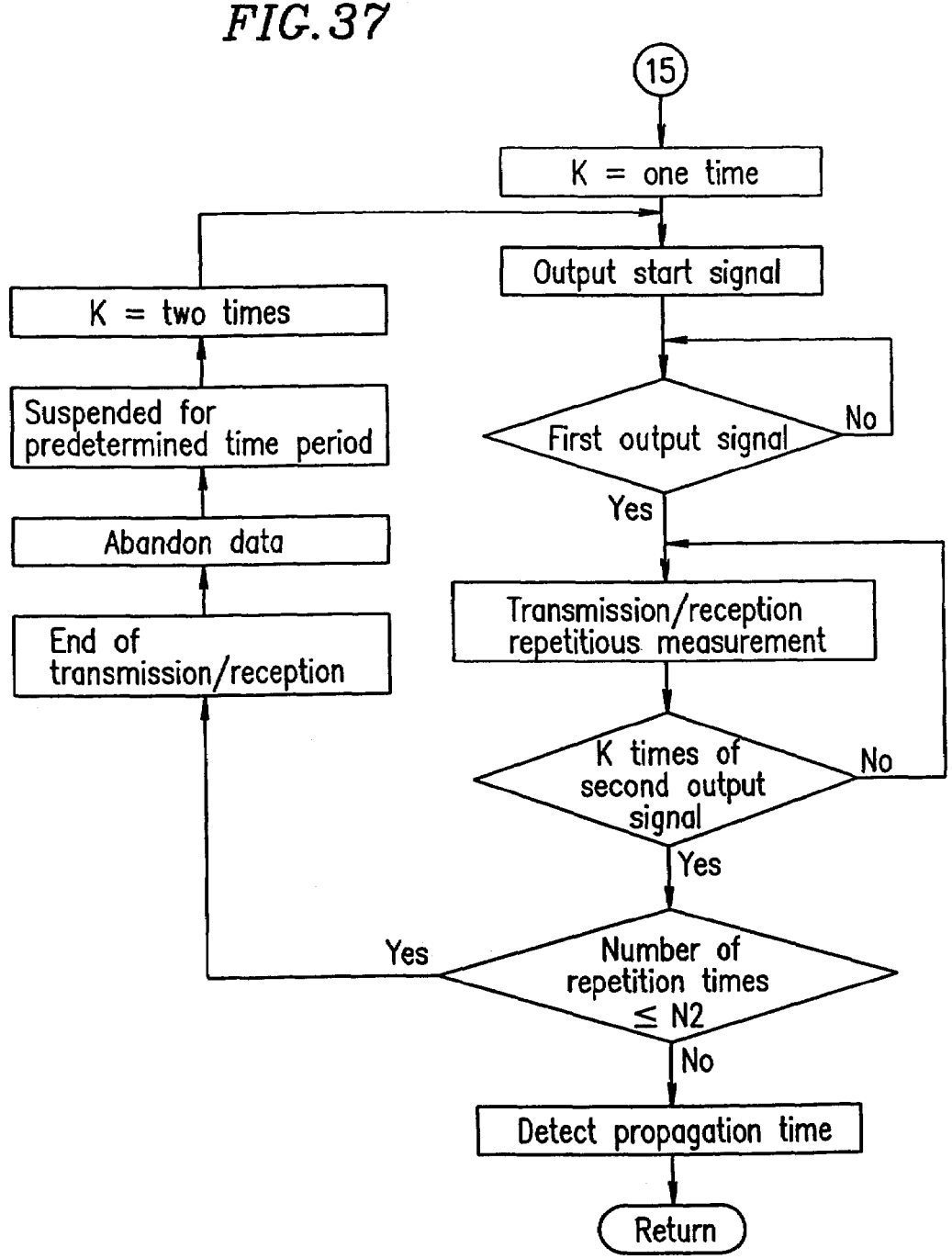
FIG. 37 is a flowchart showing an operation of a flowmeter of embodiment 18 of the present invention.

FIG. 37 is a flowchart showing an operation of a flowmeter according to embodiment 18 of the present invention. Embodiment 18 is different from embodiment 12 in that the flowmeter of embodiment 18 includes measurement monitoring means 335 wherein, when the number of repetition times is equal to or less than a predetermined number of times N2, measured data is abandoned, and a start signal is output again. The synchronization pulse output means 330 which functions as variation detection means outputs a second output signal when a signal of the synchronization pulse output means 330 reaches a second cycle and continues the measurement until an end signal, indicating the end of the second cycle, is issued. The structure of the flowmeter of embodiment 18 is shown in FIG. 29.

As shown in FIG. 37, in predetermined measurement which is performed based on a variation frequency, when the number of repetition times is equal to or less than a predetermined number of times N2 (e.g., 100 times), previously measured data is abandoned. Then, after being suspended for a predetermined time period, a second output signal is output when a signal of the synchronization pulse output means 330 reaches a second cycle, and the measurement is resumed and continued until an end signal of the second cycle is issued.

Even when the measurement is correctly performed, if the number of repetition times is equal to or less than a predetermined number of times, it is probable that a pressure variation is not correctly grasped. In such a case, obtained data is abandoned and measurement is performed again, which is possible because the measurement is performed over more than one cycle. Therefore, a measurement operation can be performed in a reliable manner. Further, since re-measurement is performed over two cycles, the measurement accuracy is improved due to such a long-time measurement.

EMBODIMENT 19

Figure 38:
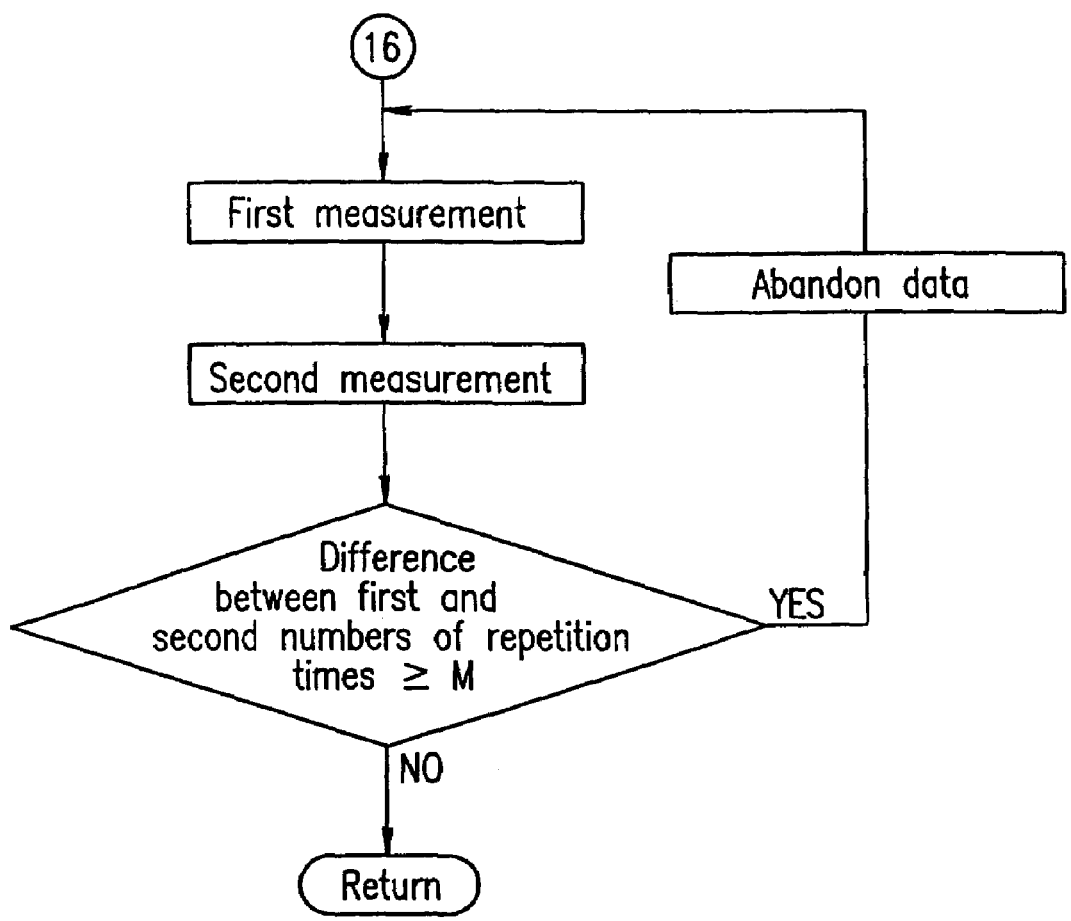
FIG. 38 is a flowchart showing an operation of a flowmeter of embodiment 19 of the present invention.

FIG. 38 is a flowchart showing an operation of a flowmeter according to embodiment 19 of the present invention. Embodiment 19 is different from embodiment 12 in that the flowmeter of embodiment 19 includes measurement monitoring means 335 wherein, when the difference between the first number of repetition times N3 of measurement, where an ultrasonic wave is transmitted from the first transmission/reception means among a pair of transmission/reception means to the second transmission/reception means, and the second number of repetition times N4 of measurement where an ultrasonic wave is transmitted from the second transmission/reception means to the first transmission/reception means, is equal to or more than a predetermined number of times, a start signal is output again. The structure of the flowmeter of embodiment 19 is shown in FIG. 29.

As shown in FIG. 38, in predetermined measurement which is performed based on a variation frequency, when the difference between the first number of repetition times N3 and the second number of repetition times N4 is equal to or more than a predetermined number of times M (e.g., 10 times), previously measured data is abandoned. Then, after being suspended for a predetermined time period, the measurement is resumed.

Even when the measurement is correctly performed, if the difference between the first number of repetition times N3 and the second number of repetition times N4 is large, it is probable that a pressure variation is not correctly grasped, or that the frequency of a pressure variation is changed. If so, a result of the measurement is not correct. Thus, the obtained data is abandoned, and measurement is performed again, whereby a measurement operation can be performed in a reliable manner.

EMBODIMENT 20

Figure 39:
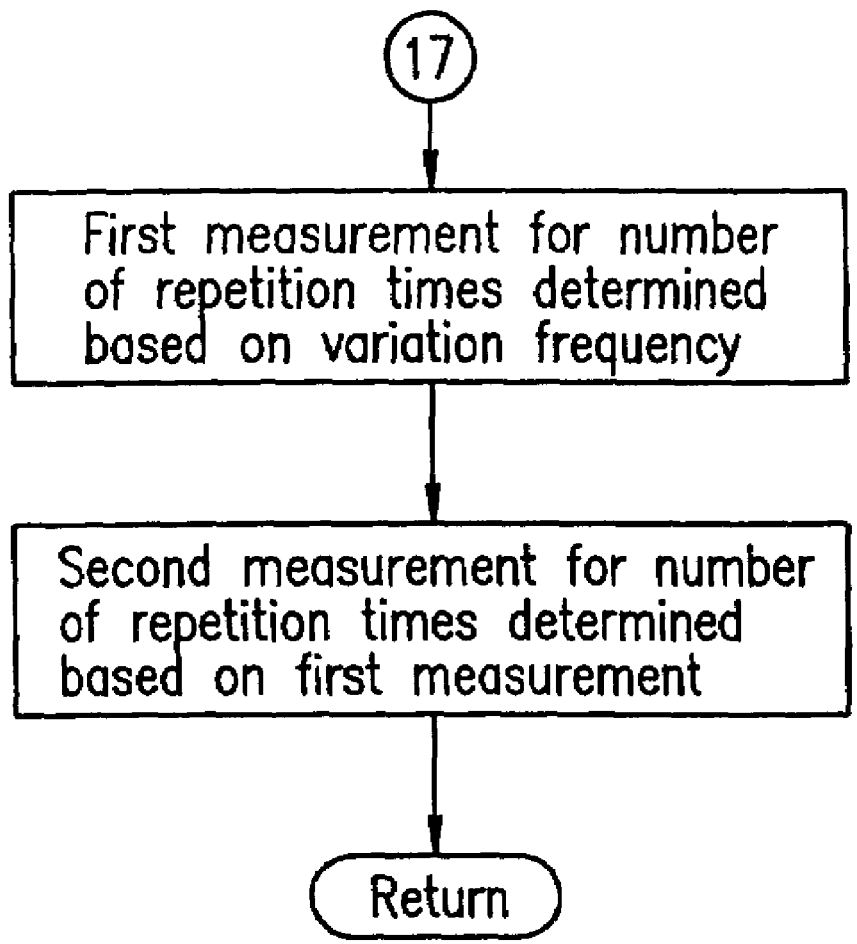
FIG. 39 is a flowchart showing an operation of a flowmeter of embodiment 20 of the present invention.

FIG. 39 is a flowchart showing an operation of a flowmeter according to embodiment 20 of the present invention. Embodiment 20 is different from embodiment 12 in that the flowmeter of embodiment 20 includes repetition means 334 for setting the number of repetition times such that the first number of repetition times N3 of measurement, where an ultrasonic wave is transmitted from the first transmission/reception means among a pair of transmission/reception means to the second transmission/reception means, is equal to the second number of repetition times N4 of measurement, where an ultrasonic wave is transmitted from the second transmission/reception means to the first transmission/reception means. The structure of the flowmeter of embodiment 20 is shown in FIG. 29.

As shown in FIG. 39, in predetermined measurement which is performed based on a variation frequency, measurement is performed for the second number of repetition times which is equal to the first number of repetition times N3. That is, the second measurement is performed for the first number of repetition times N3, whereby the measurement can be performed without causing a large difference between a true value and a measured value even when the frequency of a pressure variation varies sharply.

Thus, even when the frequency of a pressure variation sharply varies, flow rate measurement can be performed. For example, in the case of a gas meter, there is a time when it is necessary to perform flow rate measurement for securing safety. Even when the frequency of a pressure variation sharply varies, measurement is performed as described above, whereby it can be quickly determined whether or not the measured value is in the vicinity of a predetermined flow rate.

EMBODIMENT 21

Figure 40:
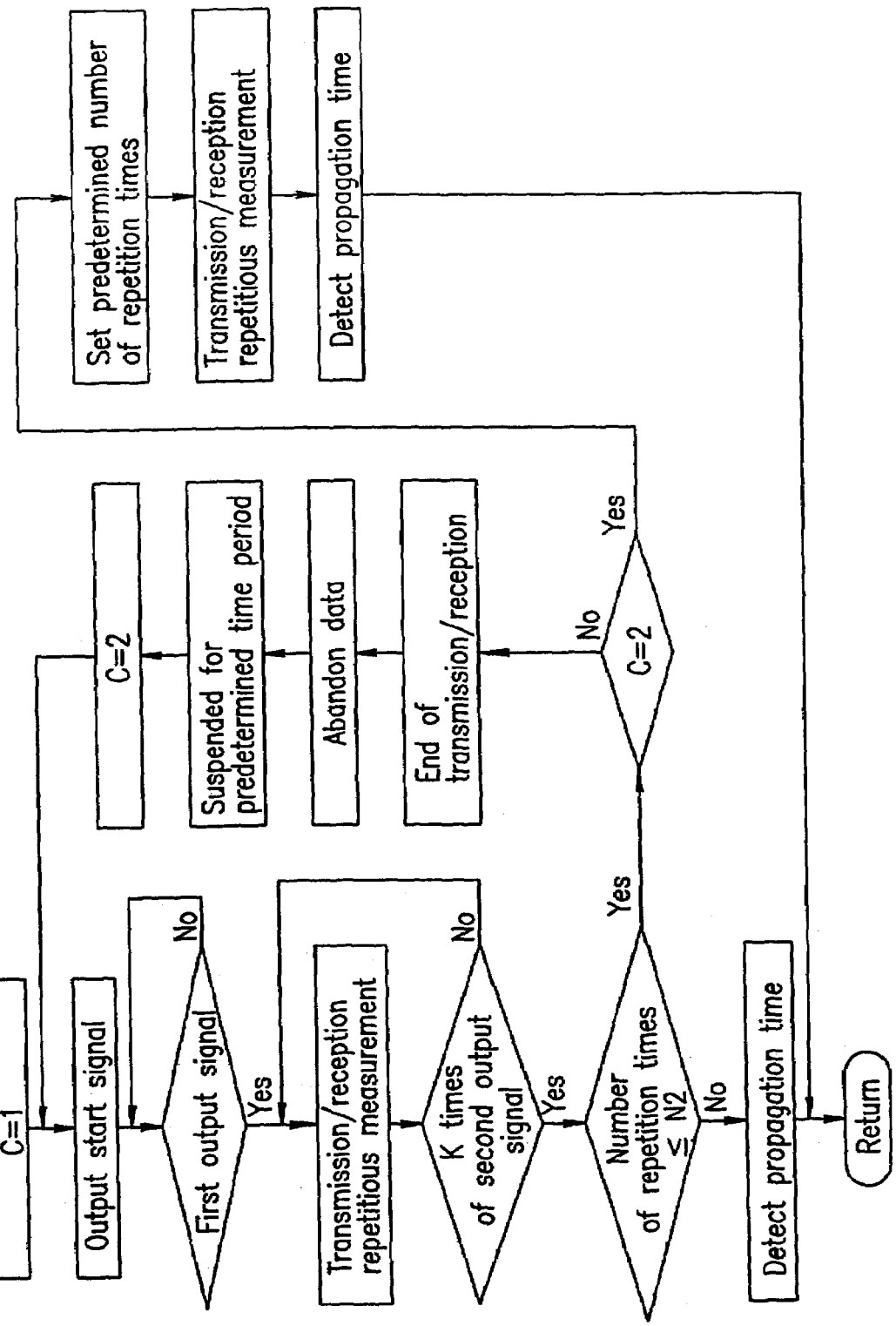
FIG. 40 is a flowchart showing an operation of a flowmeter of embodiment 21 of the present invention.

FIG. 40 is a flowchart showing an operation of a flowmeter according to embodiment 21 of the present invention. Embodiment 21 is different from embodiment 12 in that the flowmeter of embodiment 21 includes measurement monitoring means 335 for monitoring a measurement operation such that the number of times that a start signal is output again is limited to a predetermined number of times C so as not to permanently repeat outputting of the start signal. The structure of the flowmeter of embodiment 21 is shown in FIG. 29.

As shown in FIG. 40, when measurement is performed again after measurement based on a pressure variation has failed, the number of times C for the re-measurement is limited (e.g., up to 2 times), whereby outputting of the start signal is prevented from being repeated permanently. As a result, the flow rate measurement can be performed in a reliable manner.

EMBODIMENT 22

Figure 41:
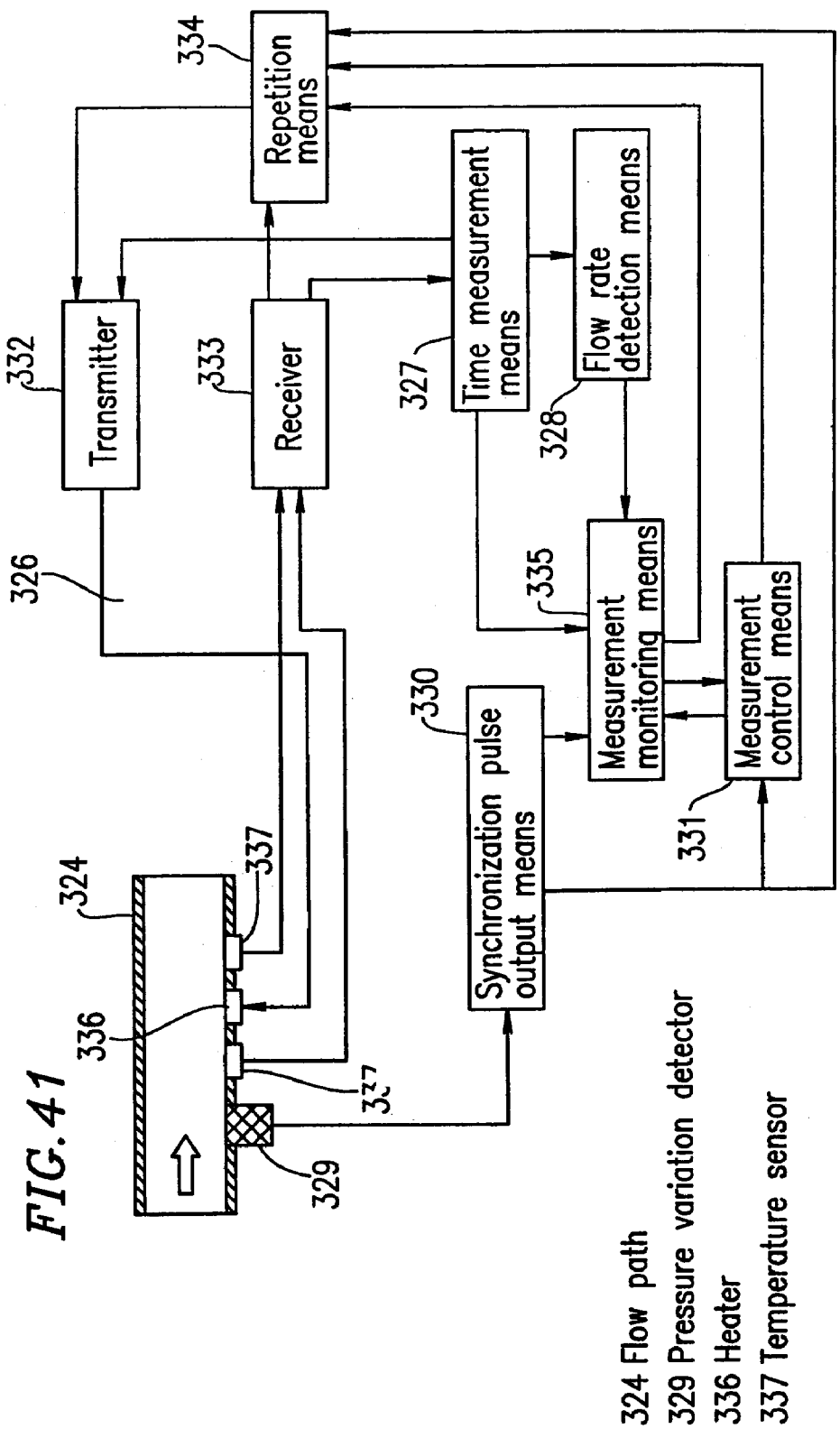
FIG. 41 is a block diagram showing a flowmeter according to embodiment 22 of the present invention.

FIG. 41 is a block diagram showing a flowmeter according to embodiment 22 of the present invention. Embodiment 22 is different from embodiment 12 in that, in embodiment 22, propagation of heat is utilized for detecting a change in the state of fluid. Reference numeral 336 denotes a heater for emitting heat. Reference numeral 337 denotes a temperature sensor for receiving the heat.

Even when a temperature sensor which is heat transmission/reception means is used, flow rate measurement can be continuously performed with a high accuracy similarly to the above-described embodiments, because the measurement monitoring means detects each abnormality and perform various processing according to the detected abnormality.

EMBODIMENT 23

Figure 42:
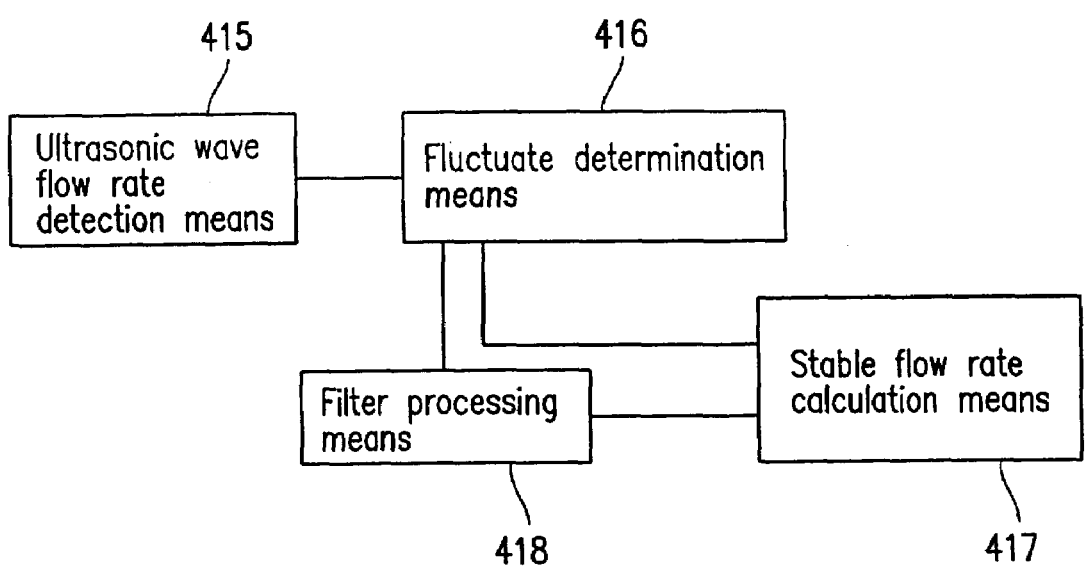
FIG. 42 is a block diagram showing a flowmeter according to embodiment 23 of the present invention.

FIG. 42 is a block diagram showing a flowmeter according to embodiment 23 of the present invention. In FIG. 42, reference numeral 415 denotes ultrasonic wave flow rate detection means for detecting an instantaneous flow rate; reference numeral 416 denotes fluctuation determination means for determining whether or not the flow rate value varies in a pulsed manner; reference numeral 417 denotes stable flow rate calculation means for calculating a flow rate value by using different means according to the determination result of the fluctuation determination means; and reference numeral 418 denotes filter processing means for performing digital filter processing on a flow rate value.

Figure 43:
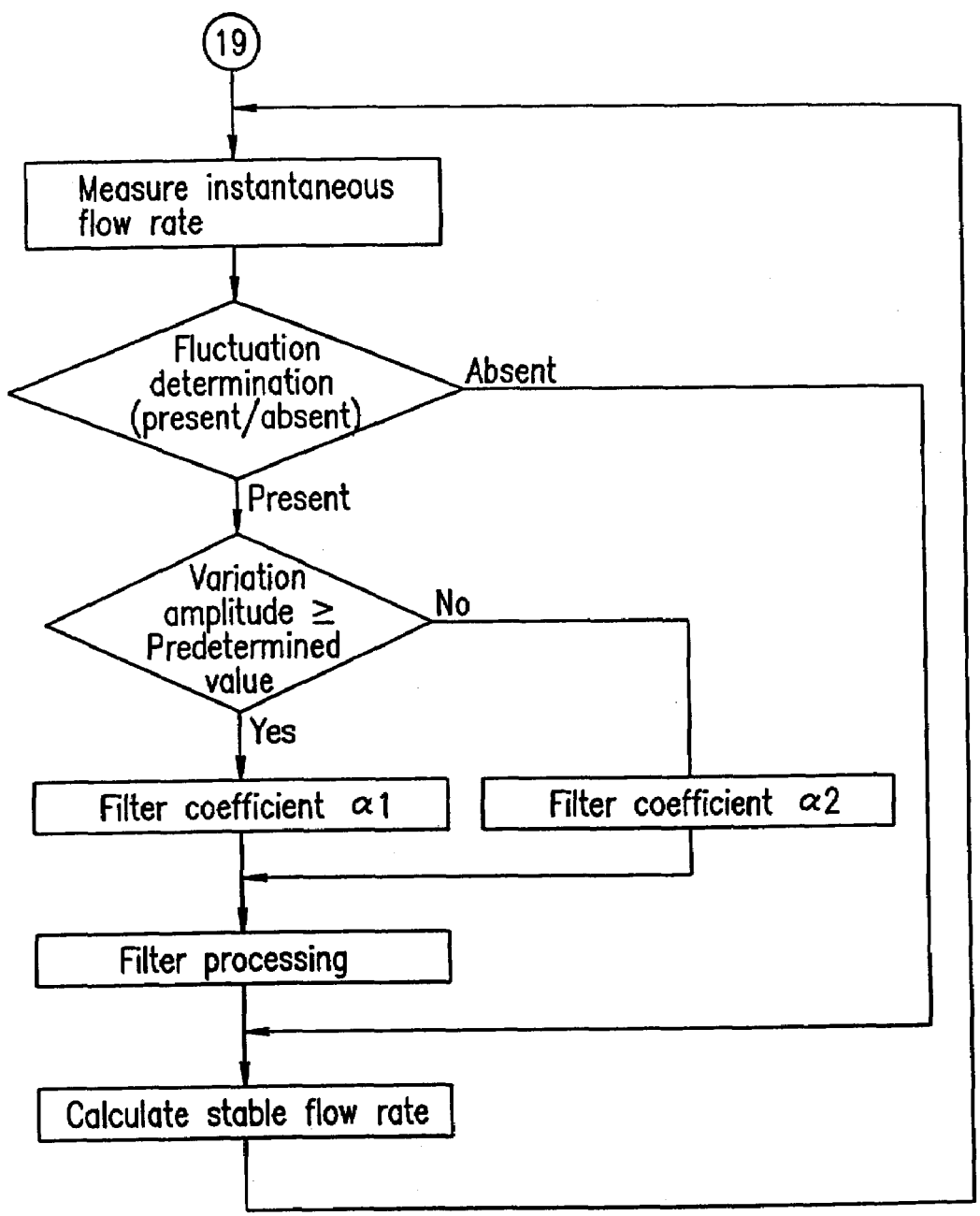
FIG. 43 is a flowchart showing an operation of the flowmeter according to embodiment 23.

Next, an operation and function are described with reference to FIGS. 43 through 45. As shown in FIG. 43, in the flowmeter of the present invention, when the difference between an instantaneous flow rate Q(i) measured by the ultrasonic wave flow rate detection means and a previously-measured instantaneous flow rate Q(i−1) is equal to or greater than a predetermined value (e.g., 1 liter/hour), the fluctuation determination means determines that there is a pulse. When there is a pulse, the filter coefficient for filter processing is changed according to the magnitude of the pulse. When there is no pulse, the filter processing is not performed, and the instantaneous flow rate value is treated as a stable flow rate. Herein, the digital filter processing is performed based on the flow shown in FIG. 3 and is expressed, for example, as the following expression: $D(i) = \alpha D(i-\alpha) Q(i)$, where $\alpha$ denotes the filter coefficient, $Q(i)$ denotes i-th instantaneous flow rate, and $D(i)$ denotes a stable flow rate to be obtained after the filter processing. Such a filter has a characteristic of a low-pass filter which is shown in FIG. 45. As the filter coefficient is closer to 1 (generally, 0.999), the filter allows only a lower frequency component to pass therethrough. Thus, the filter can remove a varying value so as not to pass through the filter. When the variation amplitude is small, filter coefficient $\alpha 2$ (generally, $\alpha 2 = 0.9$) is selected, and an improved response characteristic to a flow rate variation is obtained with such a relaxed filter characteristic, so that a flow rate variation can be quickly dealt with. Further, when the variation amplitude is large, filter coefficient a1 (generally, $\alpha 2 = 0.9999$) is selected, and a variation in a flow rate value is suppressed with such an extreme low pass filter characteristic.

Furthermore, a pulse component A(i) can be obtained by expression, A(i)=Q(i)−D(i), and A(i) can be used as a variation amplitude.

Thus, the filter processing is performed when the amplitude of a pulse is equal to or greater than a predetermined value, whereby a variation component can be removed. Accordingly, even when a pulse occurs, stable flow rate measurement can be performed with one ultrasonic wave flow rate measurement means. Further, a calculation equivalent to averaging processing can be performed by filter processing without using a large number of memories for storing data. Moreover, the filter characteristic can be freely modified by changing one variable, i.e., a filter coefficient α. Thus, the filter characteristic can be modified according to the magnitude of a pulse. Furthermore, when a pulse occurs, a sharp filter characteristic is selected so as to render a large pulse stable, and the filter processing can be performed only when a pulse occurs. Furthermore, the determination is performed based on the variation amplitude of a pulse, whereby the filter processing can be modified based on the variation amplitude of a pulse. Furthermore, since the filter characteristic is modified based on the variation amplitude, a relaxed filter characteristic that allows a quick variation according to a variation in a flow rate is selected when the variation is small, and when the variation is large, a sharp filter characteristic is selected such that a variation of the flow rate due to a pulse is significantly suppressed.

Figure 44:
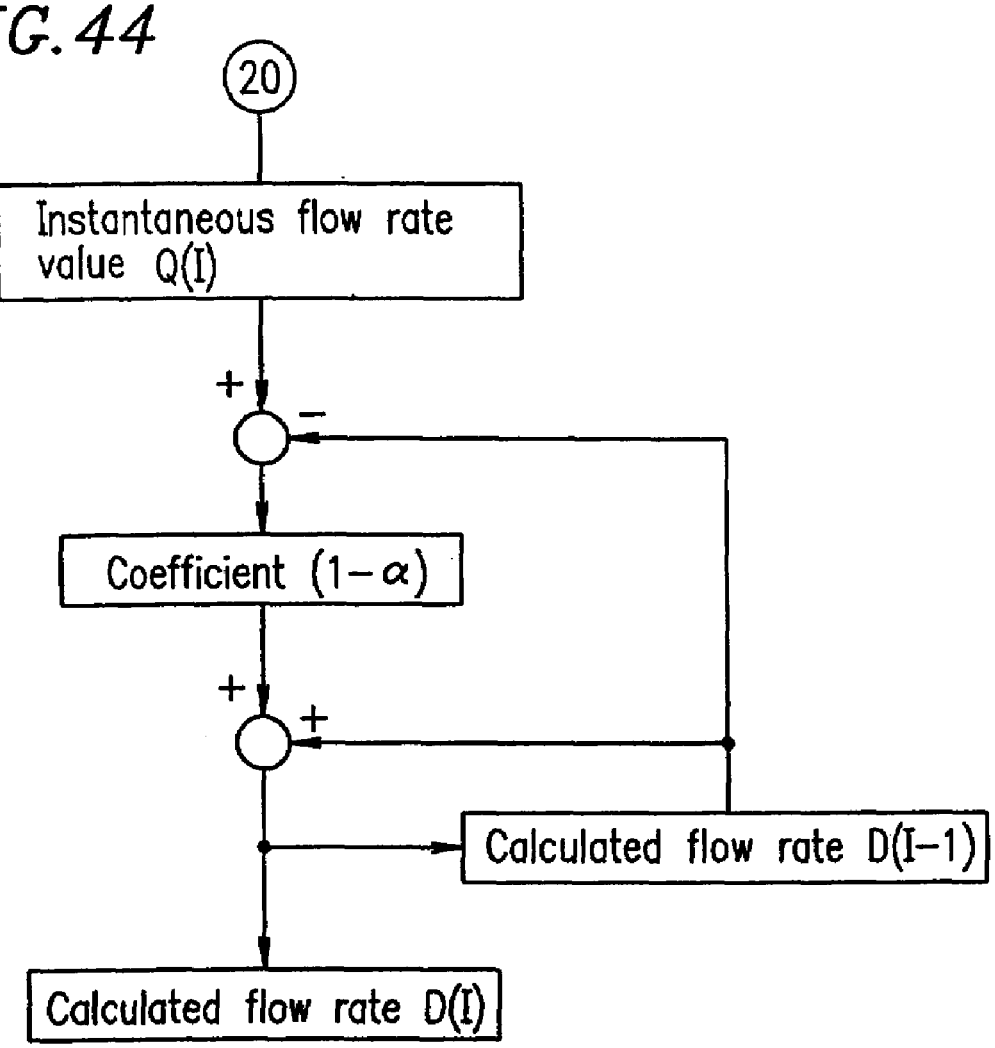
FIG. 44 is a flowchart showing a digital filter processing of the flowmeter of embodiment 23.
Figure 45:
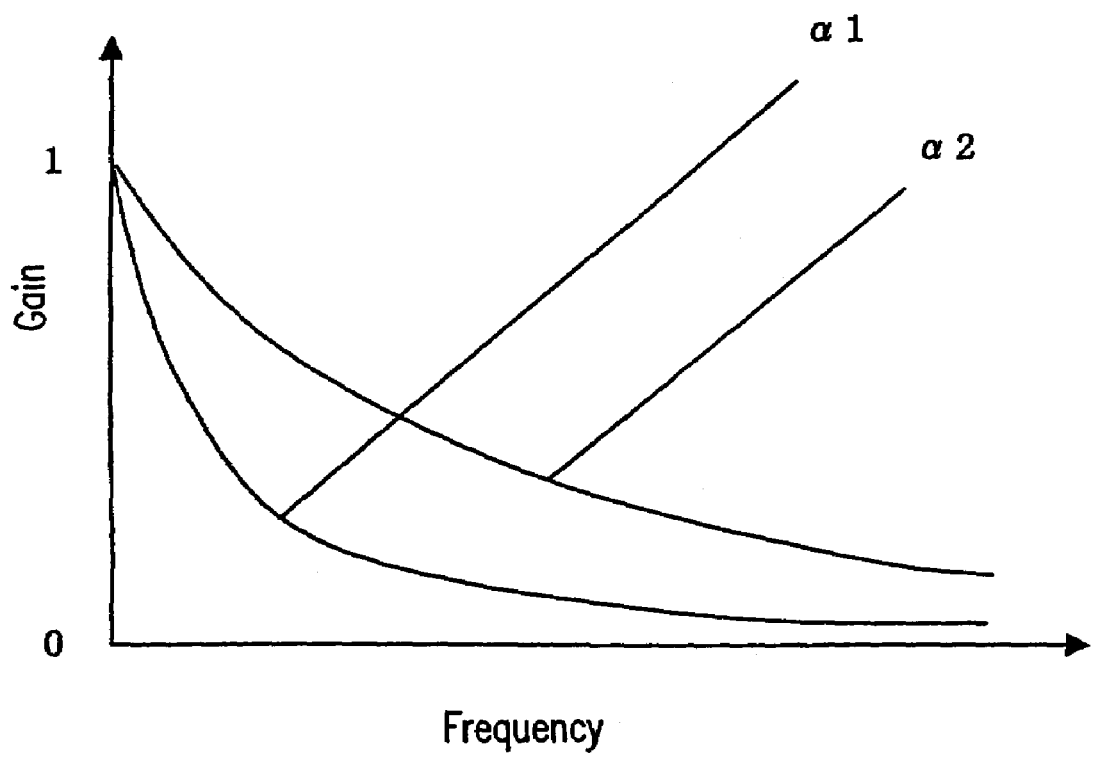
FIG. 45 is a filter characteristic graph for illustrating an operation of the flowmeter of embodiment 23.

In this embodiment, the digital filter processing method described is as shown in FIG. 44. However, the same effects can be obtained by using other filter processing method.

In the above-described example, the flowmeter is a general-purpose measuring device. However, when the flowmeter of this embodiment is used in a gas meter, the flow meter can be provided to a flow-path pipe in which fluctuation occurs, such as a pipeline system where a gas engine heat pump is used.

EMBODIMENT 24

Figure 46:
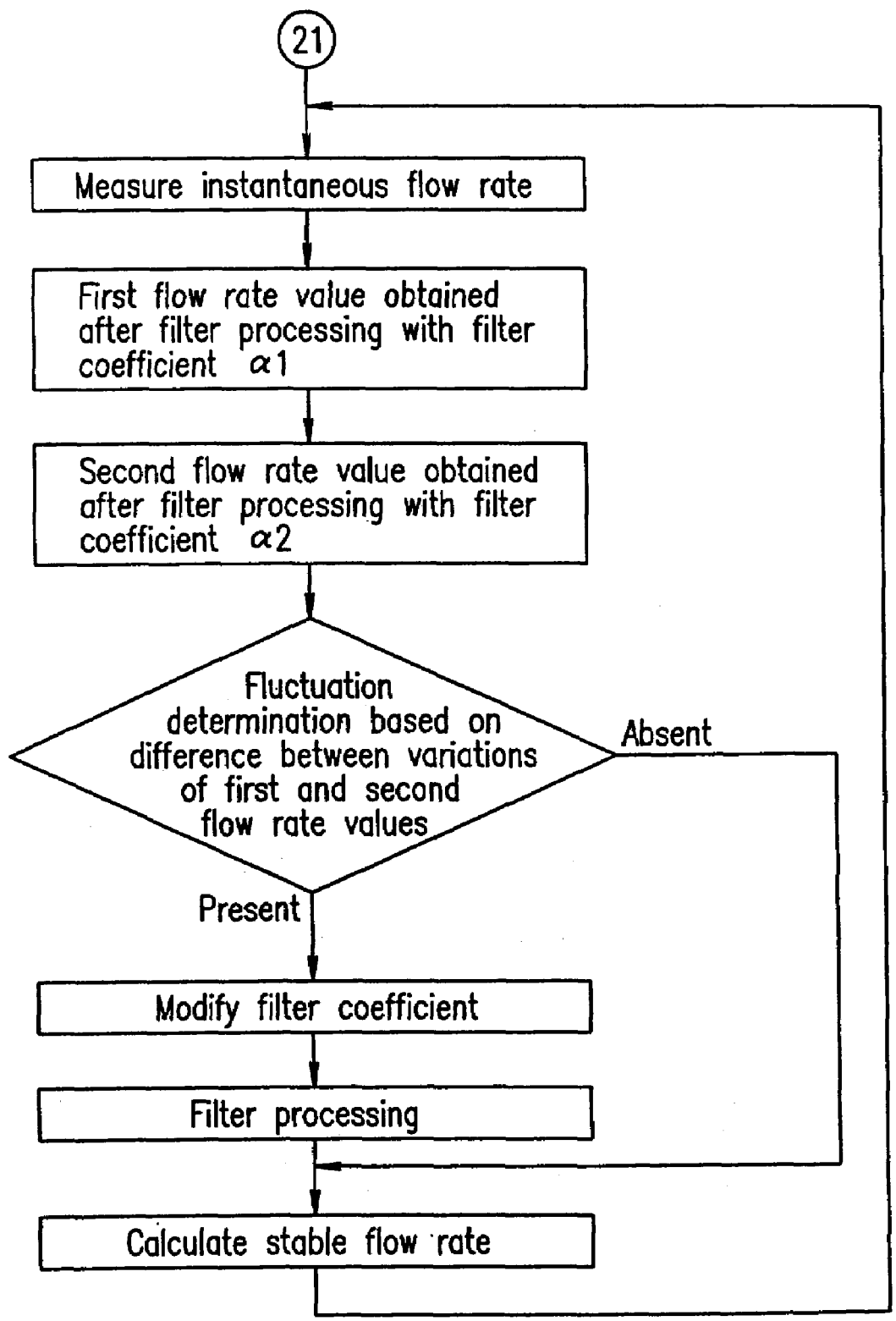
FIG. 46 is a flowchart showing an operation of a flowmeter of embodiment 24 of the present invention.

FIG. 46 is a flowchart showing an operation of a flowmeter according to embodiment 24 of the present invention. Embodiment 24 is different from embodiment 23 in that the flowmeter of embodiment 24 includes pulse amplitude detection means for detecting the variation amplitude of a pulse based on two flow rate values which have been subjected to filter processing while changing the filter coefficient α.

As shown in FIG. 46, the difference between a first flow rate value which has been subjected to filter processing with a filter coefficient a1 (e.g., $\alpha 1=0.999$) and a second flow rate value which has been subjected to filter processing with a filter coefficient α2 (e.g., $\alpha 2=0.9$) is greater than a predetermined value (e.g., 1 liter/hour), the large filter coefficient α1 is decreased little by little, such that the flow rate value after stable flow rate calculation quickly becomes stable. Such processing is performed when $1>\alpha 1>\alpha 2>0$.

When a stable flow rate which is subjected to filter processing with a large filter coefficient is used, a response characteristic to a flow rate variation is decreased when a pulse causes a variation in the flow rate. However, by processing using two filters, even if the flow rate varies sharply when fluctuation occurs, such a variation can be quickly handled by using a flow rate calculated with a smaller flow rate coefficient.

EMBODIMENT 25

Figure 47:
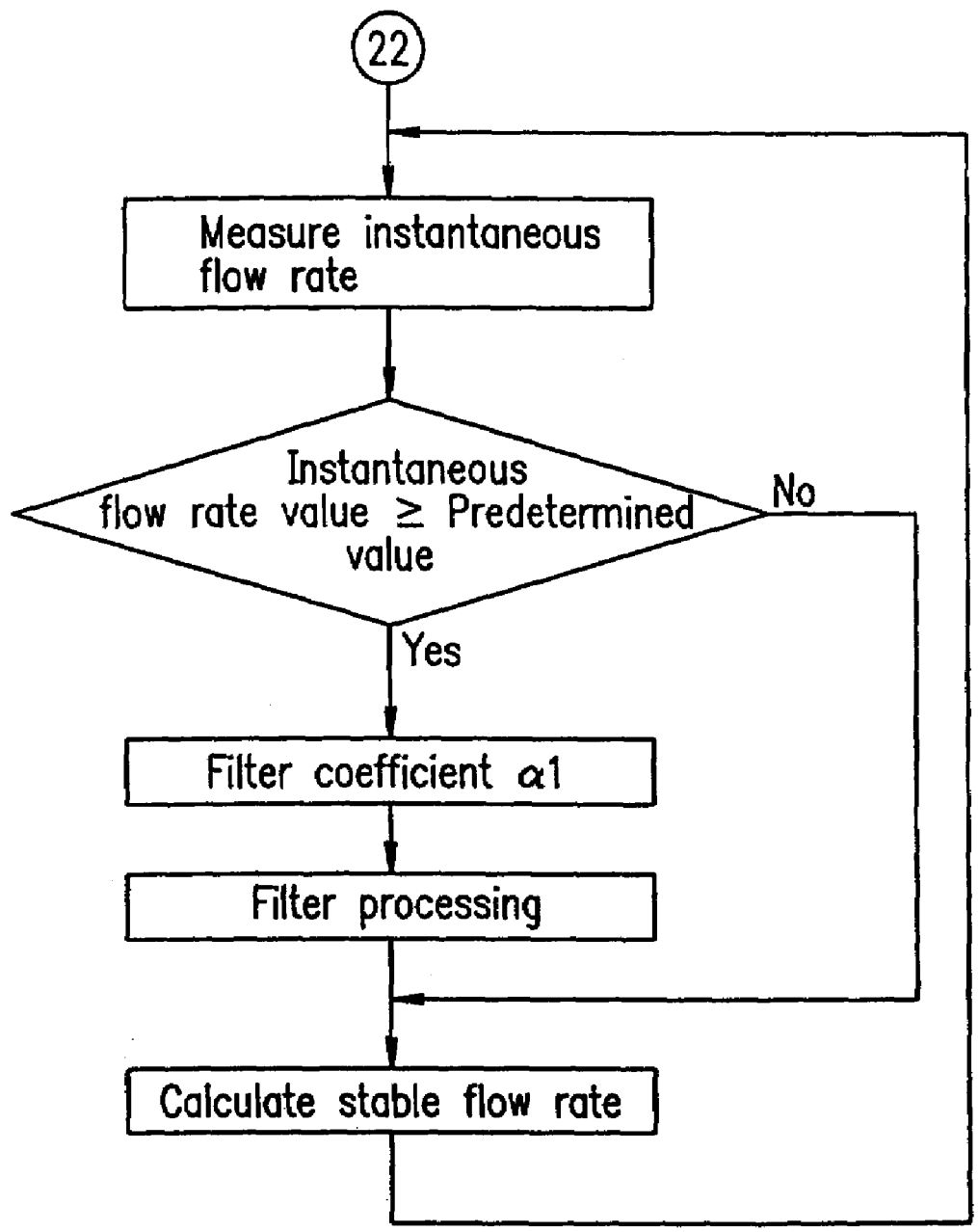
FIG. 47 is a flowchart showing an operation of a flowmeter of embodiment 25 of the present invention.

FIG. 47 is a flowchart showing an operation of a flowmeter according to embodiment 25 of the present invention. Embodiment 25 is different from embodiment 23 in that filter processing is performed only when a flow rate value detected by the instantaneous flow rate detection means is low.

As shown in FIG. 47, when an instantaneous flow rate measured by the ultrasonic wave flow rate measurement means is smaller than a predetermined flow rate (e.g., 120 liter/hour), a stable flow rate can be correctly measured by a filter process even when a pulse occurs. Furthermore, when the instantaneous flow rate measured by the ultrasonic wave flow rate measurement means is equal to or greater than the predetermined flow rate, the ratio of a variation amplitude of flow rate measurement due to fluctuation is small. Thus, flow rate measurement can be performed correctly without filter processing. Furthermore, since the flow rate is small, the filter processing is performed using a filter coefficient a of a large value (e.g., $\alpha(=0.999)$).

As described above, filter processing is performed only when the flow rate is low. Accordingly, a variation of flow rate can be quickly handled when the flow rate is high, and an influence of fluctuation which may be caused when the flow rate is low can be significantly suppressed.

EMBODIMENT 26

Figure 48:
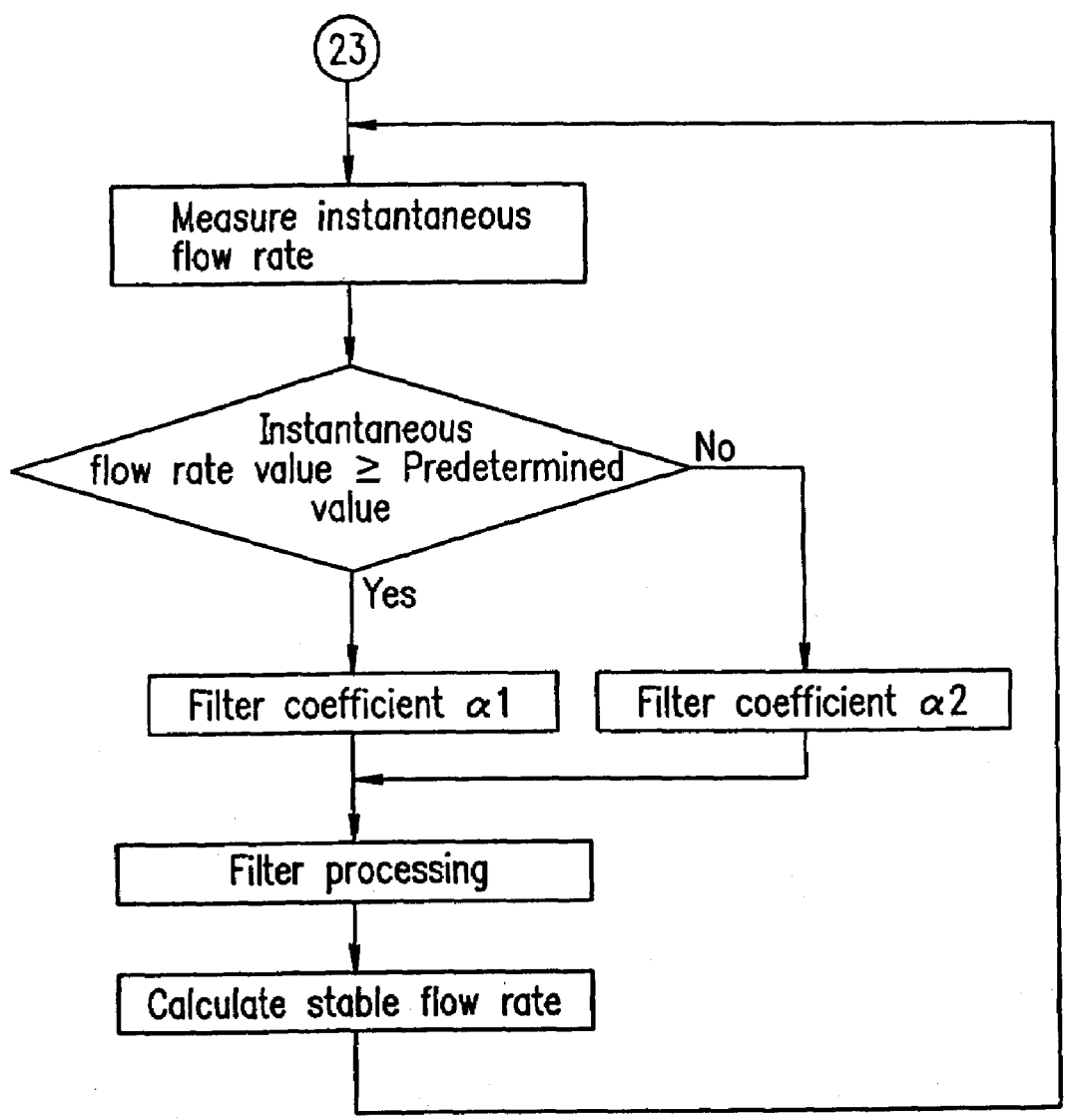
FIG. 48 is a flowchart showing an operation of a flowmeter of embodiment 26 of the present invention.

FIG. 48 is a flowchart showing an operation of a flowmeter according to embodiment 26 of the present invention. Embodiment 26 is different from embodiment 23 in that the filter processing means modifies a filter characteristic according to the flow rate value.

As shown in FIG. 48, filter coefficient α1 (e.g., $\alpha 1=0.9$) is selected when an instantaneous flow rate measured by the ultrasonic wave flow rate measurement means is equal to or greater than a predetermined value (e.g., 120 liter/hour), and filter coefficient α2 (e.g., $\alpha 2=0.999$) is selected when the instantaneous flow rate is smaller than the predetermined value. When the flow rate is low, filter coefficient α2 is increased, such that a stable flow rate is mainly measured. For example, when the flowmeter is used in a gas meter, leakage detection, equipment determination, and pilot-burner registration are correctly performed. On the other hand, when the flow rate is high, filter coefficient α1 is decreased, such that the measurement can be quickly modified according to a flow rate variation, whereby a response characteristic of an integrated flow rate is improved.

As described above, the filter characteristic is modified according to the flow rate value. Filter processing is performed when the flow rate is low, and when the flow rate is high, a flow rate variation can be quickly handled. Besides, when the flow rate is low, an influence of fluctuation can be considerably suppressed. As a result, when the flow rate is high, a response characteristic is increased, and when the flow rate is low, fluctuation can be suppressed.

EMBODIMENT 27

Figure 49:
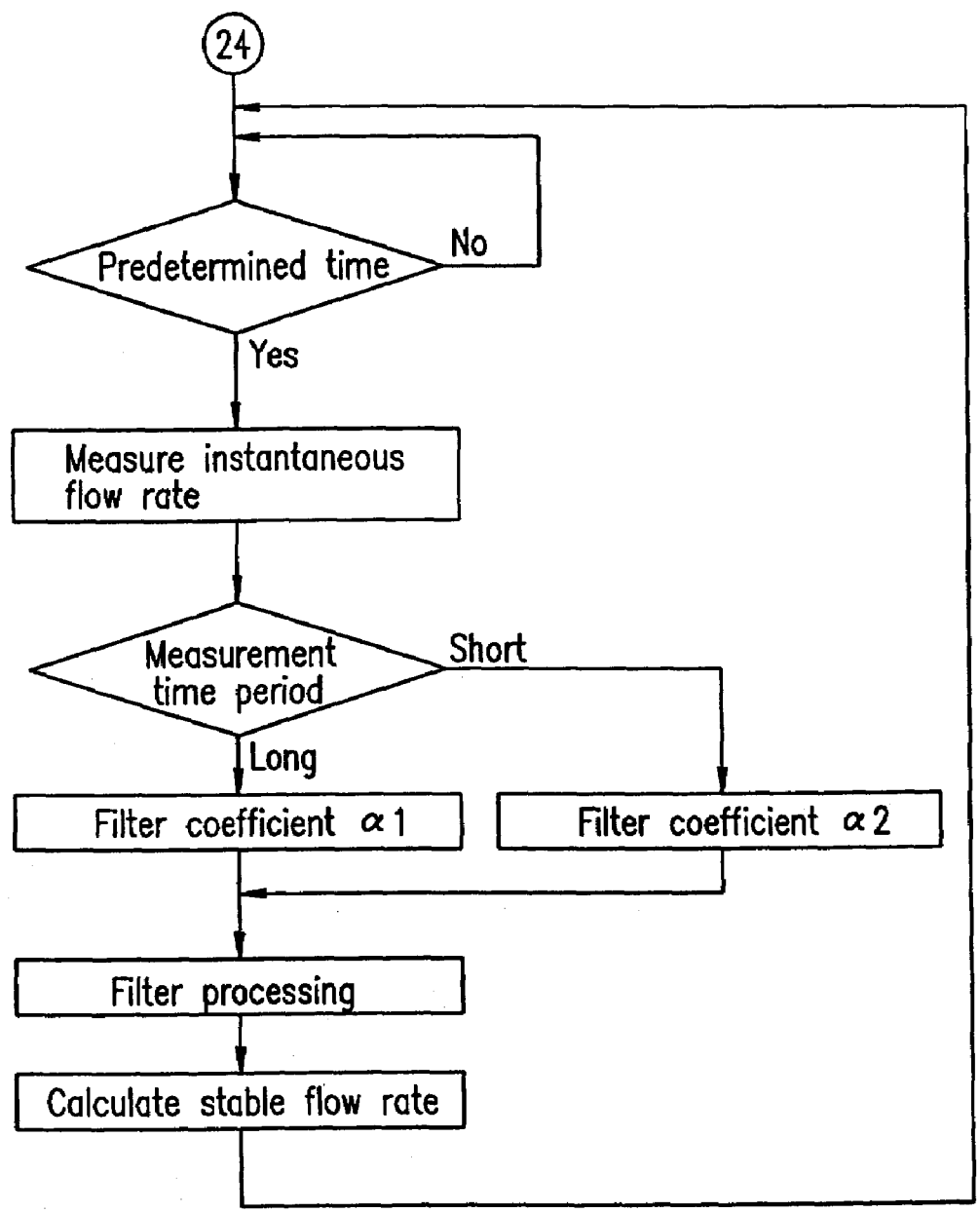
FIG. 49 is a flowchart showing an operation of a flowmeter of embodiment 27 of the present invention.

FIG. 49 is a flowchart showing an operation of a flowmeter according to embodiment 27 of the present invention. Embodiment 27 is different from embodiment 23 in that the filter processing means modifies a filter characteristic at an interval of a flow rate measurement time of the ultrasonic wave flow rate measurement means.

As shown in FIG. 49, when the time period for which the flow rate is measured by the ultrasonic wave flow rate measurement means is long (e.g., 12 seconds), a small value is used as filter coefficient α1 (e.g., α1=0.9) for filter processing. When the time period for which the flow rate is measured by the ultrasonic wave flow rate measurement means is short, a large value is used as filter coefficient α2 (e.g., α2=0.999) for filter processing.

The filter characteristic is modified according to the length of the time period for flow rate detection. When the measurement period is short, a relaxed filter characteristic is used, and when the measurement period is long, a sharp filter characteristic is used, whereby a variation in the filter characteristic can be suppressed.

EMBODIMENT 28

Figure 50:
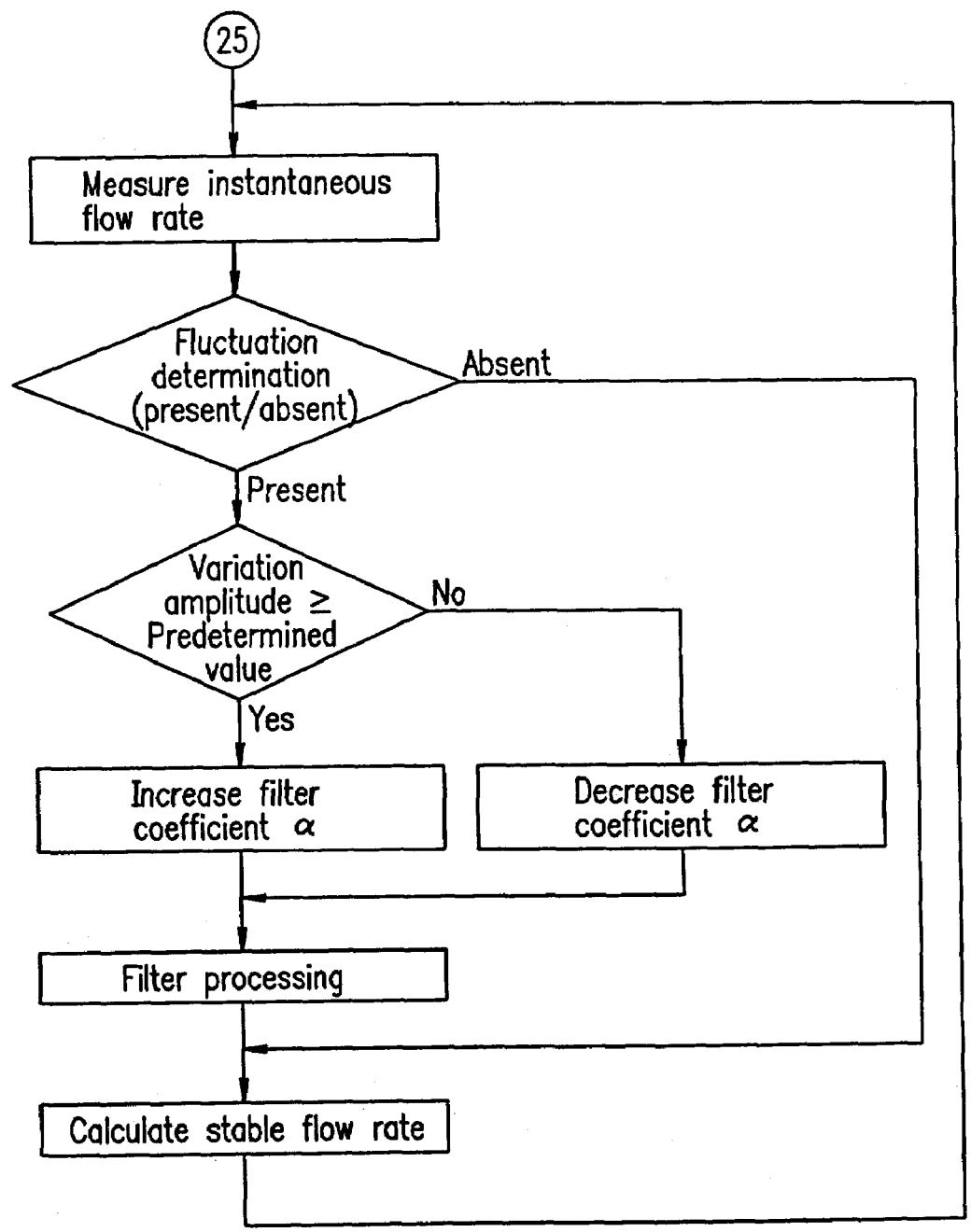
FIG. 50 is a flowchart showing an operation of a flowmeter of embodiment 28 of the present invention.

FIG. 50 is a flowchart showing an operation of a flowmeter according to embodiment 28 of the present invention. Embodiment 28 is different from embodiment 23 in that the filter characteristic is modified such that a variation amplitude of a flow rate value calculated by the stable flow rate calculation means is within a predetermined range.

As shown in FIG. 50, when a variation value of the flow rate which is obtained by stable flow rate calculation processing after the filter processing is equal to or greater than a predetermined value (e.g., 1 liter/hour), the filter coefficient a is increased so as to control the measurement such that the flow rate variation is suppressed. When the variation value of the flow rate is smaller than the predetermined value, the filter coefficient a is decreased, and the filter processing is performed under a state where a flow rate variation can be dealt with.

The filter characteristic is appropriately modified such that a variation value obtained after the stable flow rate calculation means is within a predetermined range, whereby the flow rate variation can always be suppressed to be equal to or smaller than a predetermined value.

The increased amount of the filter coefficient is changed according to the variation value of the flow rate. When the variation amplitude is large, the increased amount of the filter coefficient is increased. When the variation amplitude is small, the increased amount of the filter coefficient is decreased. With such an arrangement, a variation in the flow rate can be smoothly suppressed.

EMBODIMENT 29

Figure 51:
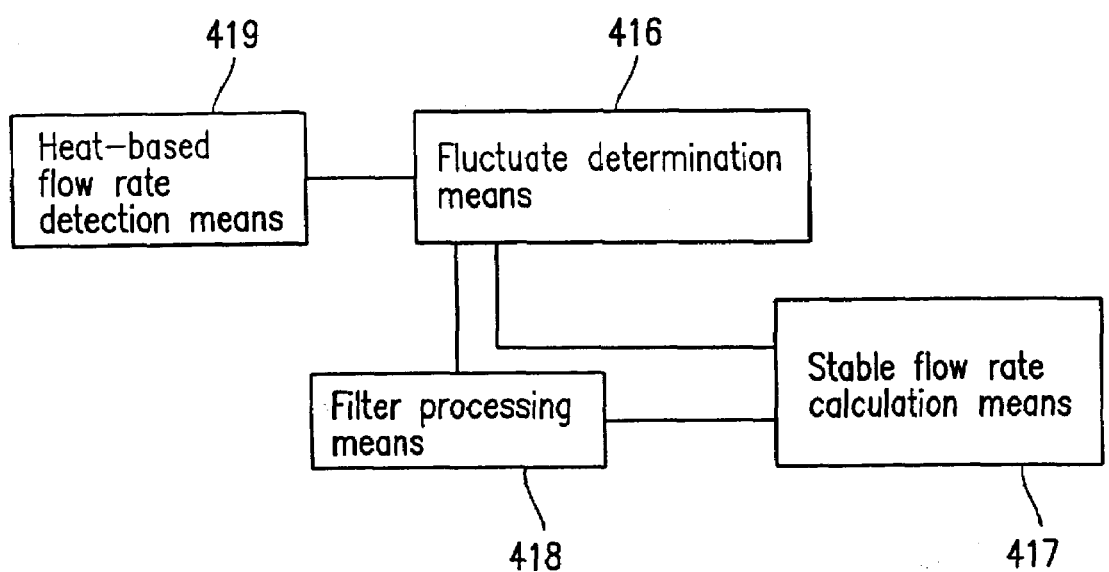
FIG. 51 is a block diagram showing a flowmeter according to embodiment 29 of the present invention.

FIG. 51 is a block diagram showing a flowmeter according to embodiment 29 of the present invention. Embodiment 29 is different from embodiment 23 in that, in embodiment 29, heat-based flow rate detection means 419 is used in place of the instantaneous flow rate detection means.

As shown in FIG. 51, even when the heat-based flow rate detection means 419 is used, a measured flow rate varies due to a pressure variation if it is present. However, the same effects can be obtained by using the methods described in embodiments 23–28, and the flow rate can be measured with a high accuracy in a reliable manner.

EMBODIMENT 30

Figure 52:
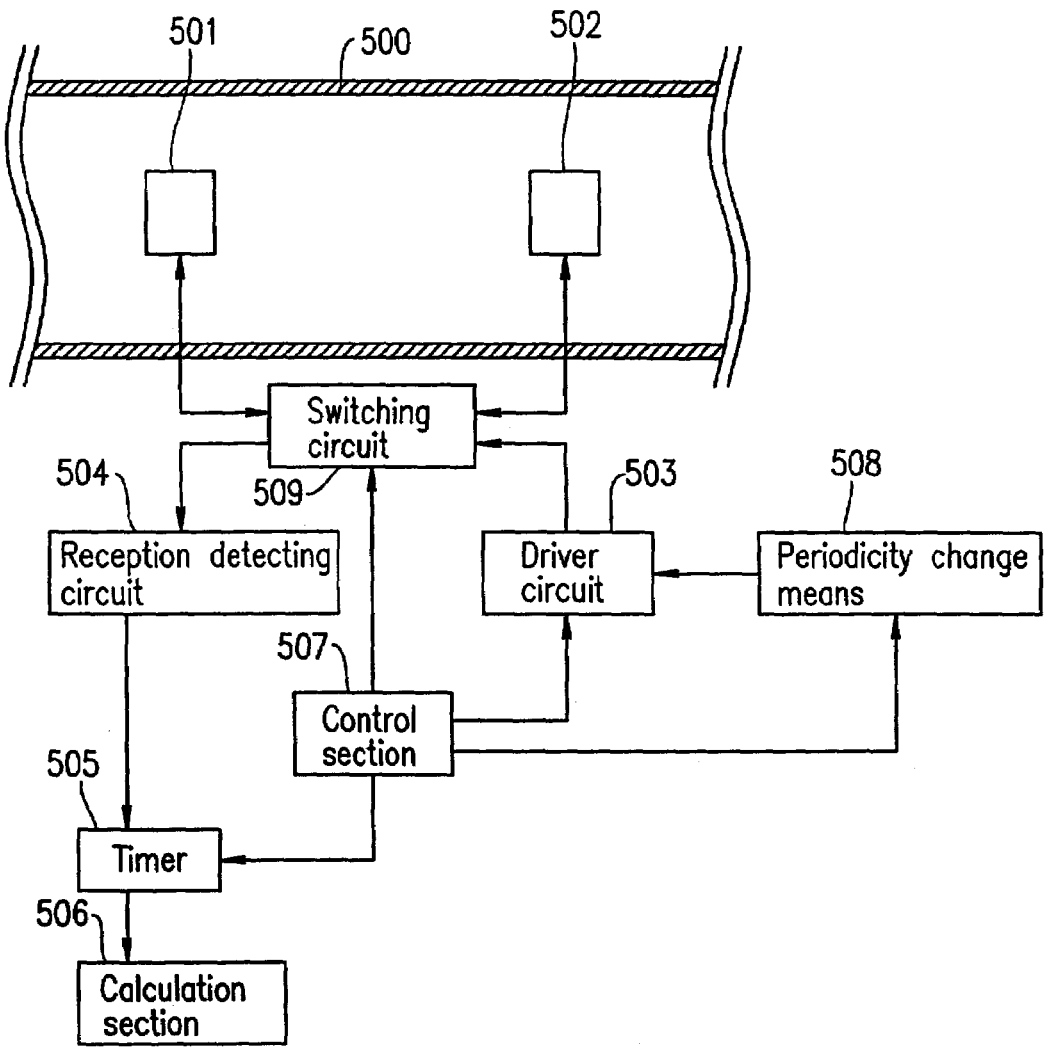
FIG. 52 is a block diagram showing a flowmeter according to embodiment 30 of the present invention.

FIG. 52 is a block diagram showing a flowmeter according to embodiment 30 of the present invention.

Figure 53:
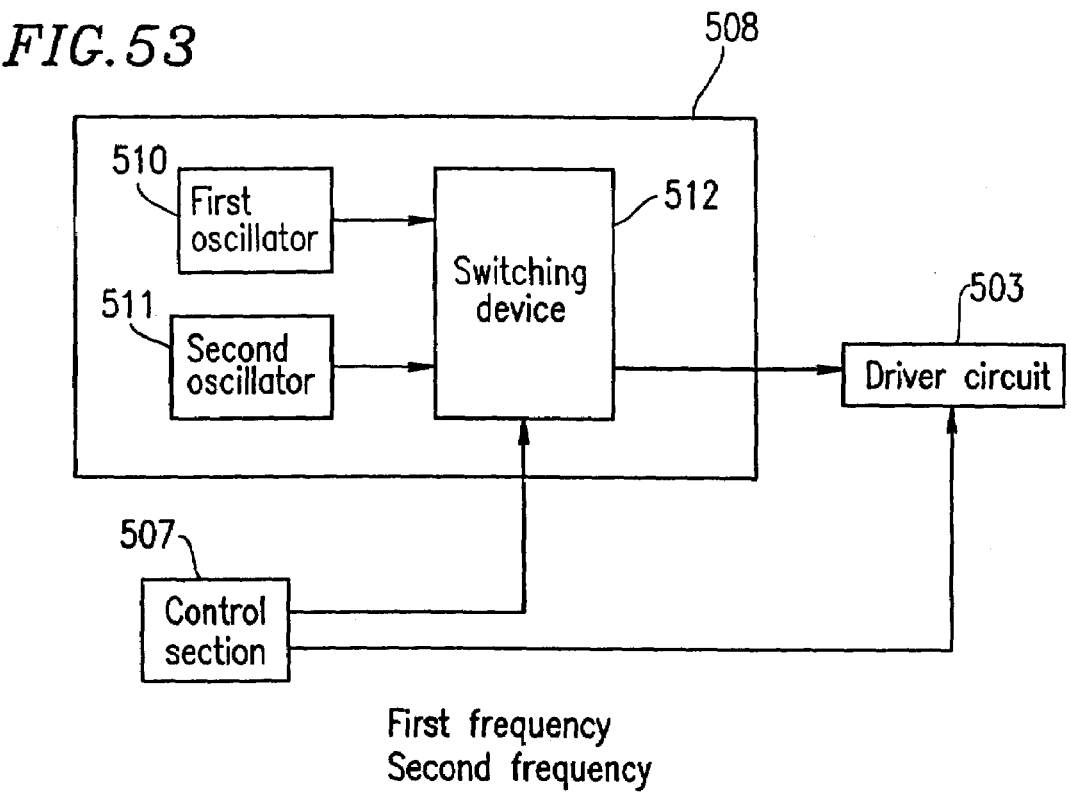
FIG. 53 is a block diagram of periodicity change means of the flowmeter of embodiment 30.

The flowmeter of embodiment 30 includes: a flow rate measurement section 500 through which a fluid to be measured flows; a pair of ultrasonic wave transducers 501 and 502 which are provided in the flow rate measurement section 500 and which transmit/receive an ultrasonic wave; a driver circuit 503 for driving the ultrasonic wave transducer 502; a reception detecting circuit 504 which is connected to the ultrasonic wave transducer 501 and which detects an ultrasonic wave signal; a timer 505 for measuring a propagation time of an ultrasonic wave signal; a control section 507 for controlling the driver circuit 503; a calculation section 506 for calculating the flow rate from an output of the timer; and periodicity change means 508 for sequentially changing a driving method of the driver circuit 503. Embodiment 30 is different from the conventional examples in that the flowmeter of embodiment 30 includes the periodicity change means 508. The details of the periodicity change means 508 are shown in FIG. 53. Reference numeral 510 denotes a first oscillator, which herein generates an oscillation signal of 500 kHz. Reference numeral 511 denotes a second oscillator which generates an oscillation signal of 520 kHz. Reference numeral 512 denotes a switching device which selects either an output of the first oscillator 510 or an output of the second oscillator 511 based on an output of the control section 507 so as to output the selected output to the driver circuit 503.

First, the control section 507 outputs a switching signal to the switching device 512 to select the first oscillator 510. Then, the timer 505 starts time measurement, and at the same time, the control section 507 outputs a transmission start signal to the driver circuit 503. Receiving the transmission start signal, the driver circuit 503 drives the ultrasonic wave transducer 502 with the oscillation signal of 500 kHz which is an input from the switching device 512. The operations performed thereafter are the same as those of the conventional examples. Next, the control section 507 outputs a switching signal to the switching device 512 to select the second oscillator 511. Then, similarly to the previous flow rate measurement, time measurement of the timer 505 is started, and at the same time, the control section 507 outputs a transmission start signal to the driver circuit 503. Receiving the transmission start signal, the driver circuit 503 drives the ultrasonic wave transducer 501 with the oscillation signal of 520 kHz which is an input from the switching device 512.

Figure 54:
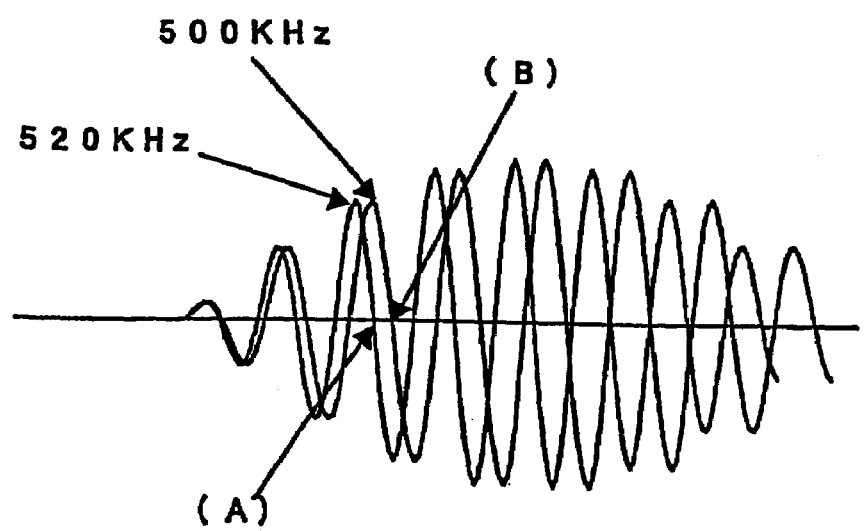
FIG. 54 is a timing chart for showing a reception detection timing of the flowmeter of embodiment 30.

Thereafter, the above operations are alternately continued so as to measure the flow rate. A reception detecting timing in such measurement is shown in FIG. 54. As shown in this drawing, times when the 500 kHz signal and the 520 kHz signal are received are temporally shifted. Reception detecting timings for the signals temporally shift as shown in curves (A) and (B) of FIG. 54. Thus, in this embodiment, the control section controls the periodicity change means such that the measurement frequency in the flow rate measurement is successively changed so as not to be kept constant. As a result, noise which is in synchronization with a measurement frequency or a transmission frequency of an ultrasonic wave is never in the same phase but dispersed when the ultrasonic wave is received. Therefore, a measurement error can be decreased.

The periodicity change means is structured so as to switchingly output a plurality of output signals having different frequencies, and the control section operates such that the setting of frequency in the periodicity change means is changed for each measurement, and the driving frequency of the driver circuit is changed. Therefore, by changing the driving frequency, the reception detecting timing can be changed by a time corresponding to a periodic variation of a driving signal. Thus, noise which is in synchronization with a measurement frequency or a transmission frequency of an ultrasonic wave is never in the same phase but dispersed when the ultrasonic wave is received. Therefore, a measurement error can be decreased.

In embodiment 30, the driving frequency is changed by switching two oscillators. However, the same effects can be obtained so long as an ultrasonic wave transducer is driven while changing the driving frequency. The present invention can be achieved regardless of the number of oscillators, the driving frequency, and the structure of the switching device.

EMBODIMENT 31

Figure 55:
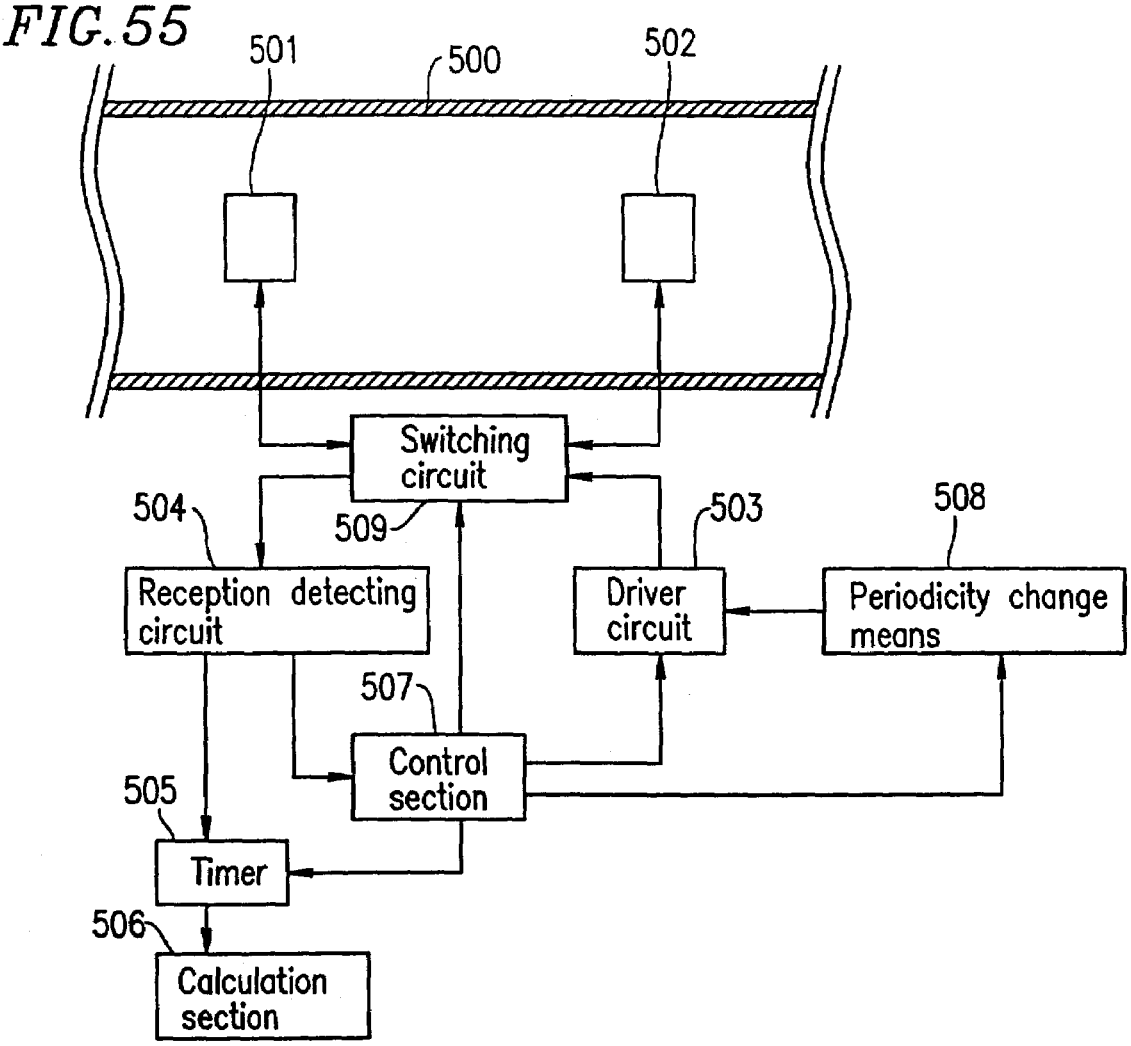
FIG. 55 is a block diagram showing a flowmeter according to embodiment 31 of the present invention.

FIG. 55 is a block diagram showing a flowmeter according to embodiment 31 of the present invention.

The flowmeter of embodiment 30 includes: a flow rate measurement section 500 through which a fluid to be measured flows; a pair of ultrasonic wave transducers 501 and 502 which are provided in the flow rate measurement section 500 and which transmit/receive an ultrasonic wave; a driver circuit 503 for driving one of the ultrasonic wave transducers; a reception detecting circuit 504 which is connected to the other ultrasonic wave transducer and which detects an ultrasonic wave; a control section 507 for controlling the driver circuit 503 for a predetermined number of times such that the driver circuit 503 again drives the ultrasonic wave transducers in response to an output of the reception detecting circuit 504; a timer 505 for measuring an elapsed time for a predetermined number of times; a calculation section 506 for calculating the flow rate from an output of the timer 505; and periodicity change means 508 for sequentially changing a driving method of the driver circuit 503.

Figure 56:
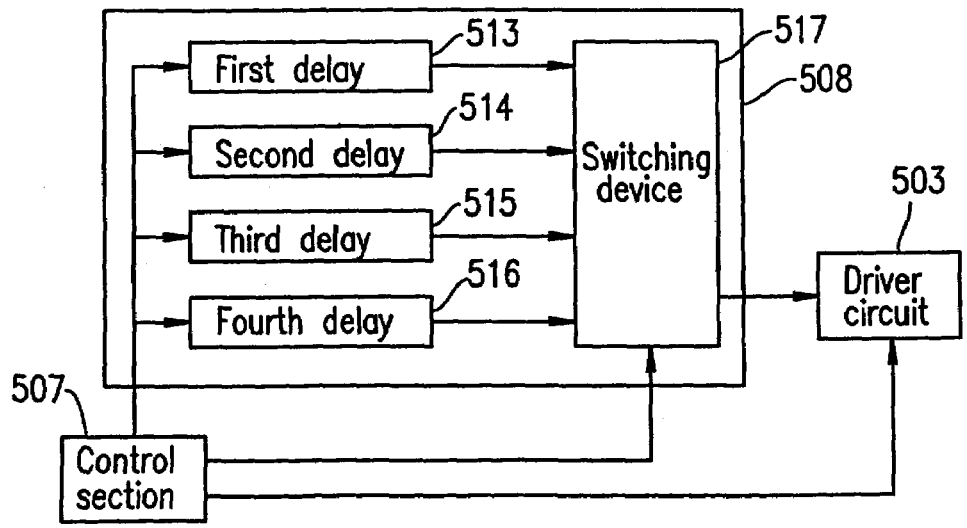
FIG. 56 is a block diagram of periodicity change means of the flowmeter of embodiment 31.

FIG. 56 is a block diagram showing the details of the periodicity change means.

Reference numeral 513 denotes a first delay, which generates an output signal 150 ps after receiving an input signal from the control section 507. Reference numeral 514 denotes a second delay, which generates an output signal 150.5 ps after receiving an input signal from the control section 507. Reference numeral 515 denotes a third delay, which generates an output signal 151 us after receiving an input signal from the control section 507. Reference numeral 516 denotes a fourth delay, which generates an output signal 151.5 ps after receiving an input signal from the control section 507. Reference numeral 517 denotes a switching device which selects one of first to fourth delay outputs according to an output of the control section 507 and outputs the selected output to the driver circuit 503.

Embodiment 31 is different from embodiment 1 in that the control section 507 receives an output of the reception detecting circuit 504 and drives the ultrasonic wave transducers again, and that this operation is repeated for a number of times which is a multiple of 4 (4 is the delay set number), and during the repetition, the delay times of the periodicity change means 508 are sequentially switched every time an ultrasonic wave is received.

In this structure, the control section 507 changes the setting of the delay every time reception of an ultrasonic wave is detected. Thus, in one measurement operation, reverberation of an ultrasonic wave transmitted in an immediately-previous measurement and an influence of tailing of the ultrasonic wave transducers can be dispersed/averaged, whereby a measurement error can be decreased.

The cycle width which is changed by the periodicity change means has a value which is an equational division of the ultrasonic transducer (500 kHz). Thus, in an averaged value of the sum of values for all the settings, an error which may be caused due to reverberation of an ultrasonic wave and tailing of an ultrasonic wave sensor (i.e., noise having a cycle of 2 ps) can be minimized.

Furthermore, the number of times that measurement is repeated is a multiple of 4 (4 is a change number of the periodicity change means). Thus, within a single flow rate measurement cycle, measurement with each of the predetermined values of the periodicity change means is performed the same number of times. As a result, a variation of the measurement result is suppressed, and accordingly, a reliable measurement result can be obtained.

Furthermore, the order of patterns for changing the periodicity is the same for both measurement with an ultrasonic wave transmitted toward the upstream side and measurement with an ultrasonic wave transmitted toward the downstream side. Specifically, in the measurement with an ultrasonic wave transmitted from upstream to downstream, the first delay, second delay, third delay, and fourth delay are selected in this order, and then, the first delay is selected again; this cycle is repeated. The measurement with an ultrasonic wave transmitted from downstream to upstream is performed such that the delays are necessarily selected in the same order. With such an arrangement, the flow rate measurement with an ultrasonic wave transmitted toward the upstream side and the flow rate measurement with an ultrasonic wave transmitted toward the downstream side are always performed under the same conditions. Especially, even when there is a variation in the flow rate, a reliable measurement result can be obtained.

In embodiment 31, the delay time is changed by switching the four delays. The same effects can also be obtained so long as the ultrasonic wave transducers can be driven by changing the driving timing. The present invention can be achieved regardless of the delay time, the number of delays, and the structure of the switching device.

In the above example, the delay times are inserted between the control section 507 and the driver circuit 503. However, the same effects can also be obtained when the delay times are inserted between the reception detecting circuit 504 and the control section 507.

In the above example, the width by which the delay is changed is 2 μs the set number to be changed is 4, and the difference between the adjacent settings is 0.5 ps, which is a quarter of 2 μs. The present invention is not limited to these values. Each of these values may be a value obtained by uniformly dividing a multiple of one cycle.

EMBODIMENT 32

Figure 57A:
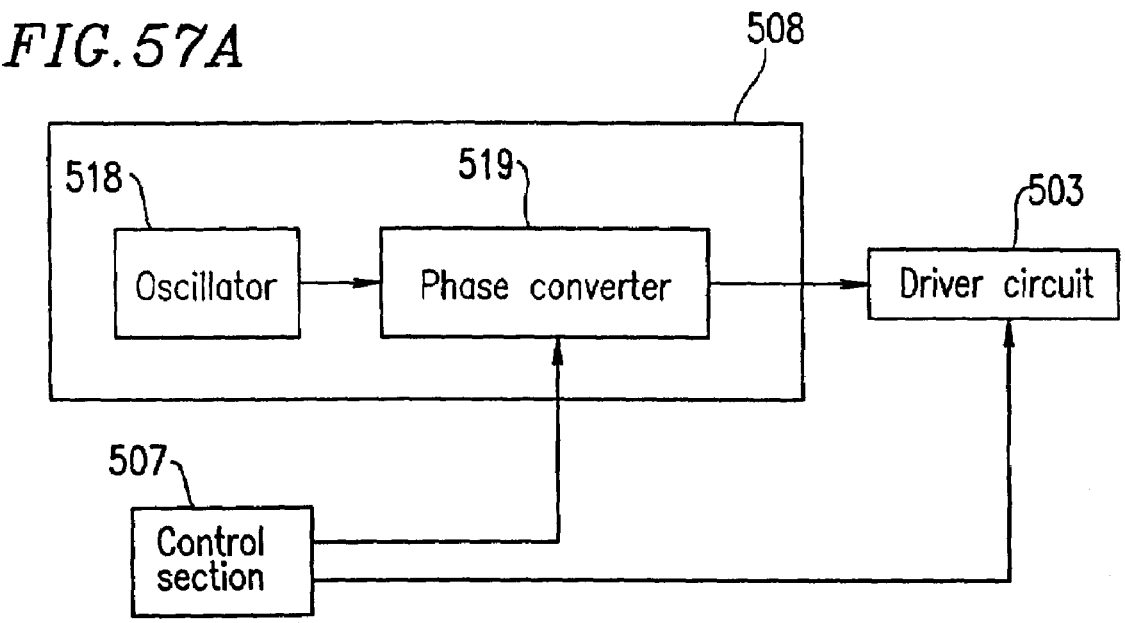
FIG. 57A is a block diagram of periodicity change means of the flowmeter of embodiment 32 of the present invention.

FIG. 57A is a block diagram showing the periodicity change means of the flowmeter according to embodiment 32 of the present invention.

Figure 57B:
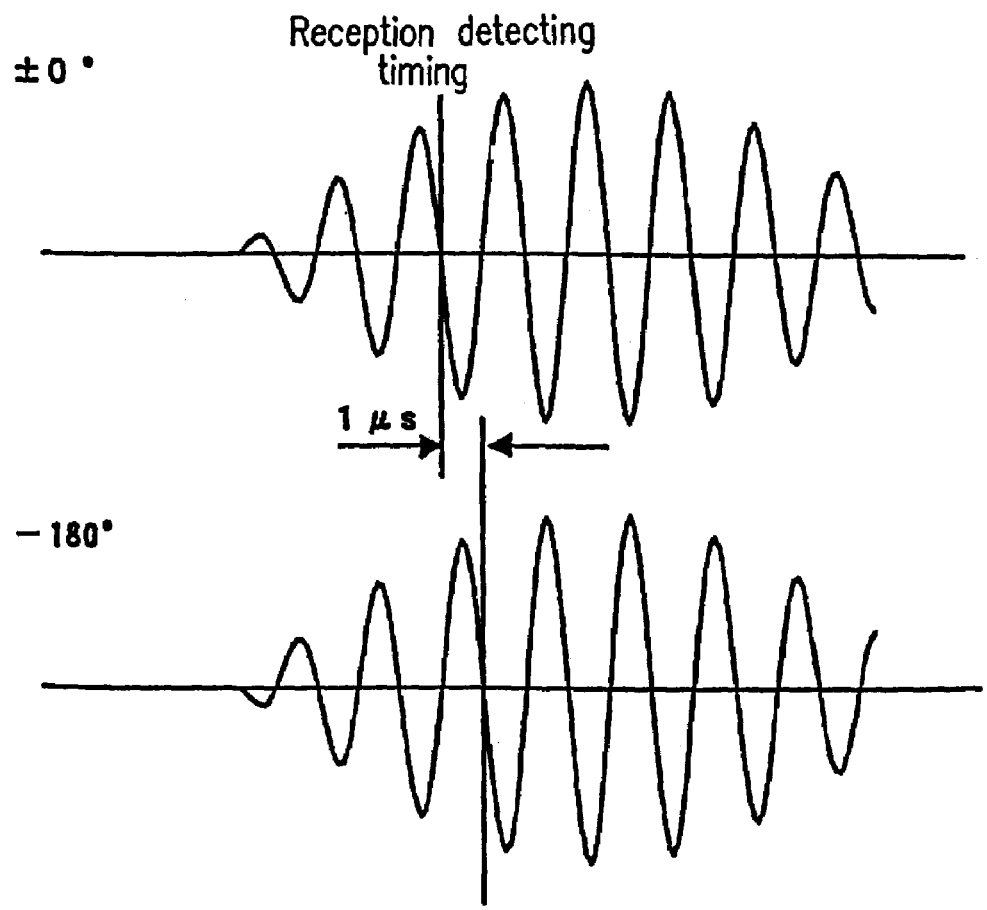
FIG. 57B is a timing chart for showing a reception detection timing of the flowmeter of embodiment 32.

Reference numeral 518 denotes an oscillator, and 519 denotes a phase converter. The oscillator outputs a signal at a frequency of 500 kHz. The phase converter hastens or delays the phase of a signal of the oscillator according to a phase conversion signal from the control section 507, and outputs the signal with hastened or delayed phase. For example, when a phase control signal is Hi (high), the phase converter outputs an output of the oscillator 518 as it is. When a phase control signal is Lo (low), the phase converter hastens the output signal of the oscillator 518 by 180° and outputs the hastened signal. The reception signals and reception detecting timings in these operations are shown in FIG. 57B.

As shown in this drawing, reception points are shifted by a ½ cycle. That is, the shift time is 1 μs.

In this way, the reception detecting timing can be changed by a time period which is obtained by converting a phase variation of a driving signal into time by driving phase conversion. Thus, noise which is in synchronization with a measurement frequency or a transmission frequency of an ultrasonic wave is never in the same phase but dispersed when the ultrasonic wave is received. Therefore, a measurement error can be decreased.

In embodiment 32, the phase of a driving signal is changed by switching between two phases. However, the same effects can be obtained so long as the ultrasonic wave transducers can be driven by changing the driving phase. The present invention can be achieved regardless of the phase to be changed and the structure of the switching device.

EMBODIMENT 33

Figure 58:
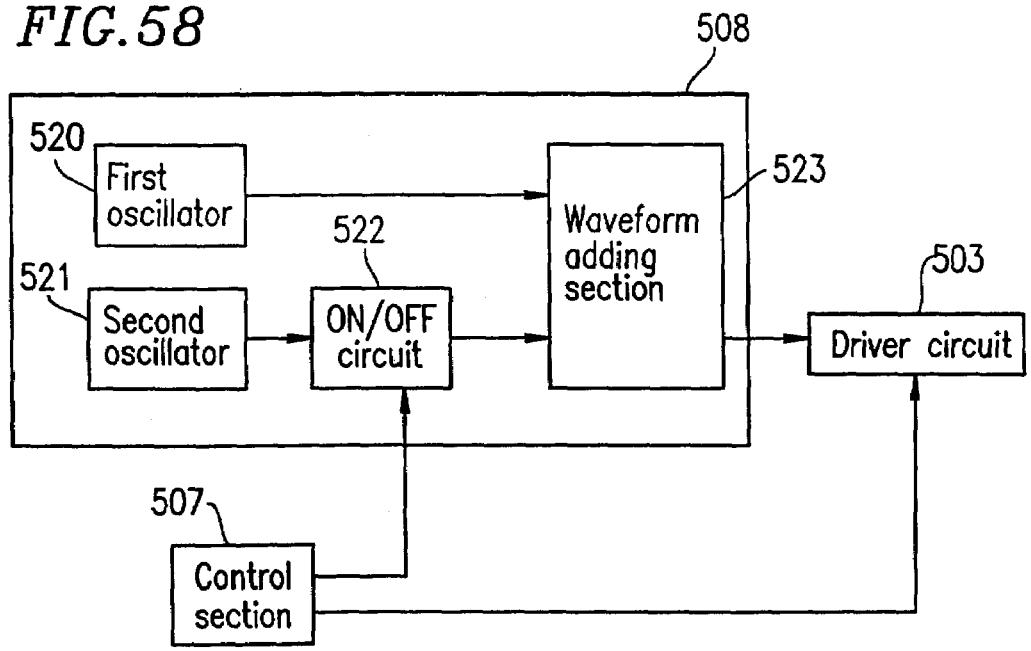
FIG. 58 is a block diagram of periodicity change means of the flowmeter of embodiment 33 of the present invention.

FIG. 58 is a block diagram showing the periodicity change means of the flowmeter according to embodiment 33.

Reference numeral 520 denotes a first oscillator which outputs an oscillation signal of 500 kHz, which is a resonance frequency of an ultrasonic wave transducer. Reference numeral 521 denotes a second oscillator which outputs an oscillation signal of 200 kHz. Reference numeral 522 denotes an ON/OFF circuit which determines whether or not an output of the second oscillator is output to a waveform adding section 523 according to an ON/OFF switching signal from the control section 507. The waveform adding section 523 synthesizes input waveforms to output the synthesized waveform to the driver circuit 503.

When the ultrasonic wave transducer is driven at a frequency of about 500 kHz, an ultrasonic wave signal having a large amplitude can be received. When the ultrasonic wave transducer is driven with only a signal component of 200 kHz, an ultrasonic wave signal can rarely be received. However, an oscillation signal of about 200 kHz is sometimes added or sometimes not added to an oscillation frequency of about 500 kHz. Such an irregular operation can cause a slight change in the frequency of an ultrasonic wave signal to be received. As a result, the reception detecting timing can be changed. Thus, noise which is in synchronization with a measurement frequency or a transmission frequency of an ultrasonic wave is never in the same phase but dispersed when the ultrasonic wave is received. Therefore, a measurement error can be decreased.

EMBODIMENT 34

Figure 59:
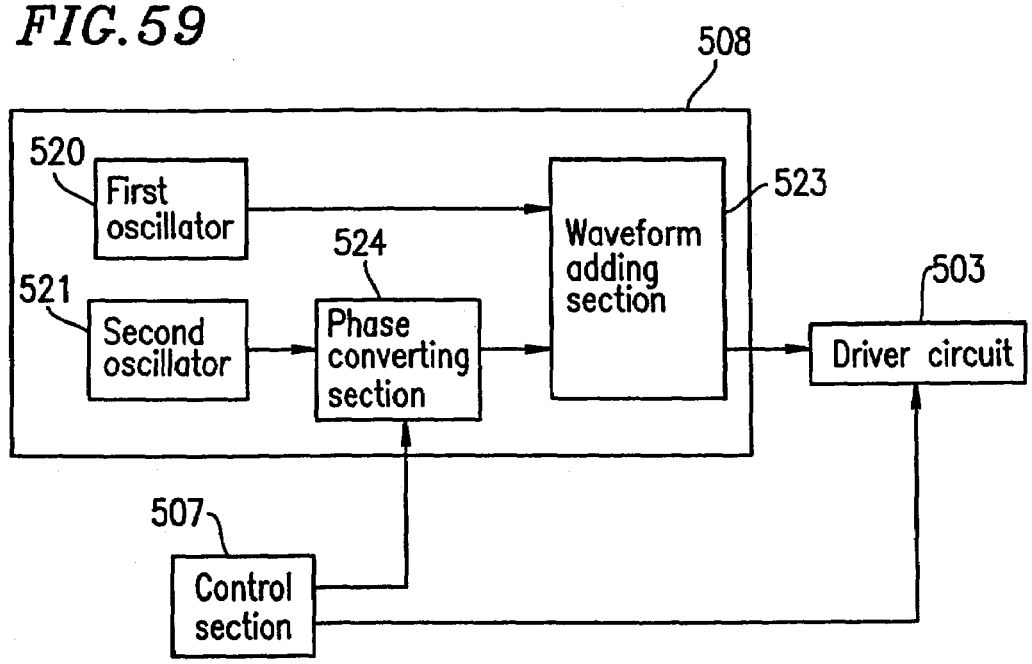
FIG. 59 is a block diagram of periodicity change means of the flowmeter of embodiment 34 of the present invention.

FIG. 59 is a block diagram showing the periodicity change means of the flowmeter according to embodiment 34.

Reference numeral 520 denotes a first oscillator which outputs an oscillation signal of 500 kHz, which is a resonance frequency of an ultrasonic wave transducer. Reference numeral 521 denotes a second oscillator which outputs an oscillation signal of 200 kHz. Reference numeral 524 denotes a phase conversion section which converts the phase of an output signal of the second oscillator 521 by 180° according to an output of the control section 507, and outputs the signal with the converted phase. Reference numeral 523 denotes a waveform adding section for synthesizing input waveforms and outputting the synthesized waveform to the driver circuit 503.

When the ultrasonic wave transducer is driven at a frequency of about 500 kHz, an ultrasonic wave signal having a large amplitude can be received. When the ultrasonic wave transducer is driven with only a signal component of 200 kHz, an ultrasonic wave signal can rarely be received. However, the frequency of an ultrasonic wave signal, which is received by the ultrasonic wave transducer driven based on an addition signal that is obtained by adding the phase of an oscillation signal of about 200 kHz which is changed by 180° in each measurement to an oscillation frequency of about 500 kHz, slightly changes. As a result, the reception detecting timing can be changed. Thus, noise which is in synchronization with a measurement frequency or a transmission frequency of an ultrasonic wave is never in the same phase but dispersed when the ultrasonic wave is received. Therefore, a measurement error can be decreased.

EMBODIMENT 35

Figure 60:
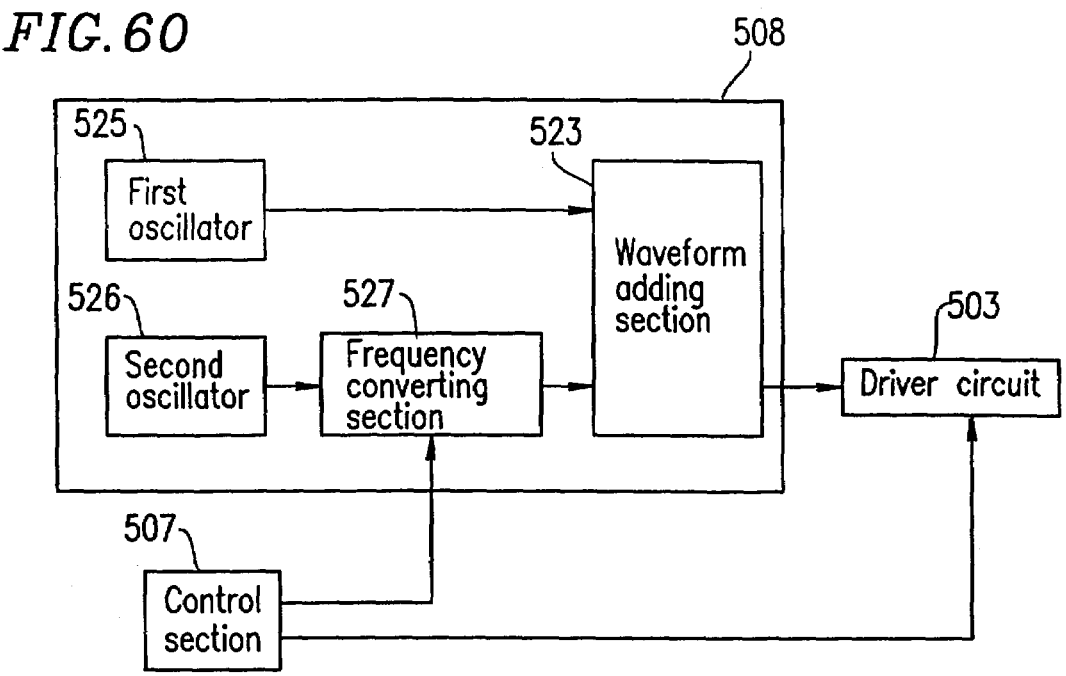
FIG. 60 is a block diagram of periodicity change means of the flowmeter of embodiment 35 of the present invention.

FIG. 60 is a block diagram showing the periodicity change means of the flowmeter according to embodiment 35.

Reference numeral 525 denotes a first oscillator which outputs an oscillation signal of 500 kHz, which is a resonance frequency of an ultrasonic wave transducer. Reference numeral 526 denotes a second oscillator which outputs an oscillation signal of 200 kHz. Reference numeral 527 denotes a frequency conversion section which converts the frequency of a signal input into the frequency converter, and outputs the signal with the converted frequency. Herein, the frequency conversion section 527 converts the frequency of the input signal to a ½, i.e., 100 kHz. Reference numeral 523 denotes a waveform adding section for synthesizing input waveforms and outputting the synthesized waveform to the driver circuit 503.

When the ultrasonic wave transducer is driven at a frequency of about 500 kHz, an ultrasonic wave signal having a large amplitude can be received. When the ultrasonic wave transducer is driven with only a signal component of 200 kHz or 100 kHz, an ultrasonic wave signal can rarely be received. However, the frequency of a received ultrasonic wave signal, which is received by the ultrasonic wave transducer driven based on an addition signal that is obtained by adding about 200 kHz to an oscillation frequency of about 500 kHz and an addition signal that is obtained by adding 100 kHz to an oscillation frequency of 500 kHz, slightly changes. As a result, the reception detecting timing can be changed. Thus, noise which is in synchronization with a measurement frequency or a transmission frequency of an ultrasonic wave is never in the same phase but dispersed when the ultrasonic wave is received. Therefore, a measurement error can be decreased.

EMBODIMENT 36

Figure 61:
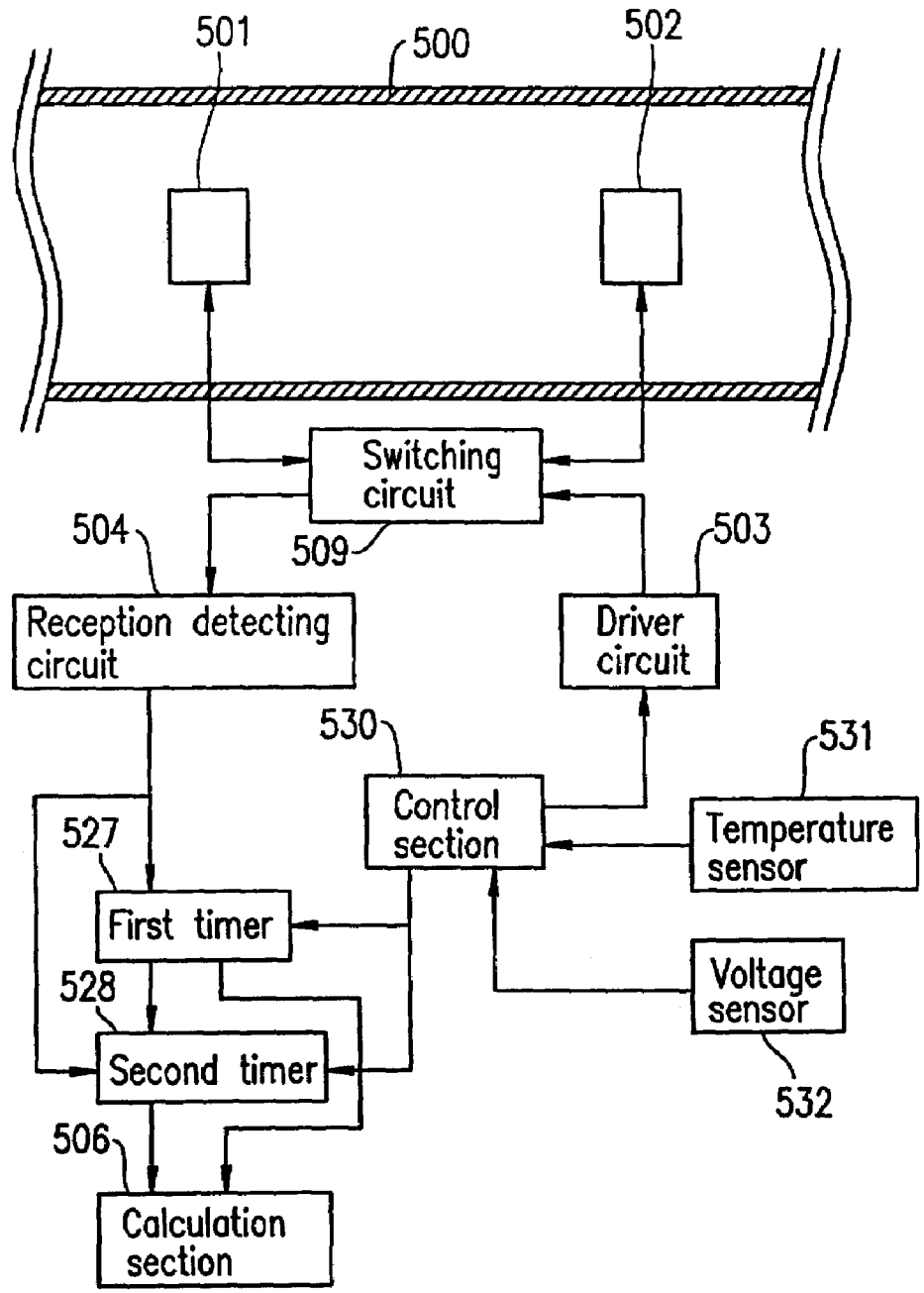
FIG. 61 is a block diagram showing a flowmeter according to embodiment 36 of the present invention.

FIG. 61 is a block diagram showing a flowmeter according to embodiment 36 of the present invention.

The flowmeter of embodiment 36 includes: a flow rate measurement section 500 through which a fluid to be measured flows; a pair of ultrasonic wave transducers 501 and 502 which are provided in the flow rate measurement section 500 and which transmit/receive an ultrasonic wave; a driver circuit 503 for driving the ultrasonic wave transducer 502; a reception detecting circuit 504 which is connected to the ultrasonic wave transducer 501 and which detects an ultrasonic wave signal; a first timer 527 for measuring a propagation time of an ultrasonic wave signal; a second timer 528 for measuring a time period from when the reception detecting circuit 504 receives a signal to when a value of the first timer 527 is changed; a control section 530 for controlling the driver circuit 503; a calculation section 506 for calculating the flow rate from outputs of the first timer 527 and the second timer 528; a switching circuit 509 for switching connections between the ultrasonic wave transducers 501 and 502 and the driver circuit 503 and the reception detecting circuit 504; a temperature sensor 531 for measuring the temperature of the flowmeter and outputting the measured temperature to the control section 530; and a voltage sensor 532 for measuring the voltage of a power supply which powers the flowmeter.

The control section 530 outputs a measurement start signal to the driving circuit 503 and, simultaneously, starts the time measurement of the first timer 527. The driving circuit 503 drives the ultrasonic wave transducer 502 in response to a signal input so as to emit an ultrasonic wave. The emitted ultrasonic wave propagates in fluid and is received by the ultrasonic wave transducer 501. The reception detecting circuit 504 outputs the received ultrasonic wave signal to the first timer 527 and the second timer 528. The first timer 527 receives an input signal from the reception detecting circuit 504 to stop the time measurement. The second timer 528 receives an output of the reception detecting circuit 504 to start time measurement, and then stops the time measurement in synchronization with a count-up timing output from the first timer 527. The calculation section 506 receives time measurement results of the first timer 527 and the second timer 528 and calculates the flow rate.

Figure 62:
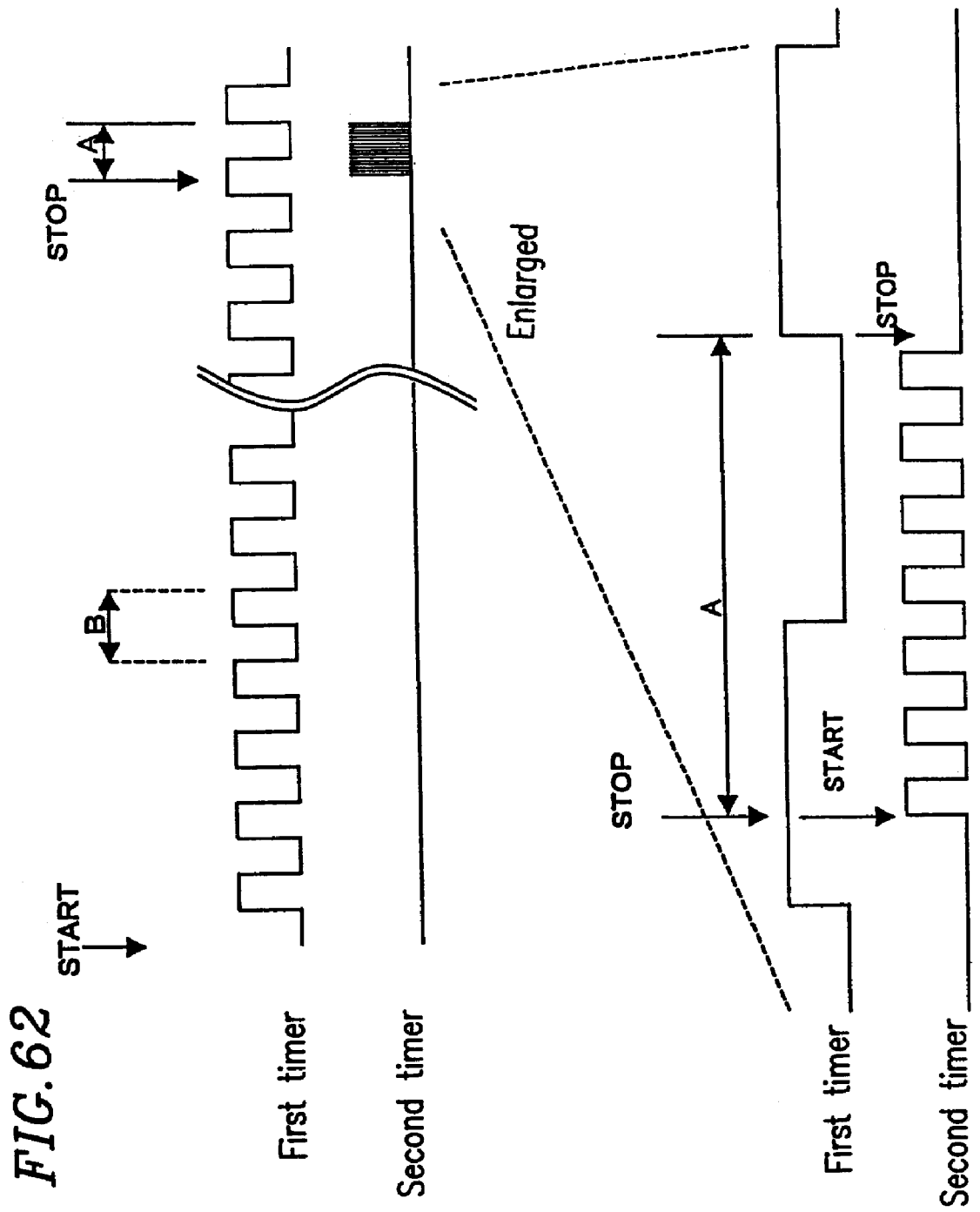
FIG. 62 is a diagram showing operations of a first timer and a second timer according to embodiment 36 of the present invention.

FIG. 62 shows operation timings of the first timer 527 and the second timer 528. As shown in FIG. 62, since the first timer 527 changes its state at a rising edge of a clock, an extra measurement corresponding to portion A is performed. Since the measurement resolution of the first timer 527 is an interval B in FIG. 62, portion A which is counted as a measurement error is generated in each measurement. The extra portion A is measured by the second timer 528 and subtracted in the calculation section 506, whereby a propagation time of an ultrasonic wave with high resolution is obtained, and a correct flow rate value is obtained.

Furthermore, the control section 530 starts the first timer 527 and, simultaneously, outputs a start signal to the second timer 528 so as to start the second timer 528. At a time when the first timer 527 counts up, an output signal, which is in synchronization with the count-up timing, is output from the first timer 527 to the second timer 528 so as to stop the second timer 528. At this time, the value of the second timer 528 is equal to a time measured within one clock time of the first timer 527. This time is processed in the calculation section 506, a time corresponding to one clock of the second timer 528 is obtained, and the time corresponding to the one clock of the second timer 528, which is used in calculation, is corrected.

This operation is performed when an output of the temperature sensor 531 or the power supply voltage sensor 532 varies so as to reach or exceed a set value. With such an arrangement, the second timer 528 does not need to possess stability to the temperature and power supply voltage. As a result, inexpensive parts can be used. Furthermore, it is not necessary to busily make corrections, and the amount of consumed power can be suppressed to a low level.

Since the flow rate calculation is performed using a value obtained by subtracting a value of the second timer 528 from a value of the first timer 527, the time measurement resolution is equal to that of the second timer 528. Further, since the operation time of the second timer 528 is very short, the amount of consumed power can be decreased. Thus, a flowmeter with high resolution which consumes a small amount of power can be realized. Furthermore, a correct flow rate measurement can be achieved so long as the second timer 528 operates in a stable manner after the correction is made until flow rate measurement is performed. Therefore, a correct measurement can be performed even when the second timer 528 lacks long-term stability. Thus, a flowmeter with a high accuracy can be realized with ordinarily-employed parts.

Furthermore, the temperature sensor 531 is provided. When an output of the temperature sensor 531 varies so as to reach or exceed a set value, the second timer 528 is corrected by the first timer 527. Thus, even when the second timer 528 has a characteristic which varies according to a variation in the temperature, the second timer 528 is corrected every time a temperature variation occurs, whereby correct measurement can be performed. Furthermore, such a correction is made only when it is necessary, the amount of consumed power can be decreased.

Furthermore, the voltage sensor 532 is provided. When an output of the voltage sensor 532 varies so as to reach or exceed a set value, the second timer 528 is corrected by the first timer 527. Thus, even when the second timer 528 has a characteristic which varies according to a variation in the power supply voltage, the second timer 528 is corrected every time a variation occurs in power supply voltage, whereby correct measurement can be performed. Furthermore, such a correction is made only when it is necessary, the amount of consumed power can be decreased.

Furthermore, since such a correction is made, a crystal oscillator is used in a clock of the first timer 527, and a CR oscillation circuit is used in a clock of the second timer 528. A clock using a crystal oscillator operates in a very stable manner. However, in such a clock, a long time is consumed from when an operation is started to when the operation becomes stable. Further, although a long-term stability cannot be secured with a CR oscillation circuit, a timer whose operation quickly becomes stable and which quickly operates in a non-synchronous mode can be readily realized with the CR oscillation circuit. A crystal oscillator is used in a clock of the first timer 527, and a CR oscillation circuit is used in a clock of the second timer 528, whereby a stable timer with high resolution can be readily realized.

In FIG. 62 of embodiment 36, the second timer stops at a time when a clock of the first timer falls after the second timer starts to operate. However, the present invention is not limited to this timing because a correct time can be obtained by a calculation to be performed later so long as the timing is in synchronization with the first timer.

EMBODIMENT 37

Figure 63:
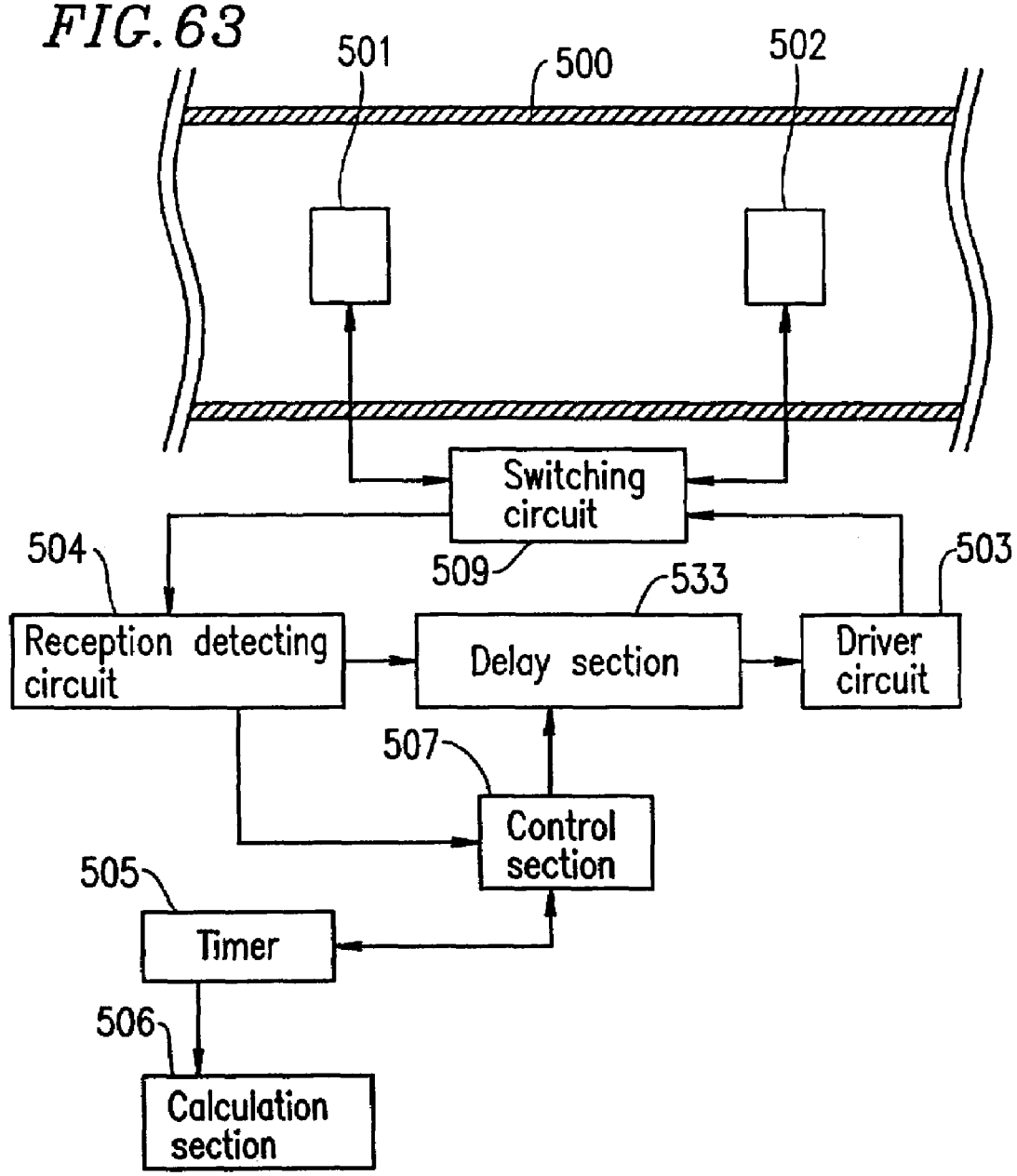
FIG. 63 is a block diagram showing a flowmeter according to embodiment 37 of the present invention.
Figure 64:
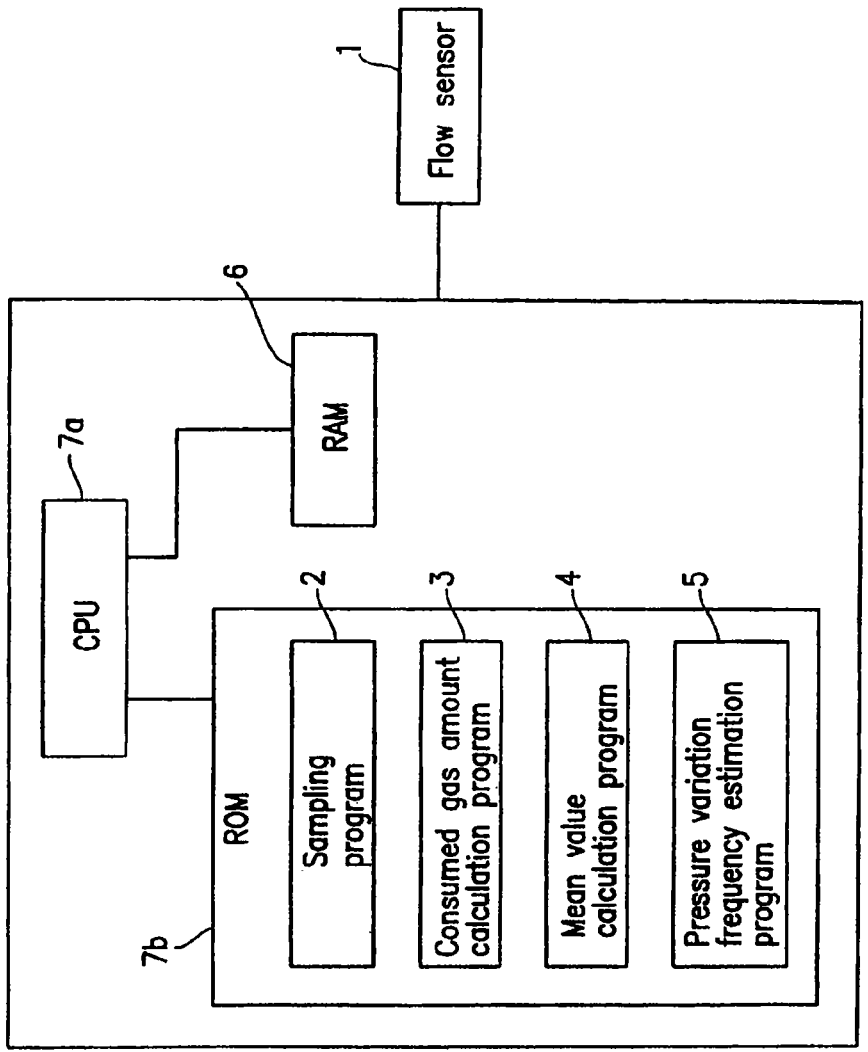
FIG. 64 is a block diagram showing a conventional flowmeter.
Figure 65:
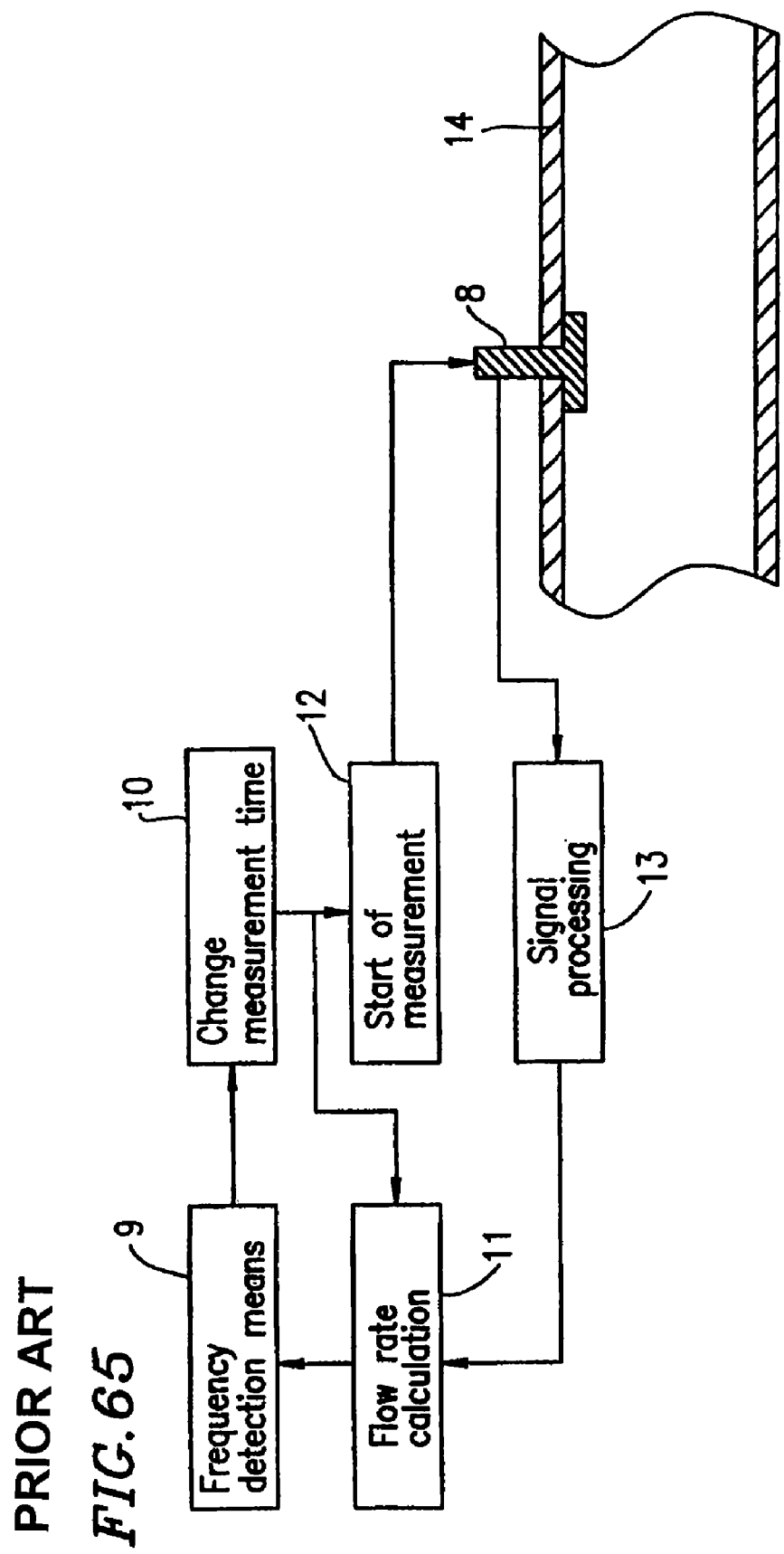
FIG. 65 is a block diagram showing another conventional flowmeter.
Figure 66:
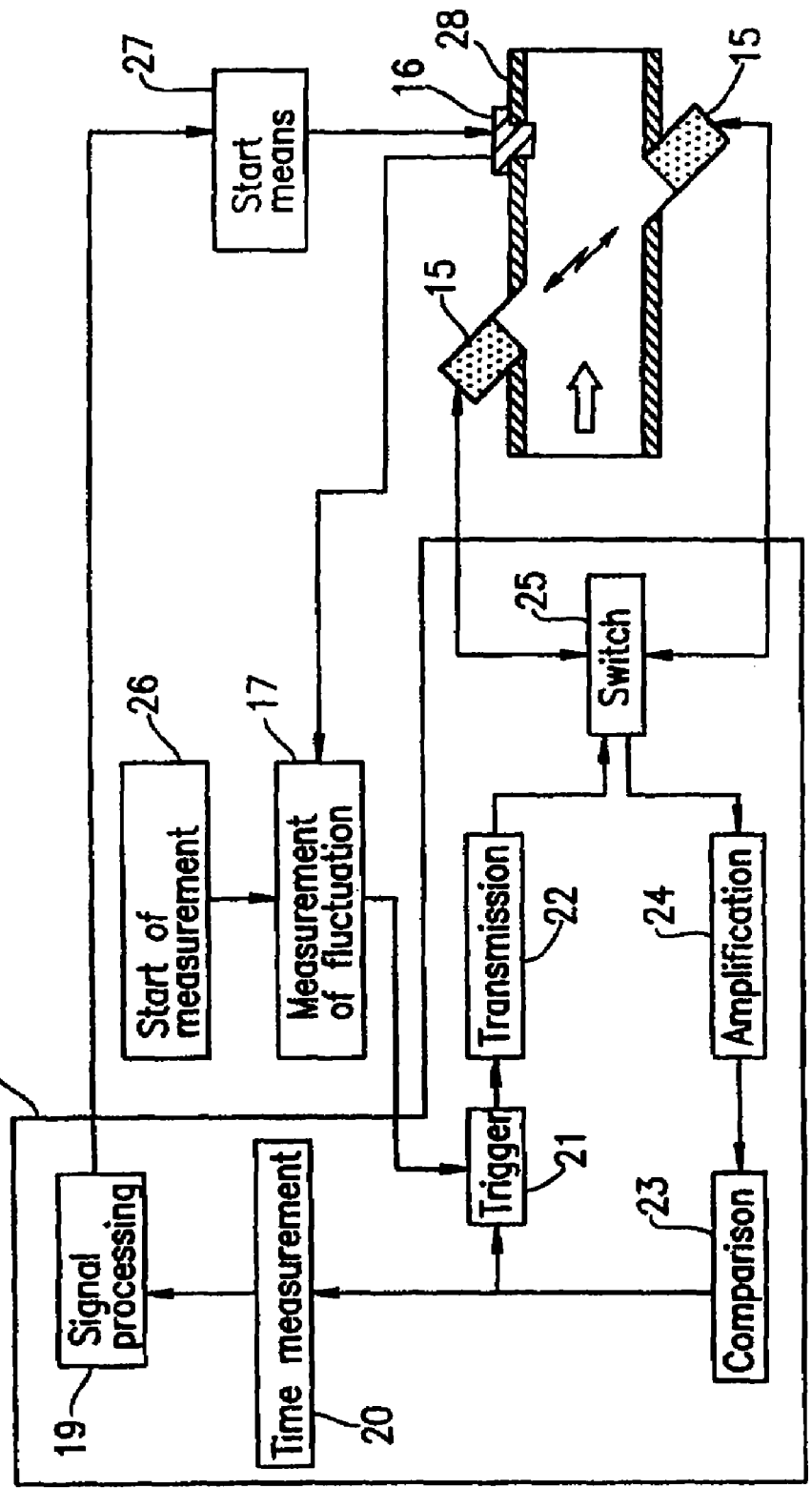
FIG. 66 is a block diagram showing still another conventional flowmeter.
Figure 67:
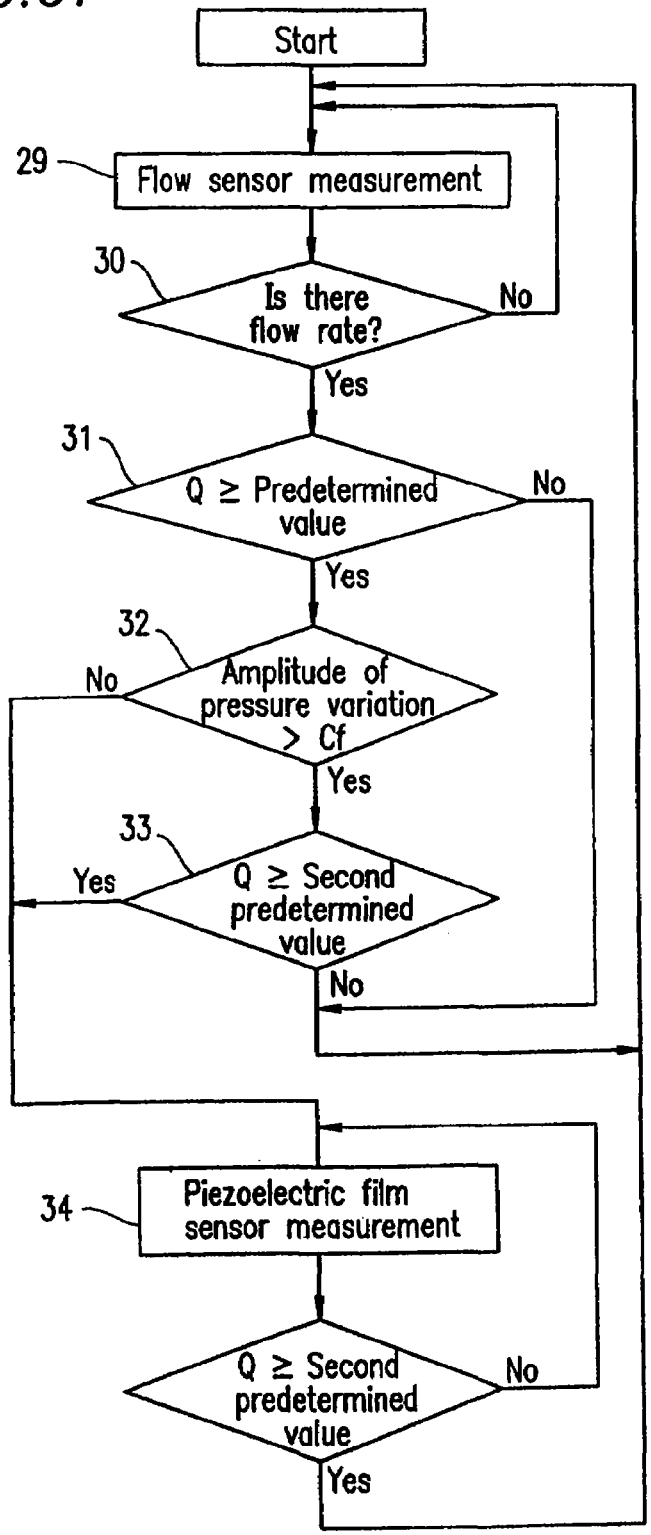
FIG. 67 is a flowchart showing an operation of still another conventional flowmeter.
Figure 68:
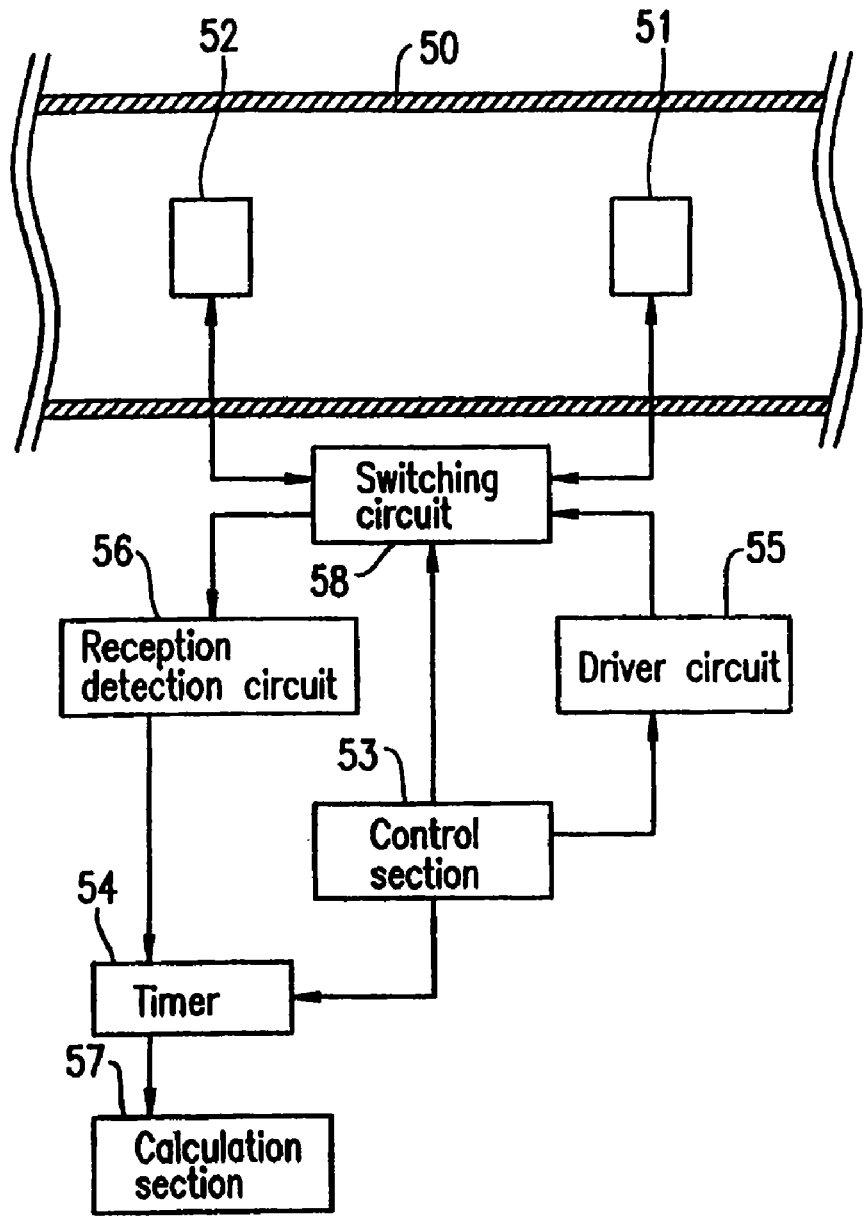
FIG. 68 is a block diagram showing a conventional flowmeter.

FIG. 63 is a block diagram showing a flowmeter according to embodiment 37 of the present invention.

The flowmeter of embodiment 37 includes: a flow rate measurement section 500; a pair of ultrasonic wave transducers 501 and 502 which are provided in the flow rate measurement section 500 and which transmit/receive an ultrasonic wave; a driver circuit 503 for driving the ultrasonic wave transducer 502; a reception detecting circuit 504 which is connected to the ultrasonic wave transducer 501 and which detects a received ultrasonic wave signal; a control section 507 for controlling the driver circuit 503 a predetermined number of times such that the driver circuit 503 again drives the ultrasonic wave transducer 502 in response to an output of the reception detecting circuit 504; a timer 505 for measuring an elapsed time, a predetermined number of times; a calculation section 506 for calculating the flow rate from an output of the timer 505; and a delay section 533 which is frequency stabilizing means for sequentially changing a driving method of the driver circuit 503.

The control section 507 outputs a measurement start signal to the delay section 533 and, simultaneously, starts time measurement of the timer 505. The delay section 533 outputs a signal to the driver circuit 503 after a delay time which is set based on a setting signal from the control section. In response to the signal input, the driver circuit 503 drives the ultrasonic wave transducer 502 to emit an ultrasonic wave. The emitted ultrasonic wave propagates in fluid and is received by the ultrasonic wave transducer 501. The reception detecting circuit 504 outputs the received ultrasonic wave signal to the delay section 533, such that the driver circuit operates in a similar manner to that in a previous cycle and transmit an ultrasonic wave signal again. The control section 507, which has received an output signal from the reception detecting circuit 504, counts such repetitious operation, and when the count reaches a predetermined number of times, the control section 507 stops the timer 505. The calculation section 506 receives a time measurement result of the timer 505 and calculates the flow rate.

The control section 507 receives a value of the timer 505 and sets the delay time of the delay section 533 so as to always be constant. In this way, the control section 507 controls the measurement such that the measurement frequency is always constant. With such a structure, the measurement frequency is always constant even when a variation occurs in the propagation time. As a result, noise which is in synchronization with a measurement frequency or a transmission frequency of an ultrasonic wave is always in the same phase when the ultrasonic wave is received regardless of a variation in the propagation time. Therefore, a measurement error can be maintained as a constant value. Accordingly, the flow rate measurement can be stabilized even when the noise has a very long periodic noise.

The control section 507 controls the delay section 533 so as to maintain the measurement time to be constant. Therefore, the measurement frequency can be maintained to be constant with a simple calculation without calculating a propagation time for each ultrasonic wave transmission.

In embodiment 37, the measurement frequency is maintained to be constant by changing the delay time. However, the same effects can be obtained so long as the measurement frequency is constant. Specifically, the same effects can be obtained by using a different method, e.g., by changing the distance between the ultrasonic wave transducers.

Since a propagation time of an ultrasonic wave from upstream to downstream is different from a propagation time of an ultrasonic wave from downstream to upstream when there is a flow, a different delay can be set for stabilizing the measurement frequency.

Furthermore, when a flow rate is large, and an error caused by periodic noise is negligible, an operation of the periodicity stabilizing means is stopped, whereby the amount of consumed electric power can be reduced.

Furthermore, at an initial stage of measurement, the flow rate is measured while changing the setting of the measurement frequency stabilizing means, whereby a measurement frequency with which a smallest variation is caused in a measurement result by a measurement frequency variation is set as a target measurement frequency. With such an arrangement, a further stable measurement result can be obtained.

Industrial Applicability

As described above, according to a flowmeter of the present invention, the following effect can be obtained.

In order to solve the above problems, a flowmeter of the present invention includes: transmission/reception means provided in a flow path for performing transmission/reception using a state change of fluid; repetition means for repeating the transmission/reception; time measurement means for measuring a time or propagation repeated by the repetition means; flow rate detection means for detecting a flow rate based on a value of the time measurement means; and number-of-times change means for changing to a predetermined number of repetition times. The number of repetition times is changed to an optimum number such that an influence of a variation of a flow can be suppressed. As a result, reliable flow rate measurement with a high accuracy can be achieved.

The flowmeter includes a pair of transmission/reception means which utilize propagation of an ultrasonic wave as the state change of fluid. Thus, by using the sonic wave transmission/reception means, propagation of a sonic wave can be performed even when a state change occurs in the fluid. Moreover, by changing the number of repetition times to an optimum number for the variation, reliable flow rate measurement with a high accuracy can be achieved.

The flowmeter includes transmission/reception means which utilizes propagation of heat as the state change of fluid. Thus, by using the heat transmission/reception means, propagation of heat can be performed even when a state change occurs in the fluid. Moreover, by changing the number of repetition times to an optimum number for the variation, reliable flow rate measurement with a high accuracy can be achieved.

The flowmeter includes: elapsed time detection means for detecting halfway information for a propagation time which is repeatedly measured by the repetition means; frequency detection means for detecting a frequency of a flow rate variation from information of the elapsed time detection means; and number-of-times change means for setting a measurement time so as to be substantially a multiple of the frequency detected by the frequency detection means. Thus, it is not necessary to provide specific detection means. Before flow rate detection is performed, the frequency of a variation is detected froth halfway information of the time measurement means, and the measurement time can be set so as to be a multiple of a cycle of the frequency. As a result, reliable flow rate measurement with a high accuracy can be achieved.

The flowmeter includes: data holding means for holding at least one or more propagation time of repeatedly-performed transmission/reception which is obtained by the elapsed time detection means; and frequency detection means for detecting a frequency by comparing the data held by the data holding means and measured propagation time data. Time measurement information at each moment is held and compared by the data holding means, whereby the frequency can be detected.

The number-of-times change means is operated in predetermined processing. Since the number-of-times change means is operated only when predetermined processing is performed, the processing in the number-of-times change means can be limited to the required minimum. Thus, the amount of consumed power can be considerably reduced.

The number-of-times change means is operated at each predetermined flow rate measurement. Thus, the number of repetition times is changed at every predetermined flow rate measurement, whereby the flow rate can be measured with a high accuracy in a stable manner even in a flow that varies greatly.

The number-of-times change means is performed before flow rate measurement processing. Since the number of repetition times is set to a predetermined number of times before flow rate measurement is performed, the flow rate measurement can be performed with a high accuracy in a reliable manner.

Predetermined processing includes operations of abnormality determination means for determining abnormality in flow rate from the measured flow rate; and flow rate management means for managing a use state for a flow rate from a measured flow rate. Since the number of repetition times is changed only when the abnormality determination processing and the flow rate management processing are performed, the processing of changing the number of repetition times is limited to the required minimum. Thus, the amount of consumed power can be decreased.

The number of repetition times which is adjusted the frequency obtained by the frequency detection means is used in next flow rate measurement. Since the number of repetition times is used in the next measurement, it is not necessary to perform repetitious measurement for frequency detection. Thus, the amount of consumed power can be decreased.

The number-of-times change means is operated when the measured flow rate is lower than a predetermined flow rate. Since the number of repetition times is changed only when the flow rate is equal to or lower than a predetermined flow rate, but this processing is not performed when the flow rate is high, the amount of consumed power can be decreased.

A flowmeter of the present invention includes: transmission/reception means provided in a flow path for performing transmission/reception using a state change of fluid; time measurement means for measuring a propagation time transmitted/received by the transmission/reception means; flow rate detection means for detecting a flow rate based on a value of the time measurement means; variation detection means for measuring a variation in the flow path by the transmission/reception means; and measurement control means for starting measurement in synchronization with a timing of a variation of the variation detection means. Since a variation in the flow path is measured by transmission/reception means, it is not necessary to provide another sensor for detecting a variation. Thus, the size of the flowmeter can be decreased, and the structure of the flow path can be simplified. In addition, the flow rate can be measured with a high accuracy in a reliable manner within a short space of time even when a variation occurs.

The flowmeter includes a pair of transmission/reception means which utilize propagation of an ultrasonic wave as the state change of fluid. Thus, a state change of fluid can be detected by the sonic wave transmission/reception means. Accordingly, the measurement can be started in synchronization with a timing of variation. As a result, the flow rate can be measured with a high accuracy in a reliable manner.

The flowmeter includes transmission/reception means which utilizes propagation of heat as the state change of fluid. Thus, a state change of fluid can be detected by the heat transmission/reception means. Accordingly, the measurement can be started in synchronization with a timing of variation. As a result, the flow rate can be measured with a high accuracy in a reliable manner.

The flowmeter includes: first vibration means and second vibration means provided in a flow path for transmitting/receiving an sonic wave; switching means for switching an transmission/reception operation of the first vibration means and the second vibration means; variation detection means for detecting a pressure variation in a flow path of at least one of the first vibration means and the second vibration means; time measurement means for measuring a propagation time of a sonic wave transmitted/received by the first vibration means and the second vibration means; measurement control means for performing synchronous control where, when an output of the variation detection means shows a predetermined change, the measurement means measures a first measurement time T1 of propagation from the first vibration means at an upstream side in the flow path to the second vibration means at a downstream side in the flow path, and when the output of the variation detection means shows a change opposite to the predetermined change, the measurement means measures a second measurement time T2 of propagation from the second vibration means at a downstream side in the flow path to the first vibration means at an upstream side in the flow path; flow rate detection means for calculating a flow rate using the first measurement time T1 and the second measurement time T2. Since the measurement is performed at a time when a change in a pressure variation is inverted, the phases of the pressure variation and the timing of the measurement can be shifted. As a result, a measurement error caused by a pressure variation can be offset.

The flowmeter includes: measurement control means for performing measurement control where measurement of the first measurement time T1 is started when an output of the variation detection means shows a predetermined change and measurement of the second measurement time T2 is started when the output of the variation detection means shows a change opposite to the predetermined change, and measurement control where, in a next measurement, measurement of the first measurement time T1 is started when the output of the variation detection means shows a change opposite to the predetermined change and measurement of the second measurement time T2 is started when the output of the variation detection means shows the predetermined change; and flow rate calculation means for calculating the flow rate by successively averaging a first flow rate obtained by using the previous first measurement time T1 and previous second measurement time T2 while alternately changing start of measurement and a second flow rate obtained by using next first measurement time T1 and next second measurement time T2. Thus, the timing for measurement is changed as described above in order to perform measurement for the first measurement time T1 and the second measurement time T2. As a result, even when a pressure variation is asymmetrical between a high pressure side and a low pressure side, an influence of such a pressure variation can be offset.

The flowmeter includes repetition means for performing transmission/reception a plurality of times. Thus, averaging can be performed by increasing the number of times of measurement, and as a result, reliable flow rate measurement can be performed.

The flowmeter includes repetition means for performing transmission/reception a plurality of times over a time period which is a multiple of a variation cycle. Thus, a pressure variation can be averaged by measuring according to the variation frequency. As a result, a stable flow rate can be measured.

The flowmeter includes repetition means for starting transmission/reception measurement when an output of the variation detection means shows a predetermined change and repeating the transmission/reception measurement with a sonic wave until the output of the variation detection means shows the same change as the predetermined change. Thus, the start and stop of the measurement can be made conformable to the frequency of a pressure variation. Therefore, a variation frequency can be measured, and a pressure variation is averaged. As a result, a stable flow rate can be measured.

The flowmeter includes selection means for switching a case where the first vibration means and second vibration means are used for transmission/reception of a sonic wave and a case where the first vibration means and second vibration means are used for detection of a pressure variation. Thus, at least one of the first vibration means and the second vibration means is used for pressure detection. As a result, both the flow rate measurement and the pressure measurement can be simultaneously achieved.

The flowmeter includes variation detection means for detecting a component of an alternating component of a variation waveform which is in the vicinity of zero. Thus, a variation is detected in the vicinity of a zero component of the variation, and hence the measurement can be started in the vicinity of zero variation within a time to perform flow rate measurement. Therefore, by performing the flow rate measurement within a time when a variation is small, the measurement can be stabilized even when a variation occurs in a fluid.

The flowmeter includes: frequency detection means for detecting the frequency of a signal of the variation detection means; and measurement control means for starting measurement only when the frequency detected by the frequency detection means is a predetermined frequency. Thus, by starting the measurement only when the frequency is a predetermined frequency, measurement can be performed when a predetermined variation occurs. As a result, a stable flow rate can be measured.

The flowmeter includes detection cancellation means for automatically starting measurement after a predetermined time period when a signal of the variation detection means is not detected. Thus, even after a variation disappears, the flow rate can be automatically measured when a predetermined time arrives.

The transmission/reception means and the first and second vibration means include piezoelectric transducers. Thus, when the piezoelectric transducer is used, an ultrasonic wave is used for transmission/reception while a pressure variation can be detected.

A flowmeter of the present invention includes: transmission/reception means provided in a flow path for performing transmission/reception using a state change of fluid; repetition means for repeating signal propagation by the transmission/reception means; time measurement means for measuring a propagation time during repetition by the repetition means; flow rate detection means for detecting a flow rate based on a value of the time measurement means; variation detection means for detecting a fluid variation in a flow path; measurement control means for controlling each of the above means; and measurement monitoring means for monitoring abnormality in each of the above means. Thus, when there is a variation in a flow in the flow path, the flow rate is measured according to the variation, while abnormality can be quickly detected by the measurement monitoring means. Accordingly, handling of abnormality can be correctly performed, and a measured value becomes stable. As a result, the flow rate can be measured with a high accuracy, and the reliability of the measurement can be improved.

The flowmeter includes a pair of transmission/reception means which utilize propagation of an ultrasonic wave as the state change of fluid. Since a sonic wave is used, the flow rate measurement can be performed even when there is a variation in fluid. Further, handling of abnormality can be correctly performed by the measurement monitoring means. As a result, the reliability of the measurement can be improved.

The flowmeter includes transmission/reception means which utilizes propagation of heat as the state change of fluid. Since heat propagation is used, the flow rate measurement can be performed even when there is a variation in fluid. Further, handling of abnormality can be correctly performed by the measurement monitoring means. As a result, the reliability of the measurement can be improved.

The flowmeter includes: a pair of transmission/reception means provided in a flow path for transmitting/receiving a sonic wave; repetition means for repeating signal propagation of the transmission/reception means; time measurement means for measuring a propagation time of a sonic wave during the repetition by the repetition means; flow rate detection means for detecting the flow rate based on a value of the time measurement means; variation detection means for detecting a fluid variation in a flow path; measurement control means for controlling each of the above means; and measurement monitoring means for monitoring abnormality in a start signal which directs start of transmission of a sonic wave at a first output signal of the variation detection means after a measurement direction signal of the measurement control means, and abnormality in an end signal which directs end of repetition of the transmission/reception of the sonic wave at second output signal of the variation detection means. Thus, when there is a variation in fluid in the flow path, the measurement can be performed in synchronization with the frequency of the variation, and abnormality can be detected by the measurement monitoring means. Therefore, a flow rate can be measured with a high accuracy, and a reliable measured value can be obtained. In addition, handling of abnormality can be correctly performed, and the reliability of the measured flow rate value can be improved.

The flowmeter includes measurement monitoring means for directing a start of transmission of a sonic wave after a predetermined time when a start signal is not generated within a predetermined time period after a direction of the measurement control means. Thus, even when there is no variation, and there is no start signal within a predetermined time period, the flow rate can be measured at every predetermined time, and loss of data can be prevented.

The flowmeter includes measurement monitoring means for directing start of transmission of a sonic wave after a predetermined time when a start signal is not generated within a predetermined time period after a direction of the measurement control means, and for performing measurement a predetermined number of repetition times. Thus, even when there is no variation, and there is no start signal within a predetermined time period, the flow rate can be measured for a predetermined number of repetition times at every predetermined time, and loss of data can be prevented.

The flowmeter includes measurement monitoring means which does not perform measurement until a next direction of the measurement control means when a start signal is not generated within a predetermined time period after a direction of the measurement control means. By suspending the operation until a next measurement direction, unnecessary measurement is not performed, whereby the amount of consumed power can be decreased.

The flowmeter includes measurement monitoring means which terminates reception of a sonic wave when an end signal is not generated within a predetermined time after a start signal. Since the reception of the sonic wave is forcibly terminated, the measurement is not suspended while waiting for the end signal. Thus, the measurement can proceed to a next process, and a stable measurement operation can be performed.

The flowmeter includes measurement monitoring means which terminates reception of a sonic wave and outputs a start signal again, when an end signal is not generated within a predetermined time after a start signal. Since the reception of the sonic wave is forcibly terminated, the measurement is not suspended while waiting for the end signal. Further, a start signal is output again so as to perform re-measurement. Thus, a stable measurement operation can be performed.

The flowmeter includes measurement monitoring means for stopping transmission/reception processing when abnormality occurs in the number of repetition times. Since the measurement is stopped when the number of repetition times is abnormal, only data with a high accuracy can be used to perform flow rate measurement.

The flowmeter includes measurement monitoring means which compares a first number of repetition times for measurement where a sonic wave is transmitted from a first one of the pair of transmission/reception means and received by the second transmission/reception means and a second number of repetition times for measurement where a sonic wave is transmitted from the second transmission/reception means and received by the first transmission/reception means, and again outputs a start signal when the difference between the first and second numbers of repetition times is equal to or greater than a predetermined number of times. Thus, re-measurement is performed when the number of repetition times is greatly different, whereby measurement with a high accuracy can be performed with a stable variation frequency.

The flowmeter includes repetition means for setting the number of repetition times such that a first number of repetition times for measurement where a sonic wave is transmitted from first one of the pair of transmission/reception means and received by the second transmission/reception means is equal to a second number of repetition times for measurement where a sonic wave is transmitted from the second transmission/reception means and received by the first transmission/reception means. Thus, by employing the same number of repetition times, a predetermined flow rate measurement can be performed even when a variation frequency is unstable.

The flowmeter includes measurement monitoring means for monitoring the number of times that a start signal is output again so as to be limited to a predetermined number of times or less, such that the outputting of the start signal is not permanently repeated. Thus, by limiting the number of times of re-measurement, the processing is prevented from continuing permanently. As a result, stable flow rate measurement can be performed.

The flowmeter measures a flow rate from a difference between inverse numbers of propagation times measured while repeating transmission/reception of an ultrasonic wave a plurality of number of times. Thus, when an ultrasonic wave is used, transmission/reception can be performed without being affected by a variation frequency in the flow path. Further, the flow rate is measured from the difference of inverse numbers of propagation times which are measured while repeating the transmission/reception, whereby even a variation of a long cycle can be measured by units of one cycle. In addition, the difference of the propagation times which is caused by a variation can be offset by using the difference of inverse numbers.

A flowmeter of the present invention includes: instantaneous flow rate detection means for detecting an instantaneous flow rate; fluctuation determination means for determining whether or not there is a pulse in a flow rate value; and at least one or more stable flow rate calculation means for calculating a flow rate value using different means according to a determination result of the fluctuation determination means. Thus, by determining a variation in a measured flow rate and switching the flow rate calculation means, the flow rate can be calculated by one flow rate measurement means according to the amount of the variation in a reliable manner.

A flowmeter of the present invention includes: instantaneous flow rate detection means for detecting an instantaneous flow rate; filter processing means for performing digital-filter processing of a flow rate value; and stable flow rate calculation means for calculating a flow rate value using the filter processing means. Thus, when the digital filter processing is performed, a calculation equivalent to an averaging process can be performed without using a large number of memories for storing data. Moreover, the filter characteristic can be modified by changing one variable, i.e., a filter coefficient.

The flowmeter includes stable flow rate calculation means for calculating a stable flow rate value using the digital filter processing means when the fluctuation determination means determines that there is a pulse. Thus, when a pulse occurs, a sharp filter characteristic is selected so as to render a large pulse stable, and the filter processing can be performed only when a pulse occurs.

The fluctuation determination means determines whether or not a variation amplitude of a flow rate value is equal to or greater than a predetermined value. Thus, a pulse can be determined based on the variation amplitude of the pulse, whereby the filter processing can be modified according to the variation amplitude of the pulse.

The filter processing means modifies a filter characteristic according to a variation amplitude of a flow rate value. Since the filter characteristic is changed according to the variation amplitude of a flow rate value, the filter characteristic can be quickly modified so as to be a sufficiently relaxed filter characteristic that allows a variation according to a variation in a flow rate when the variation is small, and when the variation is large, a sharp filter characteristic is selected such that a variation of the flow rate due to a pulse can be significantly suppressed.

The filter processing is performed only when a flow rate value detected by the instantaneous flow rate detection means is low. Since the filter processing is performed only when the flow rate is low, a variation of the flow rate can be quickly handled when the flow rate is high, and an influence of fluctuation which is caused when the flow rate is low can be significantly suppressed.

Filter processing means modifies a filter characteristic according to a flow rate value. Since the filter characteristic is changed according to the flow rate value, filter processing is performed only when the flow rate is low, a variation of the flow rate can be quickly handled when the flow rate is high, and an influence of fluctuation which is caused when the flow rate is low can be significantly suppressed.

Filter processing means modifies a filter characteristic according to an interval of a measurement time of the instantaneous flow rate detection means. Thus, by changing the filter characteristic according to an interval of the flow rate detection time, the variation can be suppressed with a relaxed filter characteristic when the measurement interval is short or with a sharp filter characteristic when the measurement interval is long.

The flowmeter includes filter processing means which modifies a filter characteristic such that a cut-frequency of the filter characteristic becomes high when the flow rate is high, and which modifies a filter characteristic such that the filter characteristic has a low cut-off frequency when the flow rate is low. Thus, the response characteristic is increased when the flow rate is high, and the fluctuation is suppressed when the flow rate is low.

A filter characteristic is modified such that a variation amplitude of a flow rate value calculated by the stable flow rate calculation means is within a predetermined value range. Since the filter characteristic is modified such that the variation amplitude is within a predetermined value range, the flow rate variation can be suppressed so as to be always equal to or smaller than a predetermined value.

An ultrasonic wave flowmeter which detects a flow rate by using an ultrasonic wave is used as the instantaneous flow rate detection means. Thus, by using an ultrasonic wave flowmeter, an instantaneous flow rate can be measured even when a large flow rate variation occurs. Thus, from the flow rate value, a stable flow rate can be calculated.

A heat-based flowmeter is used as the instantaneous flow rate detection means. When the heat-based flowmeter is used, an instantaneous flow rate can be measured even when a large flow rate variation occurs. Thus, a stable flow rate can be calculated from the flow rate value.

Further, the control section controls the periodicity change means so as to sequentially change the frequency of the measurement in the flow rate measurement such that the frequency of the measurement is not kept constant. Thus, noise which is in synchronization with a measurement frequency or a transmission frequency of an ultrasonic wave is never in the same phase but dispersed when the ultrasonic wave is received. Therefore, a measurement error can be decreased.

Furthermore, the flowmeter of the present invention includes periodicity change means for sequentially changing the driving method of the driver circuit. In response to receipt of an output of the reception detecting circuit, the control section modifies the periodicity change means every time the reception detecting circuit detects a receipt of an ultrasonic wave such that the frequency of the measurement is not kept constant. Thus, the periodicity change means can be operated with a plurality of settings for measurement within one flow rate measurement cycle. As a result, noise is dispersively averaged in a measurement result, and a reliable measurement result can be obtained.

The periodicity change means switchingly outputs a plurality of output signals having different frequencies; and the control section changes a frequency setting of the periodicity change means at every measurement so as to change a driving frequency of the driver circuit. Thus, by changing the driving frequency, the reception detecting timing can be changed by a time corresponding to a frequency variation of a driving signal. Thus, noise which is in synchronization with a measurement frequency or a transmission frequency of an ultrasonic wave is never in the same phase but dispersed when the ultrasonic wave is received. Therefore, a measurement error can be decreased.

The periodicity change means outputs output signals having the same frequency and a plurality of different phases; and the control section operates such that a phase setting for the output signal of the periodicity change means is changed at every measurement and a driving phase of the driver circuit is changed. Thus, by changing the driving phase, the reception detecting timing can be changed by a time corresponding to a phase variation of a driving signal. Thus, noise which is in synchronization with a measurement frequency or a transmission frequency of an ultrasonic wave is never in the same phase but dispersed when the ultrasonic wave is received. Therefore, a measurement error can be decreased.

The periodicity change means outputs a synthesized signal obtained by superposing a signal of a first frequency which is an operation frequency of the ultrasonic wave transducers and a signal of a second frequency which is different from the first frequency; and the control section outputs, through the driver circuit, at every measurement, an output signal where the second frequency of the periodicity change means is changed. Thus, the periodicity of the flow rate measurement can be disturbed. As a result, noise which is in synchronization with a measurement frequency or a transmission frequency of an ultrasonic wave is never in the same phase but dispersed when the ultrasonic wave is received. Therefore, a measurement error can be decreased.

The periodicity change means switches the setting between a case where there is a second frequency and a case where there is not a second frequency. Thus, since the reception detecting timing is changed by changing the vibration of the ultrasonic wave transducer that transmits an ultrasonic wave, the periodicity of the flow rate measurement can be disturbed. As a result, noise which is in synchronization with a measurement frequency or a transmission frequency of an ultrasonic wave is never in the same phase but dispersed when the ultrasonic wave is received. Therefore, a measurement error can be decreased.

The periodicity change means changes the phase setting of the second frequency. Thus, since the reception detecting timing is changed by changing the vibration of the ultrasonic wave transducer that transmits an ultrasonic wave, the periodicity of the flow rate measurement can be disturbed. As a result, noise which is in synchronization with a measurement frequency or a transmission frequency of an ultrasonic wave is never in the same phase but dispersed/averaged when the ultrasonic wave is received. Therefore, a measurement error can be decreased.

The periodicity change means changes the frequency setting of the second frequency. Thus, since the reception detecting timing is changed by changing the vibration of the ultrasonic wave transducer that transmits an ultrasonic wave, the periodicity of the flow rate measurement can be disturbed. As a result, noise which is in synchronization with a measurement frequency or a transmission frequency of an ultrasonic wave is never in the same phase but dispersed when the ultrasonic wave is received. Therefore, a measurement error can be decreased.

The periodicity change means includes a delay section capable of setting different delay times; and the control section changes the setting of the delay at each transmission of an ultrasonic wave or at each receipt detection of an ultrasonic wave. Thus, in one measurement operation, reverberation of an ultrasonic wave transmitted in an immediately-previous measurement and an influence of tailing of the ultrasonic wave transducers can be dispersed, whereby a measurement error can be decreased.

The cycle width changed by the periodicity change means is a multiple of a value corresponding to a variation of a propagation time which is caused by a measurement error. Thus, when the measured values for all the settings are summed up and averaged, an error can be suppressed to a minimum.

The cycle width changed by the periodicity change means is equal to a cycle of a resonance frequency of the ultrasonic wave transducers. Thus, in a value obtained by summing up and averaging the measured values for all the settings, a measurement error which may be caused by reverberation of an ultrasonic wave or tailing of the ultrasonic wave transducers is minimum. Thus, the measurement error can be decreased.

The order of patterns for changing the periodicity is the same for both measurement in a upstream direction and measurement in a downstream direction. Thus, the measurement with an ultrasonic wave transmitted toward the upstream side and the measurement with an ultrasonic wave transmitted toward the downstream side are always performed under the same conditions. Hence, even when there is a variation in the flow rate, a reliable measurement result can be obtained.

The predetermined number of times is a multiple of a change number of the periodicity change means. Thus, all the setting values of the periodicity change means are uniformly set within a single flow rate measurement operation. As a result, a reliable measurement result can be obtained.

Further, a time period from receipt detection to a next count-up time is measured by a second timer, whereby measurement can be performed with a resolution higher than that of a first timer. Furthermore, the amount of consumed power can be decreased in comparison to a flowmeter having the same resolution, because it is necessary to operate the second timer for only a short time period after the receipt detection.

Furthermore, since the second timer is corrected by the first timer, the second timer only needs to possess a short-term stability. Thus, it is not necessary to use a special part. Therefore, a flowmeter with high resolution can be readily realized.

Furthermore, since the second timer is corrected by the first timer when an output of a temperature sensor varies so as to be equal to or greater than a set value, the flowmeter of the present invention can be used even when the second timer has a characteristic which varies according to a variation of temperature.

Further still, since the second timer is corrected by the first timer when an output of a voltage sensor varies so as to be equal to or greater than a set value, the flowmeter of the present invention can be used even when the second timer has a characteristic which varies according to a variation of voltage.

A flowmeter of the present invention includes: a flow rate measurement section through which fluid to be measured flows; a pair of ultrasonic wave transducers provided in the flow rate measurement section for transmitting/receiving an ultrasonic wave; a driver circuit for driving one of the ultrasonic wave transducers; a reception detecting circuit connected to the other ultrasonic wave transducer for detecting an ultrasonic wave signal; a control section for controlling the driver circuit for a predetermined number of times so as to drive the ultrasonic wave transducers again in response to an output of the reception detecting circuit; a timer for measuring an elapsed time for the predetermined number of times; a calculation section for calculating a flow rate from an output of the timer; and periodicity stabilizing means for sequentially changing a driving method of the driver circuit, wherein the control section controls the periodicity stabilizing means such that a measurement frequency is always maintained to be constant. With this structure, the measurement frequency is always constant even when a propagation time varies. Thus, noise which is in synchronization with a measurement frequency or a transmission frequency of an ultrasonic wave is always in the same phase when the ultrasonic wave is received regardless of a variation in the propagation time. Therefore, a measurement error can be maintained as a constant value. Accordingly, the flow rate measurement can be stabilized even when the noise has a very long periodic noise.

The control section includes periodicity stabilizing means formed by a delay section capable of setting different delay times; and the control section changes an output timing of the driver circuit by switching the delay times. Since the measurement frequency is maintained to be constant by changing the delay time, the measurement frequency can be stabilized without giving an influence to driving of the ultrasonic wave transducers.

The control section controls the driver circuit such that a measurement time is maintained to be constant. Thus, the measurement frequency can be maintained to be constant with a simple calculation without calculating a propagation time for each ultrasonic wave transmission.

The invention claimed is:

1. An ultrasonic wave flowmeter, comprising:
   a transmitter for transmitting an ultrasonic wave signal;
   a receiver for receiving the ultrasonic wave signal which has been transmitted from the transmitter and has been propagated through a fluid;
   a reception detecting section for receiving an output of the receiver and detecting the ultrasonic wave signal;
   a delay section for receiving an output of the reception detecting section and outputting it to the transmitter so that the ultrasonic wave signal is transmitted again;
   a counter for counting the number of detections by the reception detecting section;
   a timer for repeatedly measuring a time period from the time when the transmission of the ultrasonic wave signal by the transmitter is started to the time when the counter reaches a predetermined value;
   a calculation section for calculating a flow rate of the fluid, based on an output of the timer; and
   a delay control section for controlling the delay section to change the delay time of the delay section each time the measurement by the timer is made.

2. An ultrasonic wave flowmeter according to claim 1, wherein the delay control section controls the delay section to maintain the delay time of the delay section to be constant when an output of the calculating section is greater or equal to a predetermined value.

3. An ultrasonic wave flowmeter, comprising:
   a transmitter for transmitting an ultrasonic wave signal;
   a receiver for receiving the ultrasonic wave signal which has been transmitted from the transmitter and has been propagated through a fluid;
   a reception detecting section for receiving an output of the receiver and detecting the ultrasonic wave signal;
   a first timer for measuring a time period from the time when the transmitter transmits the ultrasonic wave signal to the time when the reception detecting section detects the ultrasonic wave signal;
   a second timer for measuring a time period from the time when the reception detecting section detects the ultrasonic wave signal to the time when an output of the first timer is changed; and
   a calculation section for calculating a flow rate of the fluid, based on the time period measured by the first timer and the time period measured by the second timer.

4. An ultrasonic wave flowmeter according to claim 3, wherein the second timer is corrected by the first timer.

5. An ultrasonic wave flowmeter according to claim 3, further comprising a temperature sensor,
   wherein the second timer is corrected by the first timer when the change in an output of the temperature sensor is greater or equal to a predetermined value.

6. An ultrasonic wave flowmeter according to claim 3, further comprising a power supply voltage sensor for detecting a power supply voltage for a circuit,
   wherein the second timer is corrected by the first timer when the change in an output of the power supply voltage sensor is greater or equal to a predetermined value.

7. An ultrasonic wave flowmeter according to claim 3,
   wherein the second timer is corrected by the first timer immediately after the measurement of time by the second timer.

* * * * *